US006754663B1

(12) United States Patent
Small et al.

(10) Patent No.: US 6,754,663 B1
(45) Date of Patent: Jun. 22, 2004

(54) VIDEO-FILE BASED CITATION GENERATION SYSTEM FOR TRAFFIC LIGHT VIOLATIONS

(75) Inventors: Steven I. Small, Medfield, MA (US); Randall T. Sybel, Randolph, VT (US); Greg D. Johnson, Bellingham, MA (US); Lalitha R. Coimbatore, Attleboro, MA (US)

(73) Assignee: Nestor, Inc., Providence, RI (US)

( * ) Notice: Subject to any disclaimer, the term of this patent is extended or adjusted under 35 U.S.C. 154(b) by 0 days.

(21) Appl. No.: 09/447,032

(22) Filed: Nov. 22, 1999

Related U.S. Application Data

(60) Provisional application No. 60/109,731, filed on Nov. 23, 1998.

(51) Int. Cl.[7] .................................................. G06F 7/00

(52) U.S. Cl. ..................................... 707/102; 707/104.1

(58) Field of Search ................................ 180/167–168; 340/910–917, 929–937; 342/28; 382/103, 104, 190, 209, 253, 263; 396/263; 701/116–119; 707/1, 3, 100, 102, 500–501.1, 526; 345/716, 723–726, 838; 346/263; 715/500, 500.1, 501.1, 526

(56) References Cited

U.S. PATENT DOCUMENTS

| | | | |
|---|---|---|---|
| 3,149,306 A | 9/1964 | Lesher | 340/41 |
| 3,196,386 A | 7/1965 | Rossi et al. | 340/31 |
| 3,302,168 A | 1/1967 | Gray et al. | 340/31 |
| 3,613,073 A | 10/1971 | Clift | 340/31 A |
| 3,689,878 A | 9/1972 | Thieroff | 340/31 R |
| 3,693,144 A | 9/1972 | Friedman | 340/37 |
| 3,731,271 A | 5/1973 | Muramatu et al. | 340/41 |
| 3,810,084 A | 5/1974 | Hoyt, Jr. | 340/41 R |
| 3,825,890 A | 7/1974 | Miyazato et al. | 340/40 |
| 3,849,784 A | 11/1974 | Holzapfel | 346/107 |

(List continued on next page.)

OTHER PUBLICATIONS

Eric Evans, "Student Legal Services—Criminal Law," http://www.indiana.edu/~sls/crim.html.*

Michael Lamm, "Smile! You Just Got A Ticket," Popular Mechanics, Dec., 1969, pp. 73–76.*

Tindall, "Application of Neural Network Techniques to Automatic License Plate Recognition," IEEE European convention on security and detection, 1995.

St. Petersburg Times, "Put a Stop to Red Light Violators," Sep. 9, 1998.

Star Tribune, "Many favor use of photo cop// readers say red light runners should be caught on camera," Dec. 18, 1997.

Rockey Mountain News, "Running red light to cost more . . . for some traffic violators," Nov. 27, 1997.

*Primary Examiner*—Greta Robinson
*Assistant Examiner*—Harold E. Dodds, Jr.
(74) *Attorney, Agent, or Firm*—Weingarten, Schurgin, Gagnebin & Lebovici LLP

(57) ABSTRACT

A system for generating a traffic violation citation, which operates using at least one image data file including digitized video data. The image data file includes multiple images of an intersection during a red light violation. The image data file is, for example, derived from the output of one or more video cameras positioned to record respective views of an intersection being monitored for red light violations. The disclosed system provides a user with an interface including at least one image display window. The image display window is used to display portions of the image data file. Where the image data file includes multiple video clips, such clips may be displayed simultaneously in respective ones of multiple display windows. The system further includes a selection interface that permits a user to select at least one image from the image data file, for example a current image being displayed in an image display window. The system generates a citation associated with the traffic violation, including a copy of the selected image.

12 Claims, 36 Drawing Sheets

U.S. PATENT DOCUMENTS

| | | | | | |
|---|---|---|---|---|---|
| 3,858,223 | A | | 12/1974 | Holzapfel | 346/107 VP |
| 3,866,165 | A | | 2/1975 | Maronde et al. | 340/31 C |
| 3,885,227 | A | | 5/1975 | Moissl | 340/41 R |
| 3,886,515 | A | | 5/1975 | Cottin et al. | 340/23 |
| 3,920,967 | A | | 11/1975 | Martin et al. | 235/150.24 |
| 3,921,127 | A | | 11/1975 | Narbaits-Jaureguy et al. | 340/32 |
| 4,007,438 | A | | 2/1977 | Protonantis | 340/62 |
| 4,122,523 | A | | 10/1978 | Morse et al. | 364/436 |
| 4,200,860 | A | | 4/1980 | Fritzinger | 340/43 |
| 4,228,419 | A | | 10/1980 | Anderson | 340/32 |
| 4,361,202 | A | | 11/1982 | Minovitch | 180/168 |
| 4,371,863 | A | | 2/1983 | Fritzinger | 340/43 |
| 4,401,969 | A | | 8/1983 | Green et al. | 340/41 R |
| 4,774,571 | A | | 9/1988 | Mehdipour et al. | 358/108 |
| 4,783,833 | A | | 11/1988 | Kawabata et al. | 382/22 |
| 4,814,765 | A | | 3/1989 | DeRoche et al. | 340/915 |
| 4,884,072 | A | | 11/1989 | Horsch | 340/937 |
| 4,887,080 | A | | 12/1989 | Gross | 340/937 |
| 5,026,153 | A | | 6/1991 | Suzuki et al. | 356/1 |
| 5,041,828 | A | | 8/1991 | Loeven | 340/937 |
| 5,063,603 | A | | 11/1991 | Burt | 382/37 |
| 5,099,322 | A | | 3/1992 | Gove | 358/105 |
| 5,122,796 | A | | 6/1992 | Beggs et al. | 340/904 |
| 5,161,107 | A | | 11/1992 | Mayeaux et al. | 364/436 |
| 5,164,998 | A | | 11/1992 | Reinsch | 382/65 |
| 5,257,194 | A | | 10/1993 | Sakita | 364/436 |
| 5,278,554 | A | | 1/1994 | Marton | 340/910 |
| 5,281,949 | A | | 1/1994 | Durley et al. | 340/433 |
| 5,283,573 | A | | 2/1994 | Takatou et al. | 340/937 |
| 5,285,523 | A | | 2/1994 | Takahashi | 395/22 |
| 5,291,563 | A | | 3/1994 | Maeda | 382/48 |
| 5,296,852 | A | | 3/1994 | Rathi | 340/933 |
| 5,301,239 | A | | 4/1994 | Toyama et al. | 382/1 |
| 5,313,201 | A | | 5/1994 | Ryan | 340/961 |
| 5,332,180 | A | | 7/1994 | Peterson et al. | 246/3 |
| 5,339,081 | A | | 8/1994 | Jefferis et al. | 342/28 |
| 5,345,232 | A | | 9/1994 | Robertson | 340/906 |
| 5,357,432 | A | | 10/1994 | Margolis et al. | 364/424.02 |
| 5,375,059 | A | | 12/1994 | Kyrtsos et al. | 364/449 |
| 5,375,250 | A | | 12/1994 | Van den Heuvel | 395/800 |
| 5,381,155 | A | | 1/1995 | Gerber | 342/104 |
| 5,387,908 | A | | 2/1995 | Henry et al. | 340/916 |
| 5,390,118 | A | | 2/1995 | Margolis et al. | 364/424.02 |
| 5,390,125 | A | | 2/1995 | Sennott et al. | 364/449 |
| 5,402,118 | A | | 3/1995 | Aoki | 340/937 |
| 5,404,306 | A | | 4/1995 | Mathur et al. | 364/436 |
| 5,408,330 | A | | 4/1995 | Squicciarini et al. | 358/335 |
| 5,416,711 | A | | 5/1995 | Gran et al. | 364/436 |
| 5,432,547 | A | | 7/1995 | Toyama | 348/149 |
| 5,434,927 | A | | 7/1995 | Brady et al. | 382/104 |
| 5,440,109 | A | | 8/1995 | Hering et al. | 235/384 |
| 5,444,442 | A | | 8/1995 | Sadakata et al. | 340/916 |
| 5,448,484 | A | | 9/1995 | Bullock et al. | 364/436 |
| 5,457,439 | A | | 10/1995 | Kuhn | 340/435 |
| 5,459,665 | A | | 10/1995 | Hikita et al. | 364/437 |
| 5,465,118 | A | | 11/1995 | Hancock et al. | 348/396 |
| 5,467,402 | A | | 11/1995 | Okuyama et al. | 382/104 |
| 5,474,266 | A | | 12/1995 | Koglin | 246/111 |
| 5,483,446 | A | | 1/1996 | Momose et al. | 364/424.01 |
| 5,495,243 | A | | 2/1996 | McKenna | 340/902 |
| 5,509,082 | A | | 4/1996 | Toyama et al. | 382/104 |
| 5,530,441 | A | | 6/1996 | Takatou et al. | 340/937 |
| 5,535,314 | A | | 7/1996 | Alves et al. | 395/131 |
| 5,590,217 | A | | 12/1996 | Toyama | 382/104 |
| 5,610,660 | A | * | 3/1997 | Hamano et al. | 375/240.04 |
| 5,617,086 | A | | 4/1997 | Klashinsky et al. | 340/907 |
| 5,687,717 | A | * | 11/1997 | Halpern et al. | 128/903 |
| 5,708,469 | A | * | 1/1998 | Herzberg | 348/37 |
| 5,729,216 | A | | 3/1998 | Sasaki et al. | 340/937 |
| 5,734,337 | A | * | 3/1998 | Kupersmit | 340/936 |
| 5,774,569 | A | | 6/1998 | Waldenmaier | 382/100 |
| 5,777,564 | A | | 7/1998 | Jones | 340/917 |
| 5,801,646 | A | | 9/1998 | Pena | 340/902 |
| 5,805,275 | A | * | 9/1998 | Taylor | 356/3.16 |
| 5,809,161 | A | | 9/1998 | Auty et al. | 382/104 |
| 5,821,878 | A | | 10/1998 | Raswant | 340/907 |
| 5,829,285 | A | * | 11/1998 | Wilson | 180/287 |
| 5,948,038 | A | | 9/1999 | Daly et al. | 701/117 |
| 5,952,941 | A | | 9/1999 | Mardirossian | 340/936 |
| 5,963,204 | A | * | 10/1999 | Ikeda et al. | 345/723 |
| 5,977,883 | A | | 11/1999 | Leonard et al. | 340/906 |
| 5,999,877 | A | | 12/1999 | Takahashi et al. | 701/117 |
| 6,008,741 | A | | 12/1999 | Shinagawa et al. | 340/907 |
| 6,067,075 | A | * | 5/2000 | Pelanek | 345/156 |
| 6,069,655 | A | * | 5/2000 | Seeley et al. | 348/154 |
| 6,075,466 | A | | 6/2000 | Cohen et al. | 340/933 |
| 6,085,976 | A | * | 7/2000 | Sehr | 235/384 |
| 6,091,857 | A | * | 7/2000 | Shaw et al. | 341/200 |
| 6,111,523 | A | * | 8/2000 | Mee | 340/936 |
| 6,202,073 | B1 | * | 3/2001 | Takahashi | 345/620 |
| 6,269,399 | B1 | * | 7/2001 | Dyson et al. | 709/224 |
| 6,281,808 | B1 | * | 8/2001 | Glier et al. | 340/916 |
| 6,330,369 | B1 | * | 12/2001 | Cornog et al. | 382/239 |
| 6,366,222 | B1 | * | 4/2002 | Russell, Jr. | 340/426 |
| 6,466,260 | B1 | | 10/2002 | Hatae et al. | 348/149 |
| 6,546,119 | B2 | * | 4/2003 | Ciolli et al. | 382/104 |

* cited by examiner (PART I)

( PART II )

(PART I)

(PART II)

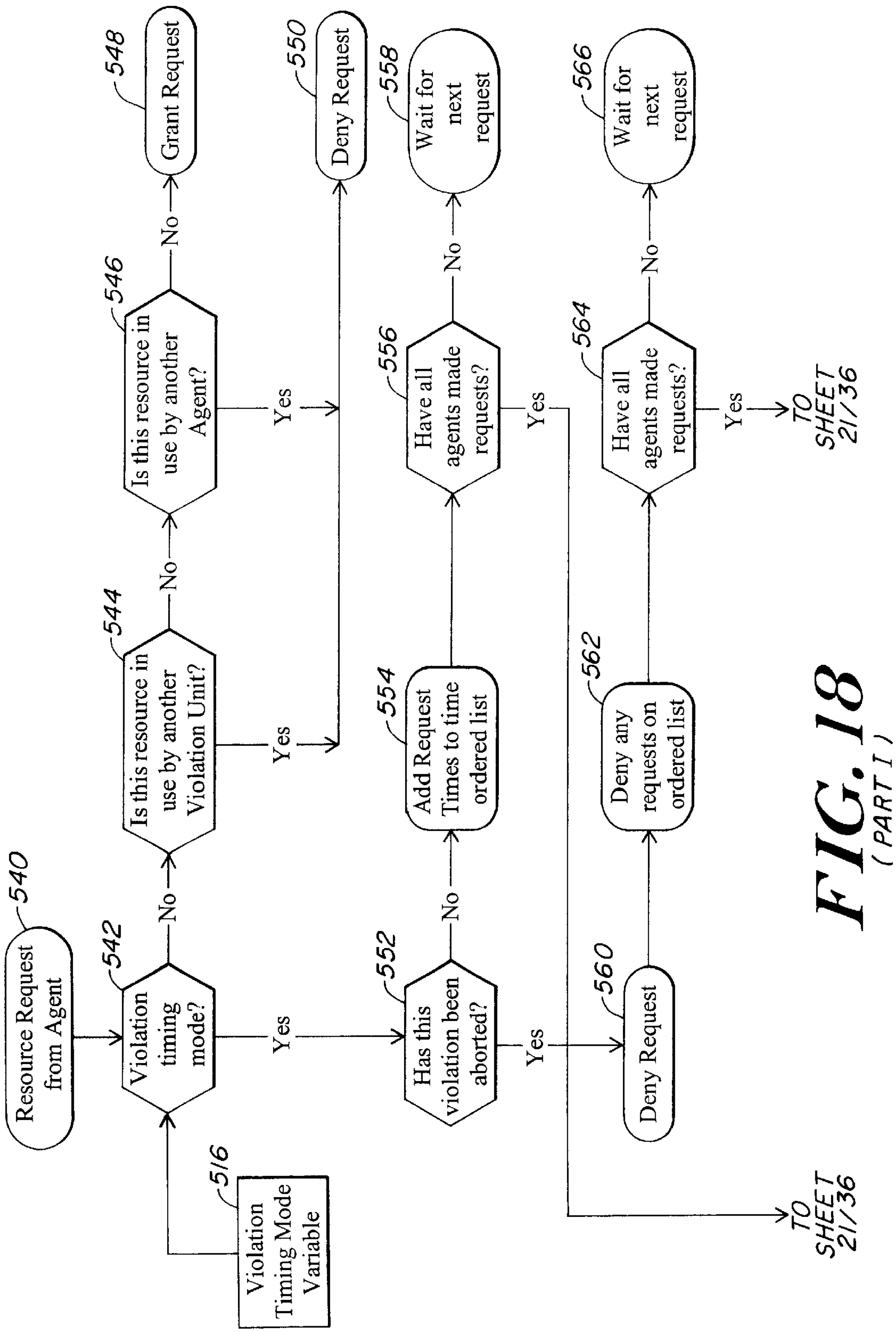
FIG. 18 (PART I)

(PART II)

VIDEO-FILE BASED CITATION GENERATION SYSTEM FOR TRAFFIC LIGHT VIOLATIONS

CROSS REFERENCE TO RELATED APPLICATIONS

This application claims priority under 35 U.S.C. §119(e) to provisional patent application serial No. 60/109,731 filed Nov. 23, 1998, the disclosure of which is hereby incorporated by reference.

STATEMENT REGARDING FEDERALLY SPONSORED RESEARCH OR DEVELOPMENT

N/A

BACKGROUND OF THE INVENTION

The disclosed system relates generally to automated systems for traffic violation enforcement, and more specifically to a system for generating traffic citations including one or more violation images extracted from one or more violation image files.

Existing systems for generating traffic violation citations typically involve manual entry of text data. These systems may, for example, rely on in-person violation detection by a police officer, who fills out a citation form at the place where the violation occurred. The resulting violation citation includes a written description of the violation event. However, current systems include no mechanism for including recorded visual information related to the violation event in the citation itself. Such visual information included within a citation would be advantageous for many reasons, including for proving that a violation did occur.

Accordingly, it would be desirable to have an automated traffic violation citation generating system, including a mechanism to provide visual images related to the violation within the citation itself. It would further be desirable for the system to provide an interface to image files showing the violation event from one or more perspectives, and recorded by an automated roadside station operable to detect and record traffic violations, such as red light violations.

BRIEF SUMMARY OF THE INVENTION

A system for generating a traffic violation citation is disclosed, which operates using at least one image data file, including digitized video data. The image data file includes multiple images of an intersection during a red light violation event. The image data file is, for example, derived from the output of one or more video cameras positioned to record respective parts of an intersection being monitored for red light violations.

The disclosed system provides a user with a display including at least one image display window. The image display window is used to display portions of the image data file. The image data file or files may include multiple discrete portions of synchronous images ("clips"). Multiple clips may be displayed simultaneously in respective display windows. The system further includes a selection interface permitting a user to select at least one image from the image data file, for example a current image being displayed in an image display window. A citation generation process generates a citation associated with the traffic violation, including a copy of the selected image.

Accordingly there is disclosed an automated traffic violation citation system which includes image information regarding an alleged violation within the citation regarding the violation. Such included image information is desirable for showing that the details of the violation event, identifying the violating vehicle and/or operator, and potentially proving that the violation did occur.

BRIEF DESCRIPTION OF THE SEVERAL VIEWS OF THE DRAWINGS

The invention will be more fully understood by reference to the following detailed description of the invention in conjunction with the drawings, of which.

DETAILED DESCRIPTION OF THE INVENTION

Consistent with the present invention, a system and method for predicting and recording red light violations is disclosed which enables law enforcement officers to generate complete citations from image data recorded using a number of image capturing devices controlled by a roadside unit or station. The disclosed system further enables convenient interoperation with a vehicle information database as provided by a Department of Motor Vehicles (DMV). Additionally, a court scheduling interface function may be used to select court dates. Violation images, supporting images, and other violation related data may be provided for display using a display device within the court house.

Figure 1:
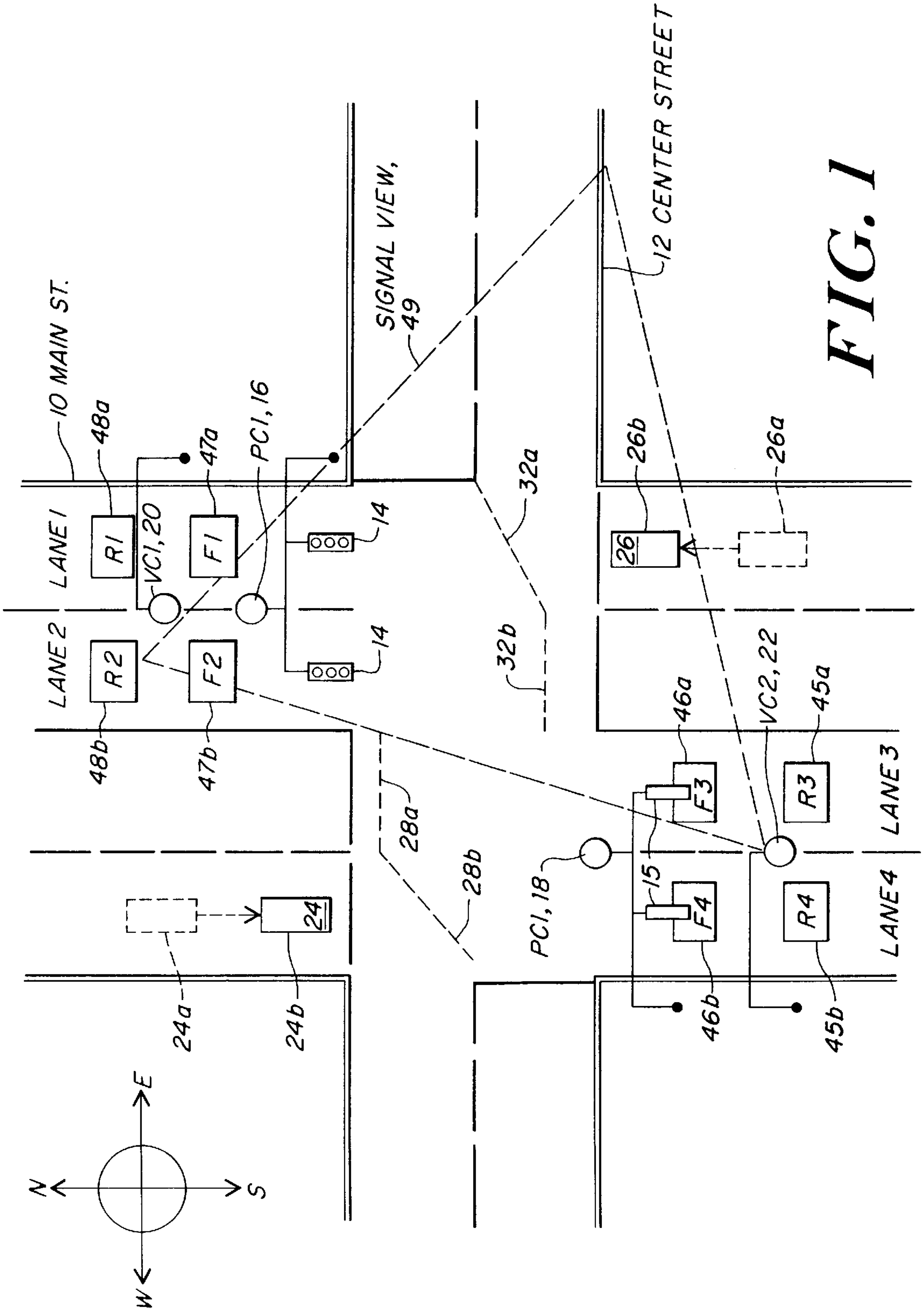
FIG. 1 shows an intersection of two roads at which an embodiment of the disclosed roadside station has been deployed.

As shown in FIG. 1, an embodiment of the disclosed system at an intersection of main street 10 and center street 12 includes a first prediction camera 16 for tracking vehicles travelling north on main street 10, a second prediction camera 18 for tracking vehicles travelling south on main street 10, a first violation camera 20, and a second violation camera 22. A north bound traffic signal 14 and a south bound traffic signal 15 are also shown in FIG. 1. A south bound vehicle 24 is shown travelling from a first position **24*a* to a second position 24*b*, and a north bound vehicle 26 is shown travelling from a first position 26*a* to a second position 26*b***.

During operation of the system shown in FIG. 1, a red light violation by a north bound vehicle travelling on main street may be predicted in response to image data captured from a video stream provided by the first prediction camera 16. In that event, the violation cameras 20 and 22, as well as the prediction camera 16, may be controlled to captured certain views of the predicted violation, also referred to as the "violation event." For example, the violation camera 20 may be used to capture a front view 47 ("front view") of a violating north bound vehicle, as well as a rear view 48 ("rear view") of that vehicle. For a violating vehicle travelling in lane 1 of main street 10, the violation camera 20 may be controlled to capture a front view F1 **47*a* and a rear view R1 48*a* of the violating vehicle. Similarly, for a predicted north bound violator travelling in lane 2 of main street 10, the violation camera 20 may be controlled to capture a front view F2 47*b*, as well as a rear view R2 48*b*** of the violating vehicle. By capturing both a front view and a review view of a violating vehicle, the present system may increase the probability of recovering a license plate number. Capturing both a front and rear view may be employed to avoid potential problems of predicted violator occlusion by other vehicles.

Additionally, with regard to recording a predicted north bound violator on main street 10, the second violation camera 22 may be employed to provide a wide angle view 49, referred to as a "signal view", showing the violating vehicle before and after it crosses the stop line for its respective lane, together with the view of the traffic signal 14 as seen by the operator of the violating vehicle while crossing the stop line. With regard to predicted south bound violations on main street 10, the second violation camera 22 may be employed to capture front views 46 and rear views 45 of such violating vehicles. Further, the first violation camera 20 may be used to capture a signal view with regard to such south bound violations.

Also during recording of a violation event, the prediction camera located over the road in which the predicted violator is travelling may be used to capture a "context view" of the violation. For example, during a north bound violation on main street 10, the prediction camera 16 may be directed to capture the overhead view provided by its vantage point over the monitored intersection while the violating vehicle crosses through the intersection. Such a context view may be relevant to determining whether the recorded vehicle was justified in passing through a red light. For example, if a vehicle crosses through an intersection during a red light in order to avoid an emergency vehicle such as an ambulance, such an action would not be considered a citationable violation, and context information recorded in the context view would show the presence or absence of such exculpatory circumstances.

While the illustrative embodiment of FIG. 1 shows two violation cameras, the disclosed system may alternatively be embodied using one or more violation cameras for each monitored traffic direction. Each violation camera may be used for recording a different aspect of the intersection during a violation. Violation cameras should be placed and controlled so that specific views of the violation may be obtained without occlusion of the violating vehicle by geographic features, buildings, or other vehicles. Violation cameras may further be placed in any positions which permit capturing the light signal as seen by the violator when approaching the intersection, the front of the violating vehicle, the rear of the violating vehicle, the violating vehicle as it crosses the relevant stop line and/or violation line (see below), and/or the overall traffic context in which the violation occurred.

Violation lines 28*a*, 28*b*, 32*a* and 32*b* are virtual, configurable, per-lane lines located beyond the actual stop lines for their respective lanes. Violation lines are used in the disclosed system to filter out recording and/or reporting of non-violation events, such as permitted right turns during a red light. Accordingly, in the illustrative embodiment of FIG. 1, the violation lines 28*b* and 32*a*, corresponding respectively to lanes 4 and 1 of main street 10, are angled such that they are not crossed by a vehicle which is turning right from main street 10 onto center street 12. Additionally, violation lines 28*a* and 32*b* are shown configured beyond the stop lines of their respective lines, thus permitting the present system to distinguish between vehicles which merely cross over stop line by an inconsequential amount, and those which cross well over the stop line and into the intersection itself during a red light phase. Violation lines are maintained in an internal representation of the intersection that is generated and referenced, for example, by software processes executing in the disclosed roadside station.

The violation lines 28 and 32 are completely configurable responsive to configuration data provided by an installer, system manager or user. Accordingly, while the violation lines 28*b* and 32*a* are shown as being angled in FIG. 1, they may otherwise be positioned with respect to the stop lines, for example in parallel with the stop lines. Thus, the violation lines 28 and 32 are examples of a general mechanism by which may be used to adjust for specific geographic properties of a particular intersection, and to provide information that can be used to filter out certain non-violation events.

For purposes of illustration, the prediction cameras 16 and 18, as well as the violation cameras 20 and 22, are "pan-tilt-zoom" (PTZ) video cameras, for example conforming with the NTSC (National Television System Committee) or PAL (Phase Alternation Line) video camera standards. While the illustrative embodiment of FIG. 1 employs PTZ type cameras, some number or all of the violation cameras or prediction cameras may alternatively be fixed-position video cameras. For purposes of illustration, the prediction cameras 16 and 18 are shown mounted over the intersection above the traffic signals in FIG. 1, while the violation cameras 20 and 22 are mounted over the intersection by separate poles. The prediction cameras 16 and 18 may, for example, be mounted at a height 30 feet above the road surface. Any specific mounting mechanism for the cameras may be selected depending on the specific characteristics and requirements of the intersection to be monitored.

Figure 2:
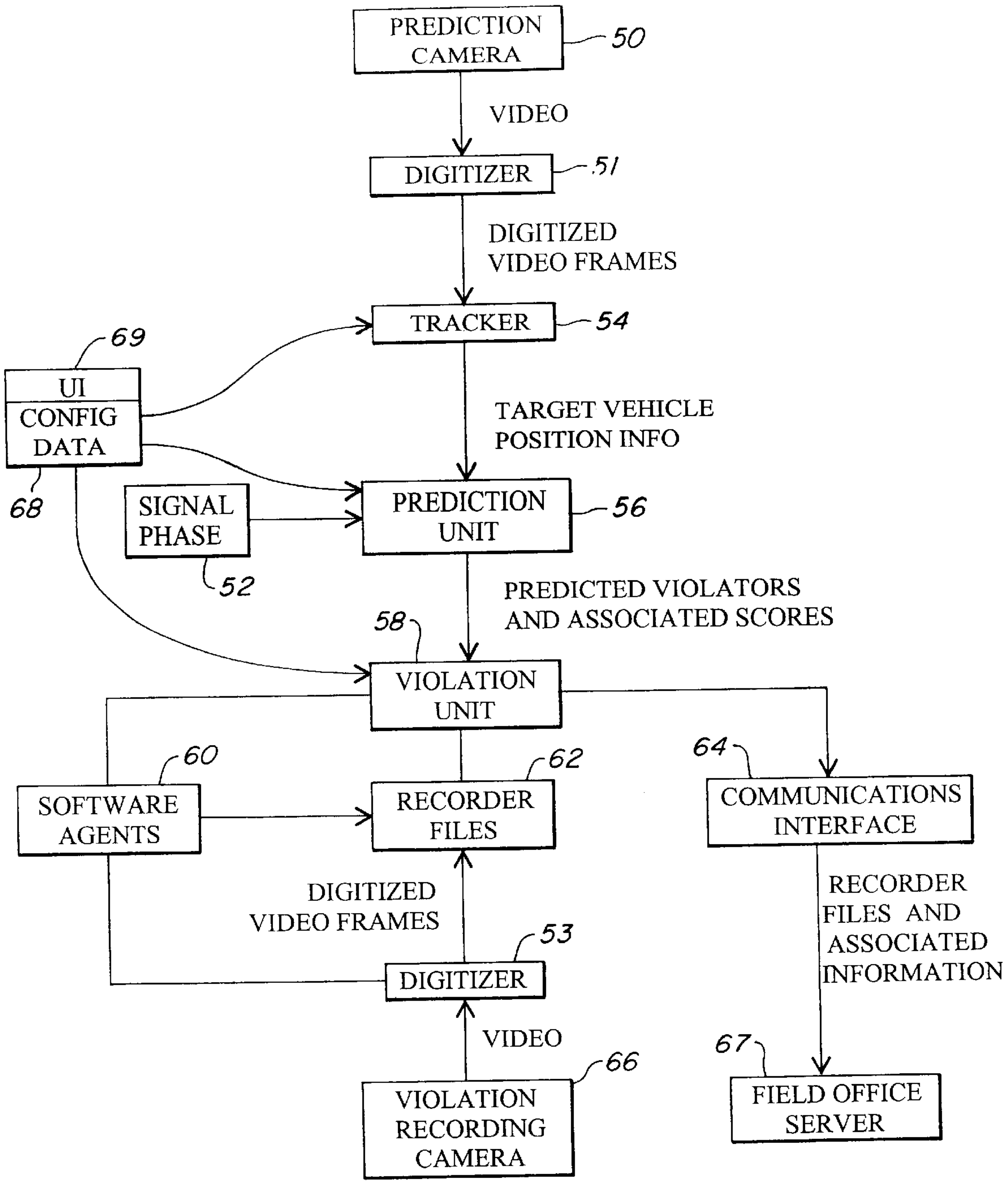
FIG. 2 is a block diagram showing operation of components in an illustrative embodiment of the disclosed roadside station.

FIG. 2 illustrates operation of components in an illustrative embodiment of the disclosed roadside station. As shown in FIG. 2, a prediction camera 50 provides video to a digitizer 51. The digitizer 51 outputs digitized video frames to a tracker 54. The tracker 54 processes the digitized video frames to identify objects in the frames as vehicles, together with their current locations. The tracker 54 operates, for example, using a reference frame representing the intersection under current lighting conditions without any vehicles, a difference frame showing differences between a recently received frame and a previous frame, and a current frame showing the current vehicle locations. For each of the vehicles it identifies ("target vehicles"), the tracker 54 generates a target vehicle identifier, together with current position information.

Target vehicle identification and position information is passed from the tracker 54 to the prediction unit 56 on a target by target basis. The prediction unit 56 processes the target vehicle information from the tracker 54, further in response to a current light phase received from a signal phase circuit 52. The prediction unit 56 determines whether any of the target vehicles identified by the tracker 54 are predicted violators. The prediction unit 56 may generate a message or messages for the violation unit 58 indicating the identity of one or more predicted violators together with associated violation prediction scores. The violation unit 56 receives the predicted violator identifiers and associated violation prediction scores, and schedules resources used to record one or more relatively high probability violation events. The violation unit 58 operates using a number of software agents 60 that control a set of resources. Such resources include one or more violation cameras 66 which pass video streams to a digitizer 53, in order to obtain digitized video frames or storage within one or more recorder files 62. The recorder files 62 are produced by recorders consisting of one or more digitizers such as the digitizer 53 and one or more associated software agents. The violation unit 58 further controls a communications interface 64, through which recorder files and associated violation event information may be communicated to a field office server system.

Configuration data 68 may be wholly or partly input by a system administrator or user through the user interface 69. The contents of the configuration data 68 may determine various aspects of systems operation, and are accessible to system components including the tracker 54, prediction unit 56, and/or violation unit 58 during system operation.

In the illustrative embodiment of FIG. 2, the signal phase circuit 52 is part of, or interfaced to, a traffic control box associated with the traffic light at the intersection being monitored. The prediction unit 56, violation unit 58, and software agents 60, may be software threads, such as execute in connection with the Windows NT™ computer operating system provided by Microsoft Corporation on one of many commercially available computer processor platforms including a processor and memory. The configuration data user interface 69 is, for example, a graphical user interface (GUI), which is used by a system administrator to provide the configuration data 68 to the system.

The recorder files 62 may, for example, consist of digitized video files, each of which include one or more video clips of multiple video frames. Each recorder file may also be associated with an indexer describing the start and end points of each video clip it contains. Other information associated with each clip may indicate which violation camera was used to capture the clip. The violation unit 58 provides recorder file management and video clip sequencing within each recorder file for each violation. Accordingly, the video clips of each recorder file may be selected by the violation unit to provide an optimal view or views of the violating vehicle and surrounding context so that identification information, such as a license plate number, will be available upon later review.

Operation of the components shown in FIG. 2 is now further described with reference to the flow chart of FIG. 3. At step 70, the violation unit receives one or more violation predictions from the prediction unit. The violation unit selects one of the predicted violation events for recording. At step 71, the violation unit tells a violation capturing device, for example by use of a software agent, to capture a front view of the predicted violator. At step 72 the violation capturing device is focused on a view to be captured, and which is calculated to capture the front of the predicted violator. At step 73, the violation capturing device captures the front view that it focused on in step 72, for a period of time also calculated to capture an image of the front of the violating vehicle as it passes.

Figure 3:
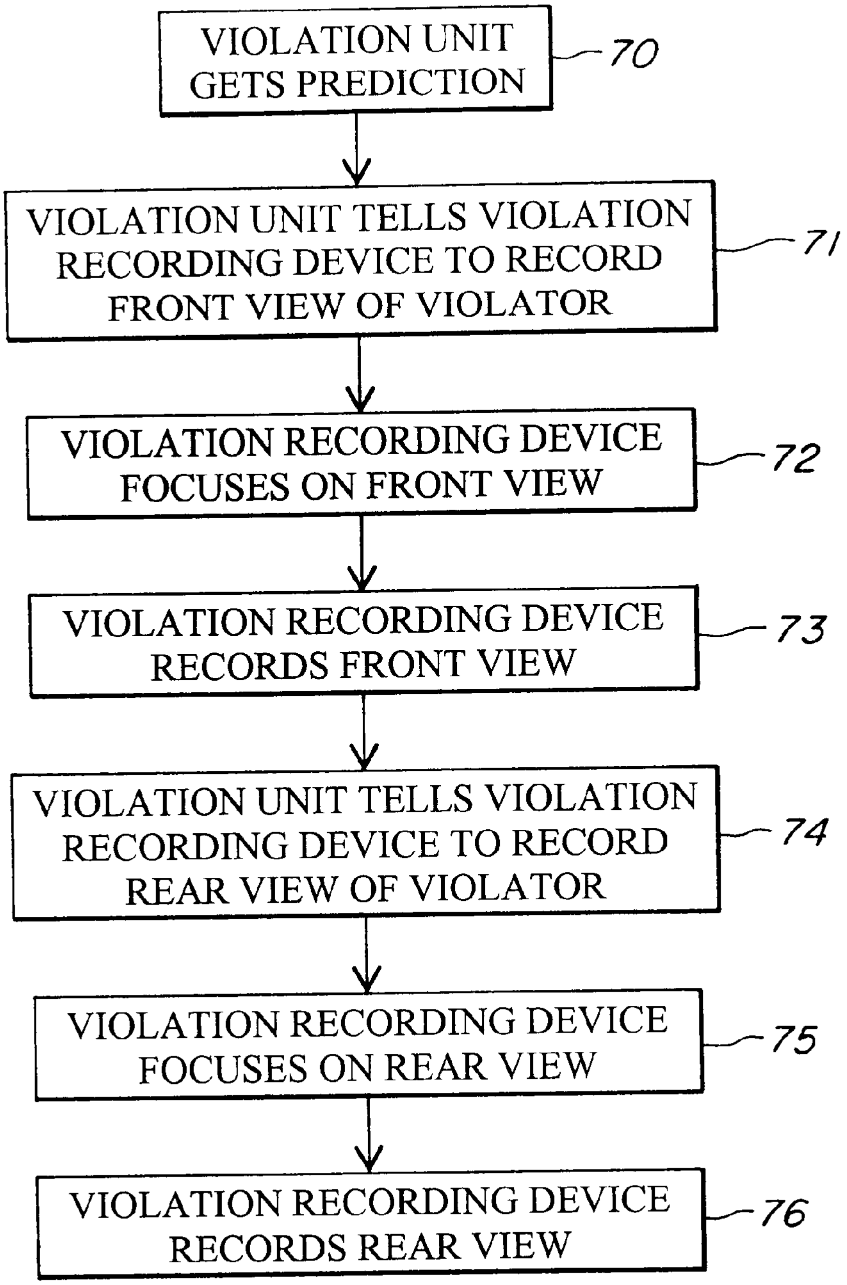
FIG. 3 is a flow chart showing steps performed during operation of an illustrative embodiment of the disclosed roadside station.

At step 74 of FIG. 3, the violation unit tells the violation capturing device, for example by way of a software agent, to capture a rear view of the violating vehicle. As a result, at step 75, the violation capturing device focuses on another view, selected so as to capture a rear view of the violating vehicle. The violation capturing device then records the view on which it focused at step 75 for a specified time period at step 76 calculated to capture an image of the rear of the violating vehicle.

Figure 4:
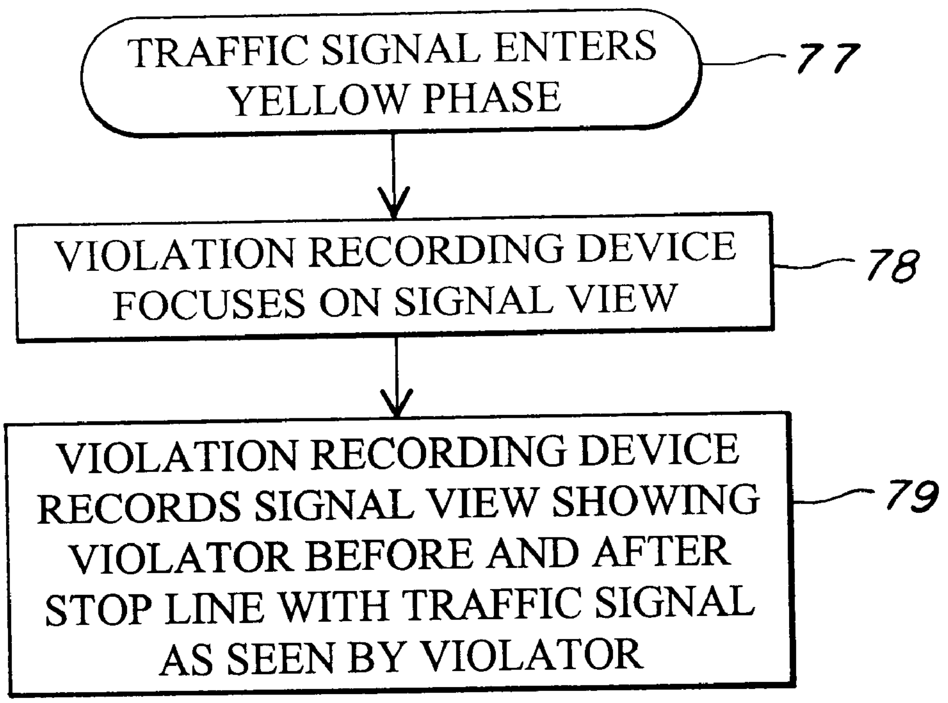
FIG. 4 is a flow chart further illustrating steps performed during operation of an illustrative embodiment of the disclosed roadside unit.

The steps shown in the flow chart of FIG. 4 further illustrate operation of the components shown in FIG. 2. The steps shown in FIG. 2 show how in an illustrative embodiment, the disclosed system captures a signal view beginning each time the traffic light for the traffic flow being monitored enters a yellow light phase. If no violation is predicted for the ensuing red light phase, then the signal view recorded in the steps of FIG. 4 is discarded. Otherwise, the signal view recorded by the steps of FIG. 4 may be stored in a recorder file and associated with the predicted violation.

At step 77 of FIG. 4, an indication is received that a traffic signal for the monitored intersection has entered a yellow phase. Alternatively, where the light has no yellow phase, the indication received at step 77 may be that there is less than a specified minimum time remaining in a current green light. In response to such an indication, at step 78 the disclosed system controls a violation image capturing device to focus on a signal view, including a view of the traffic signal that has entered the yellow phase, as well as areas in the intersection before and after the stop line for traffic controlled by the traffic signal. At step 79, the violation image capturing device records a signal view video clip potentially showing a violator of a red light phase in positions before and after the stop line for that traffic signal, in combination with the traffic signal as would be seen by the operator of any such violating vehicle while the vehicle crossed the stop line.

Figure 5:
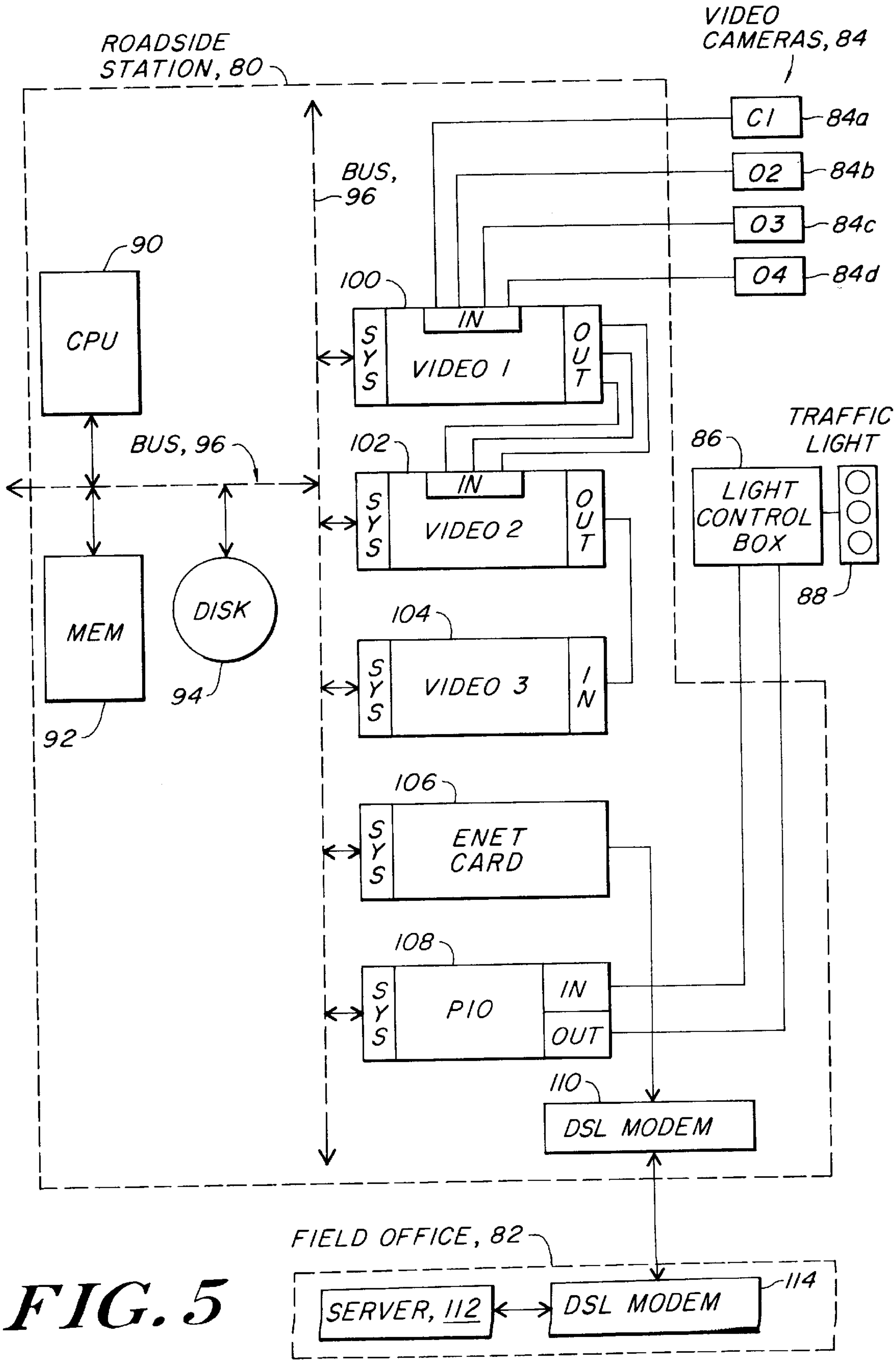
FIG. 5 is a block diagram showing hardware components in an illustrative embodiment of the disclosed roadside unit and a field office.

FIG. 5 shows an illustrative embodiment of hardware components in a roadside station 80, which is placed in close proximity to an intersection being monitored. A field office 82 is used to receive and store violation information for review and processing. The roadside station 80 is shown including a processor 90, a memory 92, and a secondary storage device shown as a disk 94, all of which are communicably coupled to a local bus 96. The bus 96 may include a high-performance bus such as the Peripheral Component Interconnect (PCI), and may further include a second bus such as an Industry Standard Architecture (ISA) bus.

Three video controller cards 100, 102 and 104 are shown coupled to the bus 96. Four video cameras 84 pass respective video streams to the input of the first video controller card 100. The video cameras 84, for example, include two prediction cameras and two violation cameras. The first video card 100 selectively outputs three streams of video to the second video controller card 102, which in turn selectively passes a single video stream to the third video controller card 104. During operation, the three video controller cards digitize the video received from the video cameras into video frames by performing MJPEG (Motion Joint Photographic Expert Group) video frame capture, or other frame capture method. The captured video frames are then made available to software executing on the CPU 90, for example, by being stored in the memory 92. Software executing on the processor 90 controls which video streams are passed between the three video controller cards, as well as which frames are stored in which recorder files within the memory 92 and/or storage disk 94. Accordingly, the video card 100 is used to multiplex the four video streams at its inputs onto the three video data streams at its outputs. Similarly, the video card 102 is used to multiplex the three video streams at its inputs onto the one video stream at its outputs. In this way, one or more composite recorder files may be formed in the memory 92 using selected digitized portions of the four video streams from the video cameras 84. Further during operation of the components shown in FIG. 3, the current phase of the traffic light 88 is accessible to software executing on the processor 90 by way of the I/O card 108, which is coupled to a traffic control box 86 associated with the traffic light 88. Software executing on the processor 90 may further send messages to the field office 82 using the Ethernet card 106 in combination with the DSL modem 110. Such messages may be received by the field office through the DSL modem 114, for subsequent processing by software executing on a server system 112, which includes computer hardware components such as a processor and memory.

Figure 6:
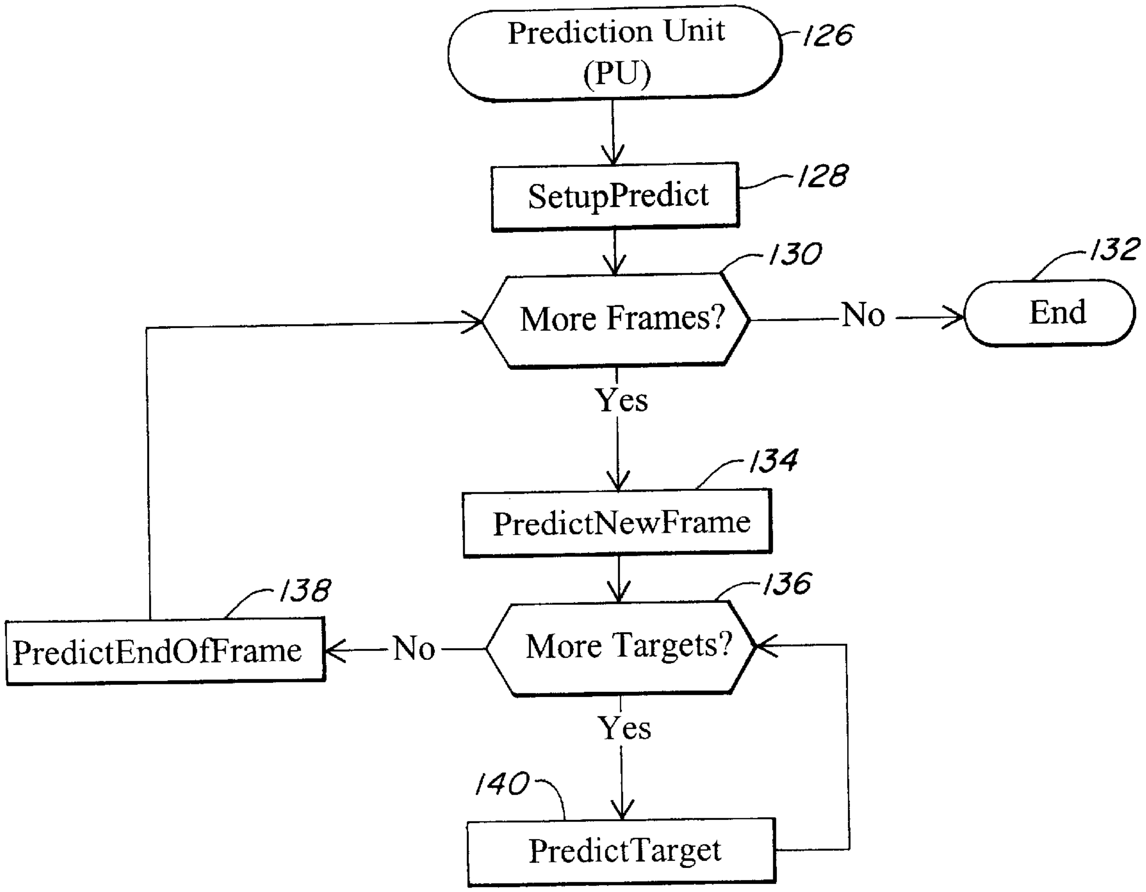
FIG. 6 is a flow chart showing steps performed during operation of an illustrative embodiment of the disclosed prediction unit.

FIG. 6 shows steps performed during operation of an illustrative embodiment of a prediction unit, such as the prediction unit 56 as shown in FIG. 2. At step 126, the prediction unit begins execution, for example, after configuration data has been entered to the system by a system administrator. Such configuration data may control aspects of the operation of the prediction unit relating to the layout of lane boundaries, stop lines, violation lines, and other geographic properties of the intersection, as well as to filters which are to be used to reduce the number of potential violation events that are recorded and/or reported to the field office. At step 128 the prediction unit performs setup activities related to the specific intersection being monitored as specified within the configuration data. At step 130, the prediction unit determines whether there are video frames that have been captured from a video stream received from a prediction camera, processed by the tracker, and reported to the prediction unit. If all currently available frames have previously been processed in the prediction unit, then step 130 is followed by step 132, and the prediction unit ends execution. If more frames are available to be processed, then step 130 is followed by step 134, in which the prediction unit performs the steps shown in FIG. 8.

The prediction unit processes each target vehicle reported by the tracker for a given video frame individually. Accordingly, at step 136, the prediction unit determines if there are more target vehicles to be analyzed within the current frame, and performs step 140 for each such target vehicle. In step 140, the prediction unit determines whether each target vehicle identified by the tracker within the frame is a predicted violator, as is further described with reference to FIG. 9. After all vehicles within the frame have been analyzed, end of frame processing is performed at step 138, described in connection with FIG. 10. Step 138 is followed by step 130, in which the prediction unit again checks if there is target vehicle information received from the tracker for a newly processed frame to analyze.

Figure 7:
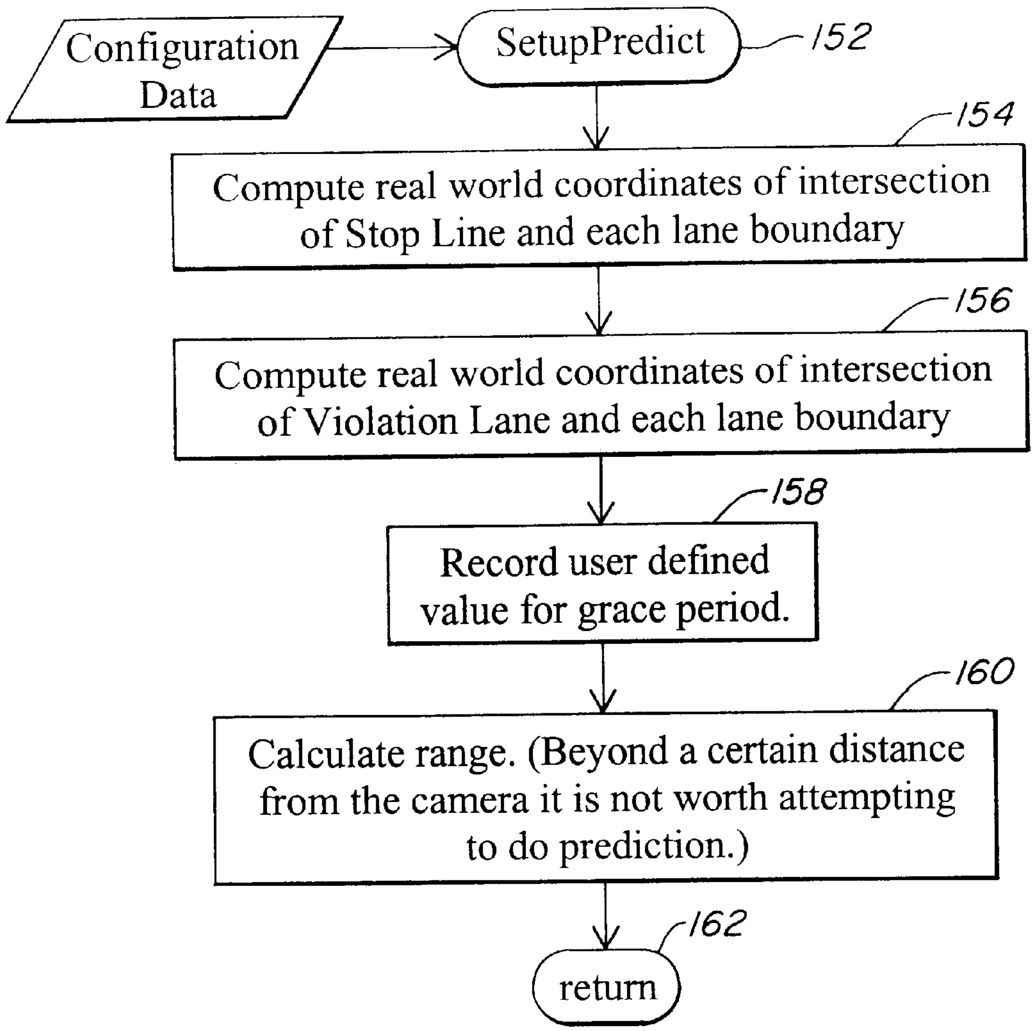
FIG. 7 is a flow chart showing steps performed during setup of an illustrative embodiment of the disclosed prediction unit.

FIG. 7 shows steps performed by the prediction unit in order to set up the prediction unit as would be done at step

128 in FIG. 6. At step 152, the prediction unit receives configuration data 150. The remaining steps shown in FIG. 7 are performed in response to the configuration data 150. At step 154 the prediction unit computes coordinates, relative to an internal representation of the intersection being monitored, of intersections of one or more stop lines and respective lane boundaries. These line intersection coordinates may be used by the prediction unit to calculate distances between target vehicles and the intersection stop lines. Similarly, at step 156, the prediction unit computes coordinates of intersections between one or more violation lines and the respective lane boundaries for the intersection being monitored, so that it can calculate distances between target vehicles and the violation lines.

At step 158 of FIG. 7, the prediction unit records a user defined grace period from the configuration data 150. The grace period value defines a time period following a light initially turning red during which a vehicle passing through the light is not to be considered in violation. For example, a specific intersection may be subject to a local jurisdiction policy of not enforcing red light violations in the case where a vehicle passes through the intersection within 0.3 seconds of the signal turning red. Because the grace period is configurable, another intersection could employ a value of zero, thereby treating all vehicles passing through the red light after it turned red as violators.

At step 160 the prediction unit calculates a prediction range within which the prediction unit will attempt to predict violations. The prediction range is an area of a lane being monitored between the prediction camera and a programmable point away from the prediction camera, in the direction of traffic approaching the intersection. Such a prediction range is predicated on the fact that prediction data based on vehicle behavior beyond a certain distance from the prediction camera is not reliable, at least in part because there may be sufficient time for the vehicle to respond to a red light before reaching the intersection. At step 162, the set up of the prediction unit is complete, and the routine returns.

Figure 8:
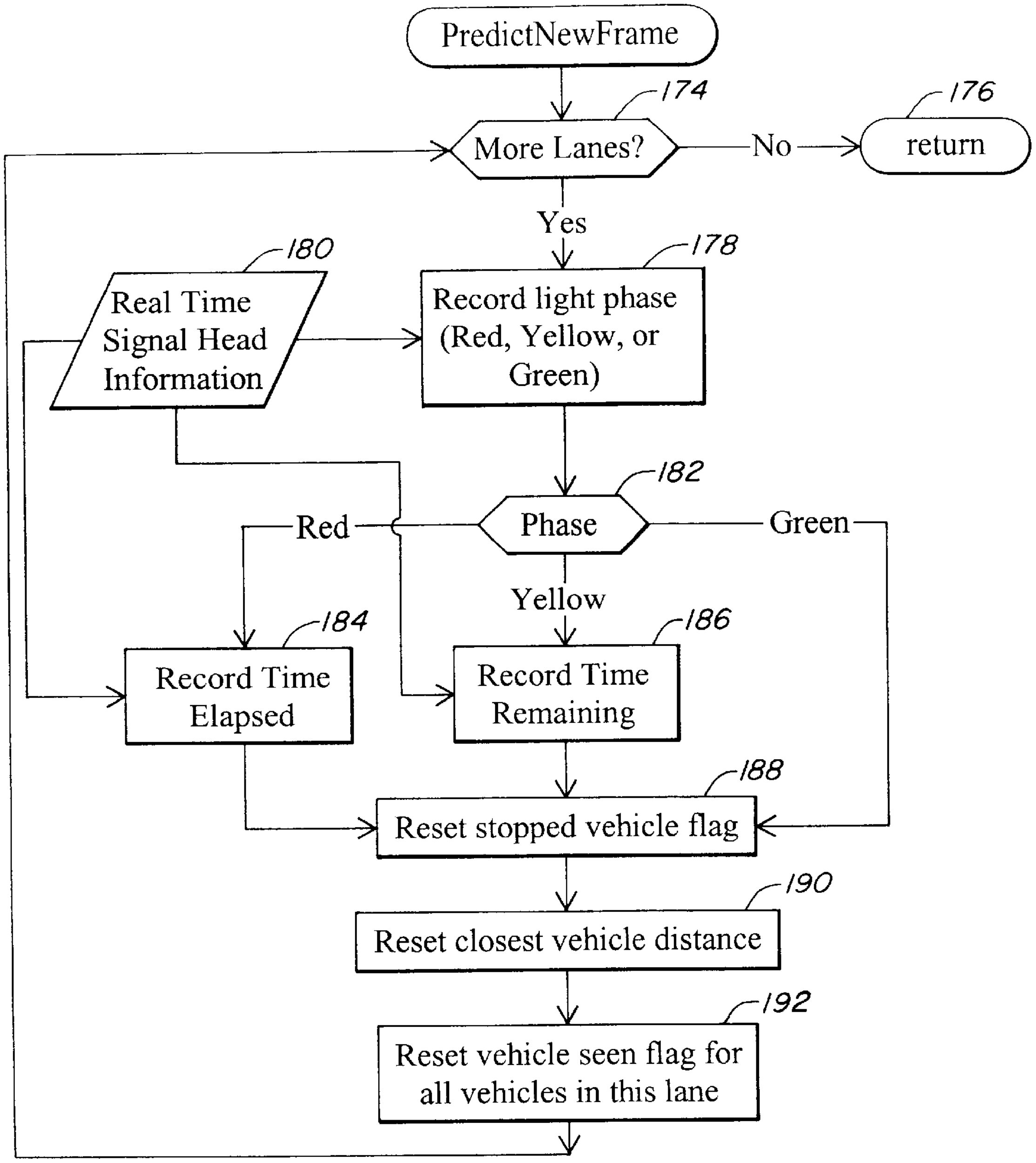
FIG. 8 is a flow chart showing steps performed by an illustrative embodiment of the disclosed prediction unit to initialize variables upon receipt of target vehicle information associated with a new video frame.

FIG. 8 shows steps performed by the prediction unit in response to receipt of indication from the tracker that a new video frame is ready for processing. The tracker may provide information regarding a number of identified target vehicles identified within a video frame, such as their positions. Within the steps shown in FIG. 8, the prediction unit initializes various variables used to process target vehicle information received from the tracker. The steps of FIG. 8 correspond to step 134 as shown in FIG. 6. In the steps of FIG. 8, the prediction unit processes each lane independently, since each lane may be independently controlled by its own traffic signal. Accordingly, at step 174 the prediction unit determines whether all lanes have been processed. If all lanes have been processed, the initial processing is complete, and step 174 is followed by step 176. Otherwise, the remaining steps in FIG. 8 are repeated until all lanes have been processed.

At step 178, the prediction unit records the current light phase, in response to real time signal information 180, for example from the traffic control box 86 as shown in FIG. 5. At step 182, the prediction unit branches in response to the current light phase, going to step 184 if the light is red, step 186 if the light is yellow, and to step 188 if the light is green.

At step 184 the prediction unit records the time elapsed since the light turned red, for example in response to light timing information from a traffic control box. At step 186 the prediction unit records the time remaining in the current yellow light phase before the light turns red. At step 188 the prediction unit resets a "stopped vehicle" flag associated with the current lane being processed. A per-lane stopped vehicle flag is maintained by the prediction unit for each lane being monitored. The prediction unit sets the per-lane stopped vehicle flag for a lane when it determines that a target vehicle in the lane has stopped or will stop. This enables the prediction unit to avoid performing needless violation predictions on target vehicles behind a stopped vehicle.

At step 190 the prediction unit resets a closest vehicle distance associated with the current lane, which will be used to store the distance from the stop line of a vehicle in the current lane closest to the stop line. At step 192 the prediction unit resets a "vehicle seen" flag for each target vehicle in the current lane being processed, which will be used to store an indication of whether each vehicle was seen by the tracker during the current frame.

Figure 9:
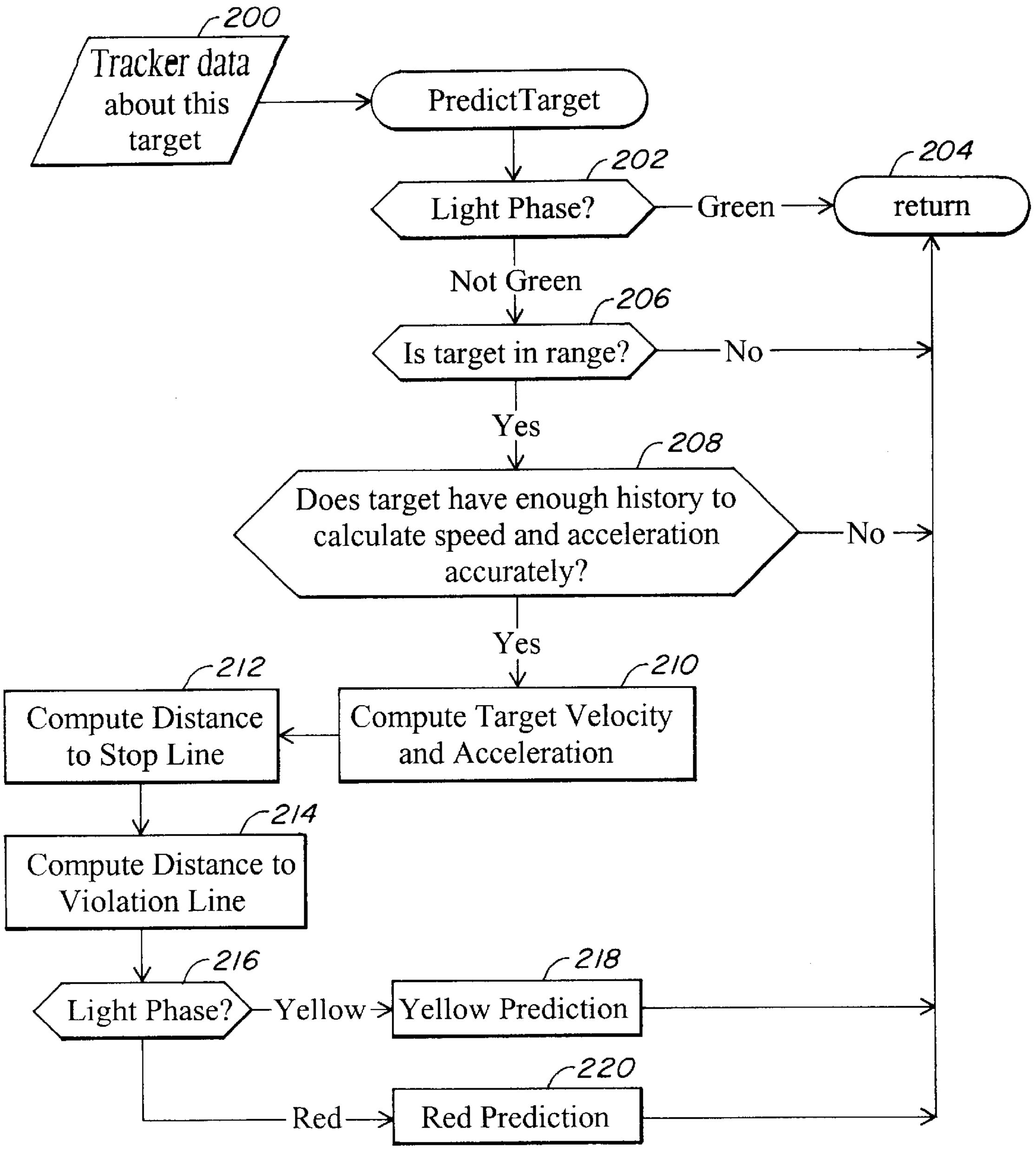
FIG. 9 is a flow chart showing steps performed by an illustrative embodiment of the disclosed prediction unit to predict whether a vehicle will violate a red light.

FIG. 9 illustrates steps performed by the prediction unit to predict whether a target vehicle is likely to commit a red light violation. The steps of FIG. 9 correspond to step 140 in FIG. 6, and are performed once for each target vehicle identified by the tracker within a current video frame. The steps of FIG. 9 are responsive to target vehicle information 200, including target identifiers and current position information, provided by the tracker to the prediction unit. At step 202, the prediction unit obtains the current light phase, for example as recorded at step 178 in FIG. 8. If the current light phase is green, then step 202 is followed by step 204. Otherwise, step 202 is followed by step 206. At step 206, the prediction unit determines whether the target vehicle is within the range calculated at step 160 in FIG. 7. If so, step 206 is followed by step 208. Otherwise, step 206 is followed by step 204. At step 208 of FIG. 9, the prediction unit determines whether there is sufficient positional history regarding the target vehicle to accurately calculate speed and acceleration values. For example, the amount of positional history required to accurately calculate a speed for a target vehicle may be expressed as a number of frames in which the target vehicle must have been seen since it was first identified by the tracker. For example, the disclosed system may, for example, only perform speed and acceleration calculations on target vehicles which have been identified in a minimum of 3 frames since they were initially identified.

If sufficient prediction history is available to calculate speed and acceleration values for the target vehicle, step 208 is followed by step 210. Otherwise, step 208 is followed by step 204. At step 210, the prediction unit computes and stores updated velocity and acceleration values for the target vehicle. Next, at step 212, the prediction unit computes and updates a distance remaining between the target vehicle and the stop line for the lane in which the target vehicle is travelling. At step 214, the prediction unit computes a remaining distance between the position of the target vehicle in the current video frame and the violation line for the lane. At step 216, the prediction unit determines whether the current light phase, as recorded at step 178 in FIG. 8, is yellow or red. If the recorded light phase associated with the frame is yellow, a yellow light prediction algorithm is performed at step 218. Otherwise, if the recorded light phase is red, a red light prediction algorithm is performed at step 220. Both steps 218 and 220 are followed by step 204, in which the PredictTarget routine shown in FIG. 9 returns to the control flow shown in FIG. 6.

Figure 10:
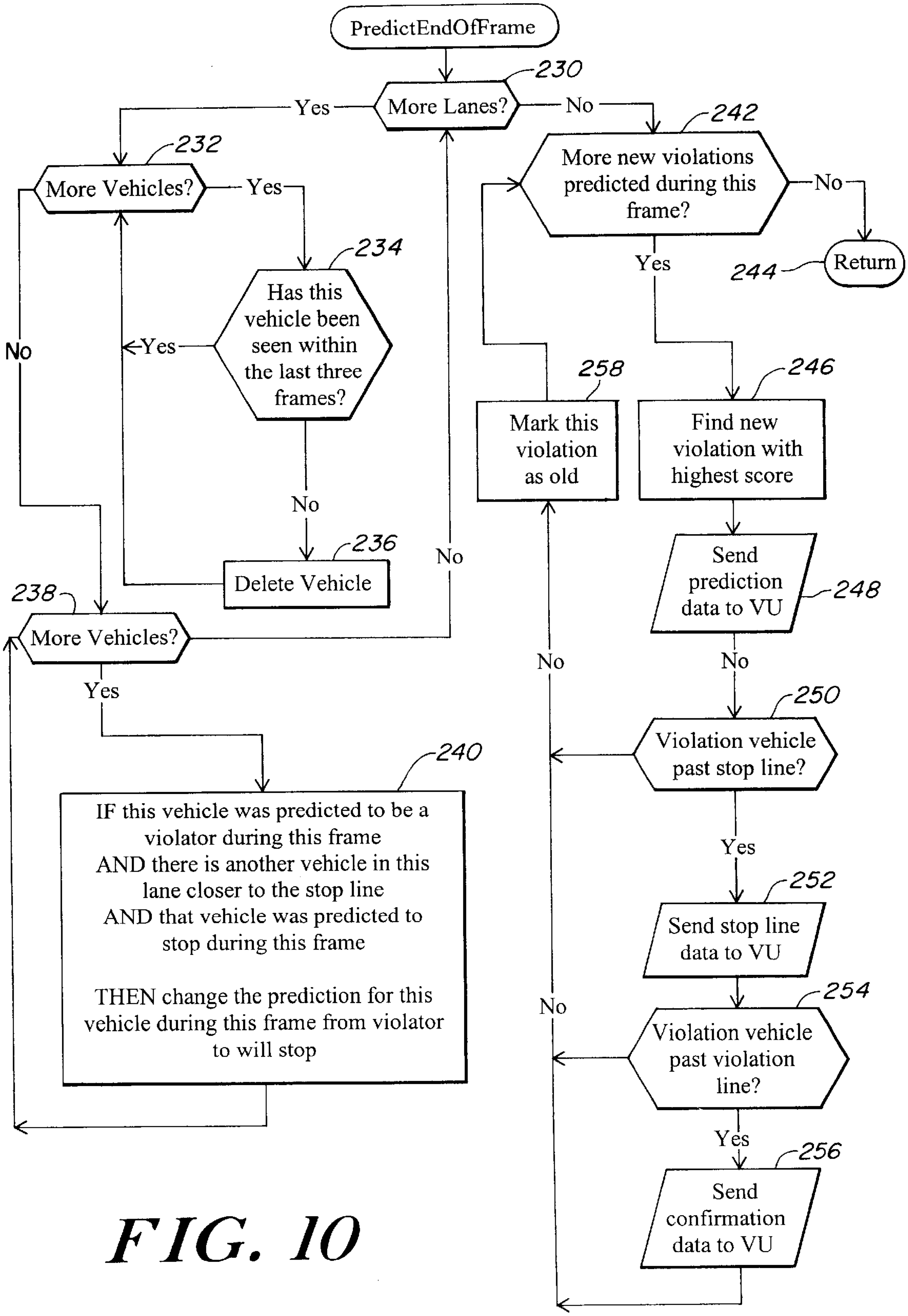
FIG. 10 is a flow chart showing steps performed by an illustrative embodiment of the disclosed prediction unit to process target vehicle information associated with a video frame.

FIG. 10 shows steps performed by the prediction unit to complete processing of a video frame, as would occur in step 138 of FIG. 6. The steps of FIG. 10 are performed for each lane being monitored. Accordingly, at step 230 of FIG. 10, the prediction unit determines whether all lanes being monitored have been processed. If so, step 230 is followed by step 242. Otherwise, step 230 is followed by step 232. At step 232, the prediction unit determines whether there are more target vehicles to process within the current lane being processed. If so, step 232 is followed by step 234, in which the prediction unit determines whether the next target vehicle to be processed has been reported by the tracker within the preceding three video frames. If a target vehicle has not been reported by the tracker as seen during the last three video frames, then the prediction unit determines that no further processing related to that target vehicle should be performed. A previously seen target vehicle may not be seen within three video frames because the tracker has merged that target vehicle with another target vehicle, or renamed the target vehicle, because the target vehicle has made a permitted right turn, or for some other reason. In such a case, at step 236 the prediction unit deletes any information related to the target vehicle. Otherwise, step 234 returns to step 232 until all vehicles within the current lane have been checked to determine whether they have been seen within the last three video frames. After information related to all vehicles which have not been seen within the last three video frames has been deleted, step 232 is followed by step 238.

At steps 238 and 240, the prediction unit determines whether any vehicle in the current lane being processed was predicted to be a violator during processing of the current video frame. If so, and if there is another vehicle in the same lane between the predicted violator and the stop line, and the other vehicle was predicted to stop before the stop line during processing of the current video frame, then the prediction unit changes the violation prediction for the predicted violator to indicate that the previously predicted violator will stop.

After all lanes being monitored have been processed, as determined at step 230, the prediction unit performs a series of steps to send messages to the violation unit regarding new violation predictions made while processing target vehicle information associated with the current video frame. The prediction unit sends messages regarding such new violation predictions to the violation unit in order of highest to lowest associated violation score, and marks each predicted violator as "old" after a message regarding that target vehicle has been sent to the violation unit. Accordingly, at step 242, the prediction unit determines whether there are more new violation predictions to be processed by steps 246 through 258. If not, then step 242 is followed by step 244, in which the PredictEndOfFrame routine returns to the main prediction unit flow as shown in FIG. 6. Otherwise, at step 246, the prediction unit identifies a target vehicle with a new violation prediction, and having the highest violation score of all newly predicted violators which have not yet been reported to the violation unit. Then, at step 248, the prediction unit sends a message to the violation unit identifying the target vehicle identified at step 248, and including the target vehicle ID and associated violation score. At step 250, the prediction unit determines whether the target vehicle identified in the message sent to the violation unit at step 248 has traveled past the stop line of the lane in which it is travelling. If not, then step 250 is followed by step 258, in which the violation prediction for the target vehicle identified at step 246 is marked as old, indicating that the violation unit has been notified of the predicted violation. Otherwise, at step 252, the prediction unit sends a message to the violation unit indicating that the target vehicle identified at step 246 has passed the stop line of the lane in which it is travelling. Next, at step 254, the prediction unit determines whether the target vehicle identified at step 246 has traveled past the violation line of the lane in which it is travelling. If not, then the prediction unit marks the violation prediction for the target vehicle as old at step 258. Otherwise, at step 256, the prediction unit sends a confirmation message to the violation unit, indicating that the predicted violation associated with the target vehicle identified at step 246 has been confirmed. Step 256 is followed by step 258.

Figure 11:
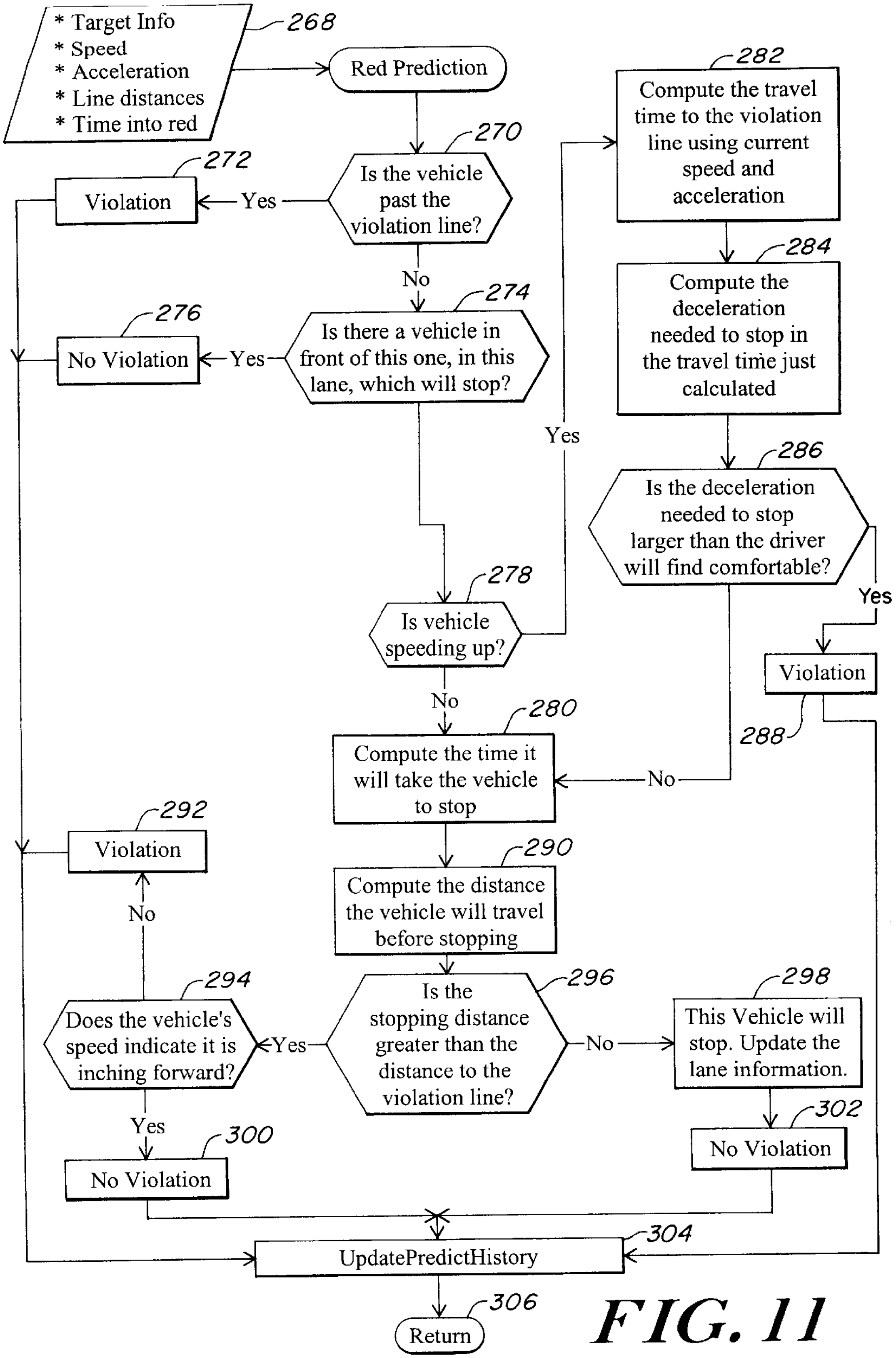
FIG. 11 is a flow chart showing steps performed by an illustrative embodiment of the disclosed prediction unit to predict whether a target vehicle will violate a current red light.

FIG. 11 shows steps performed by the prediction unit to predict whether a target vehicle will commit a red light violation while processing a video frame during a red light phase. The steps of FIG. 11 are performed in response to inputs 268 for the target vehicle being processed, including position information from the tracker, as well as speed, acceleration (or deceleration), distance to stop and violation lines, and time into red light phase, as previously determined by the prediction unit in the steps of FIGS. 8 and 9. At step 270, the prediction unit determines whether the target vehicle has traveled past the violation line for the lane in which it is travelling. If so, then step 270 is followed by step 272, in which the prediction unit marks the target vehicle as a predicted violator. Otherwise, at step 274, the prediction unit determines whether there is another vehicle between the target vehicle and the relevant stop line, which the violation unit has predicted will stop prior to entering the monitored intersection. If so, then step 274 is followed by step 276, in which the prediction unit marks the target vehicle as a non-violator.

At step 278, the prediction unit determines whether the target vehicle is speeding up. Such a determination may, for example be performed by checking if the acceleration value associated with the target vehicle is positive or negative, where a positive value indicates that the target vehicle is speeding up. If the target vehicle is determined to be speeding up, step 278 is followed by step 282, in which the prediction unit computes the travel time for the target vehicle to reach the violation line of the lane in which it is travelling, based on current speed and acceleration values for the target vehicle determined in the steps of FIG. 9. Next, at step 284, the prediction unit computes an amount of deceleration that would be necessary for the target vehicle to come to a stop within the travel time calculated at step 282. The prediction unit then determines at step 286 whether the necessary deceleration determined at step 284 would be larger than a typical driver would find comfortable, and accordingly is unlikely to generate by application of the brakes. The comfortable level of deceleration may, for example, indicate a deceleration limit for a typical vehicle during a panic stop, or some other deceleration value above which drivers are not expected to stop. If the necessary deceleration for the target vehicle to stop is determined to be excessive at step 286, then step 286 is followed by step 288, in which the target vehicle is marked as a predicted violator. Otherwise, step 286 is followed by step 280.

At step 280, the prediction unit computes the time required for the target vehicle to stop, given its current speed and rate of deceleration. At step 290, the prediction unit computes the distance the target vehicle will travel before stopping, based on its current speed and deceleration. Next, at step 296, the prediction unit determines whether the distance the target vehicle will travel before stopping, calculated at step 290, is greater than the distance remaining between the target vehicle and the violation line for the lane in which the vehicle is travelling. If so, step 296 is followed by step 294. At step 294, the prediction unit determines whether the target vehicle's current speed is so slow that the target vehicle is merely inching forward. Such a determination may be made by comparing the target vehicle's current speed with a predetermined minimum speed. In this way, the disclosed system filters out violation predictions associated with target vehicles that are determined to be merely "creeping" across the stop and/or violation line. Such filtering is desirable to reduce the total number of false violation predictions. If the vehicle's current speed is greater than such a predetermined minimum speed, then step 294 is followed by step 292, in which the prediction unit marks the target vehicle as a predicted violator. Otherwise, step 294 is followed by step 300, in which the prediction unit marks the target vehicle as a non-violator. Step 300 is followed by step 304, in which the prediction unit updates the prediction history for the target vehicle, and then by step 306, in which control is passed to the flow of FIG. 9.

At step 298, the prediction unit predicts that the vehicle will stop prior to the violation line for the lane in which it is travelling. The prediction unit then updates information associated with the lane in which the target vehicle is travelling to indicate that a vehicle in that lane has been predicted to stop prior to the violation line. Step 298 is followed by step 302, in which the prediction unit marks the target vehicle as a non-violator.

Figure 12:
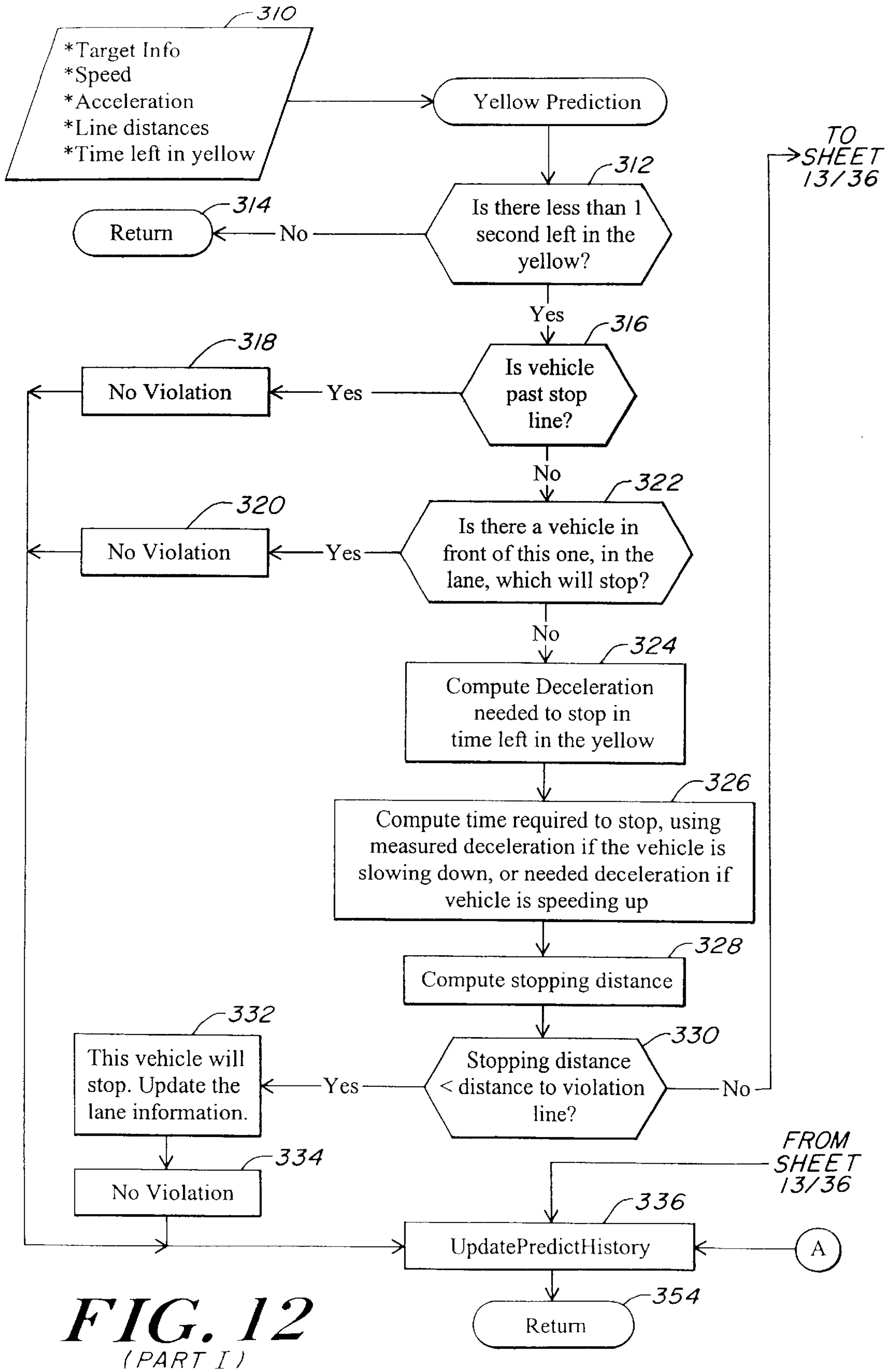
FIG. 12 is a flow chart showing steps performed by an illustrative embodiment of the disclosed prediction unit during a current yellow light to predict whether a target vehicle will violate an upcoming red light.
Figure 12:
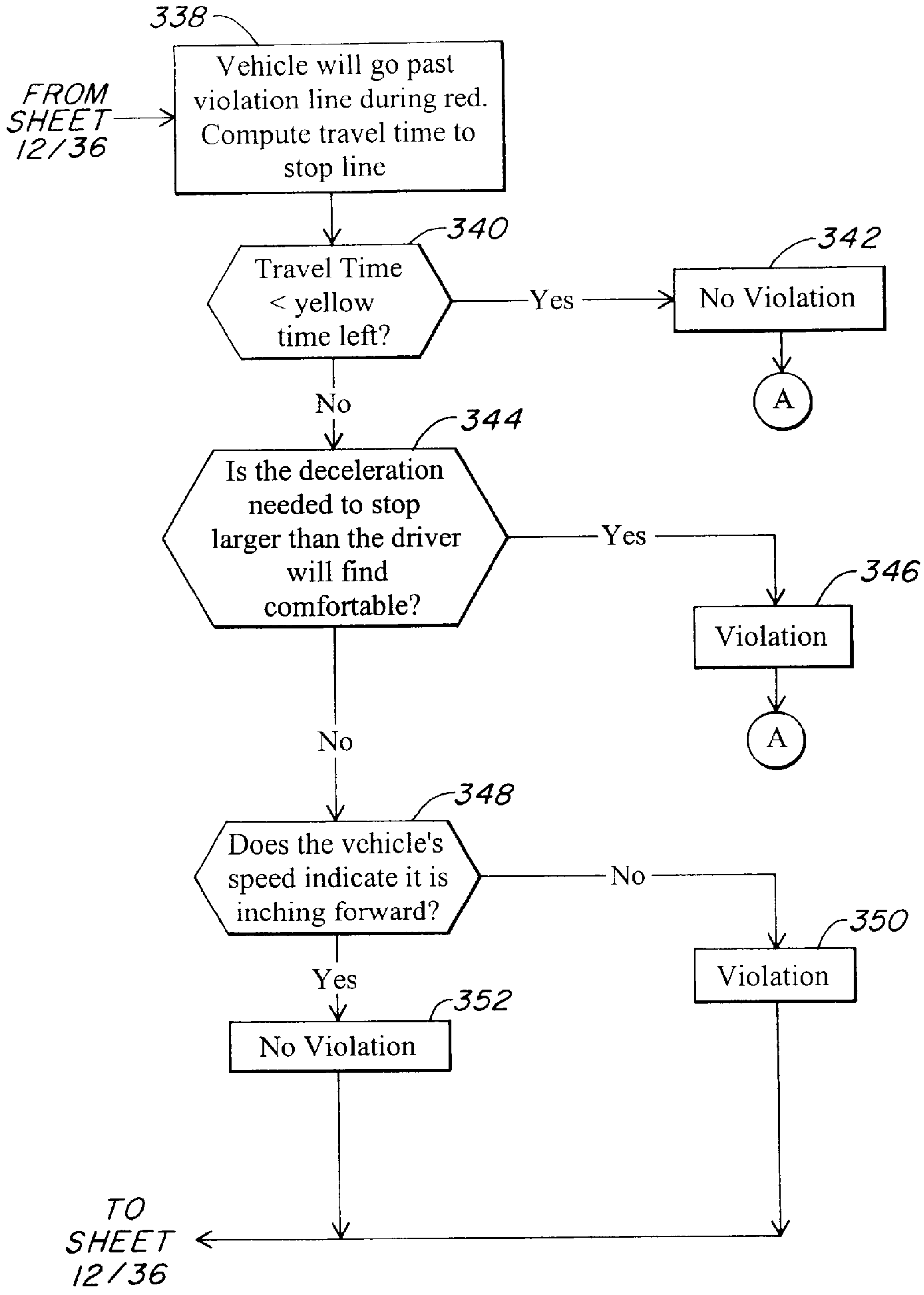

FIG. 12 shows steps performed by the prediction unit to process target vehicle information during a current yellow light phase, corresponding to step 218 as shown in FIG. 9. The steps of FIG. 12 are responsive to input information 310 for the target vehicle, including position information from the tracker, as well as speed, acceleration, line distances, and time remaining in yellow determined by the prediction unit in the steps of FIGS. 8 and 9. At step 312, the prediction unit determines whether there is less than a predetermined minimum time period, for example one second, remaining in the current yellow light phase. If not, step 312 is followed by step 314, in which control is passed back to the flow shown in FIG. 9, and then to the steps of FIG. 6. Otherwise, at step 316, the prediction unit determines whether the target vehicle has traveled past the stop line for the lane in which it is travelling. If so, then the target vehicle has entered the intersection during a yellow light phase, and at step 318 the prediction unit marks the target vehicle as a non-violator. If the target vehicle has not passed the stop line, then at step 322 the prediction unit determines whether another vehicle is in front of the target vehicle, between the target vehicle and the stop line, and which has been predicted to stop before the yellow light phase expires. In an illustrative embodiment, in which vehicles within a given lane are processed in order from the closest to the stop line to the furthest away from the stop line, when a first vehicle is processed that is predicted to stop before reaching the intersection, then a flag associated with the lane may be set to indicate that all vehicles behind that vehicle will also have to stop. In such an embodiment, such a "stopped vehicle" flag associated with the relevant lane may be checked at step 322. If such a stopped vehicle is determined to exist at step 322, then step 322 is followed by step 320, and the prediction unit marks the target vehicle as a non-violator. Otherwise, step 322 is followed by step 324, in which the prediction unit computes a necessary deceleration for the target vehicle to stop before the current yellow light phase expires, at which time a red light phase will begin. At step 326, the prediction unit computes a time required for the target vehicle to stop. The computation at step 326 is based on the current measured deceleration value if the vehicle is currently slowing down, or based on a calculated necessary deceleration if the vehicle is currently speeding up. At step 328, the prediction unit computes the stopping distance for the target vehicle, using the computed deceleration and time required to stop from steps 324 and 326.

At step 330, the prediction unit determines whether the stopping distance computed at 328 is less than the distance between the target vehicle and the violation line for the lane in which the target vehicle is travelling. If so, at step 332, the prediction unit determines that the vehicle will stop without a violation, and updates the lane information for the lane in which the target vehicle is travelling to indicate that a vehicle has been predicted to stop before the intersection in that lane. Then, at step 334, the prediction unit marks the target vehicle as a non-violator. Step 334 is followed by step 336, in which the prediction unit updates the prediction history for the target vehicle, as described further in connection with the elements of FIG. 13.

If, at step 330, the prediction unit determines that the stopping distance required for the target vehicle to stop is not less than the distance between the target vehicle and the violation line for the lane in which the target vehicle is travelling, then step 330 is followed by step 338. At step 338, the prediction unit computes a travel time that is predicted to elapse before the target vehicle will reach the stop line. Next, at step 340, the prediction unit determines whether the predicted travel time computed at step 338 is less than the time remaining in the current yellow light phase. If so, then step 340 is followed by step 342, in which the prediction unit marks the target vehicle as a non-violator. Step 342 is followed by step 336. If, on the other hand, at step 340 the prediction unit determines that the travel time determined at step 338 is not less than the time remaining in the current yellow light phase, then step 340 is followed by step 344.

In step 344 the prediction unit determines whether the deceleration necessary for the target vehicle to stop is greater than a specified deceleration value limit, thus indicating that the deceleration required is larger than the driver of the target vehicle will find comfortable to apply. The test at step 344 in FIG. 12 is the same as the determination at step 286 of FIG. 11. If the necessary deceleration is greater than the specified limit, then step 344 is followed by step 346, in which the prediction unit marks the target vehicle as a predicted violator. Otherwise, step 344 is followed by step 348, in which the prediction unit determines whether the target vehicle's speed is below a predetermined speed, thus indicating that the target vehicle is merely inching forward. The test at step 348 is analogous to the determination of 294 as shown in FIG. 11. If the target vehicle's speed is less than the predetermined speed, then step 348 is followed by step 352, in which the prediction unit marks the target vehicle as a non-violator. Otherwise, step 348 is followed by step 350, in which the prediction unit marks the target vehicle as a predicted violator. Step 350 is followed by step 336, which in turn is followed by step 354, in which control is passed back to the flow shown in FIG. 9.

Figure 13:
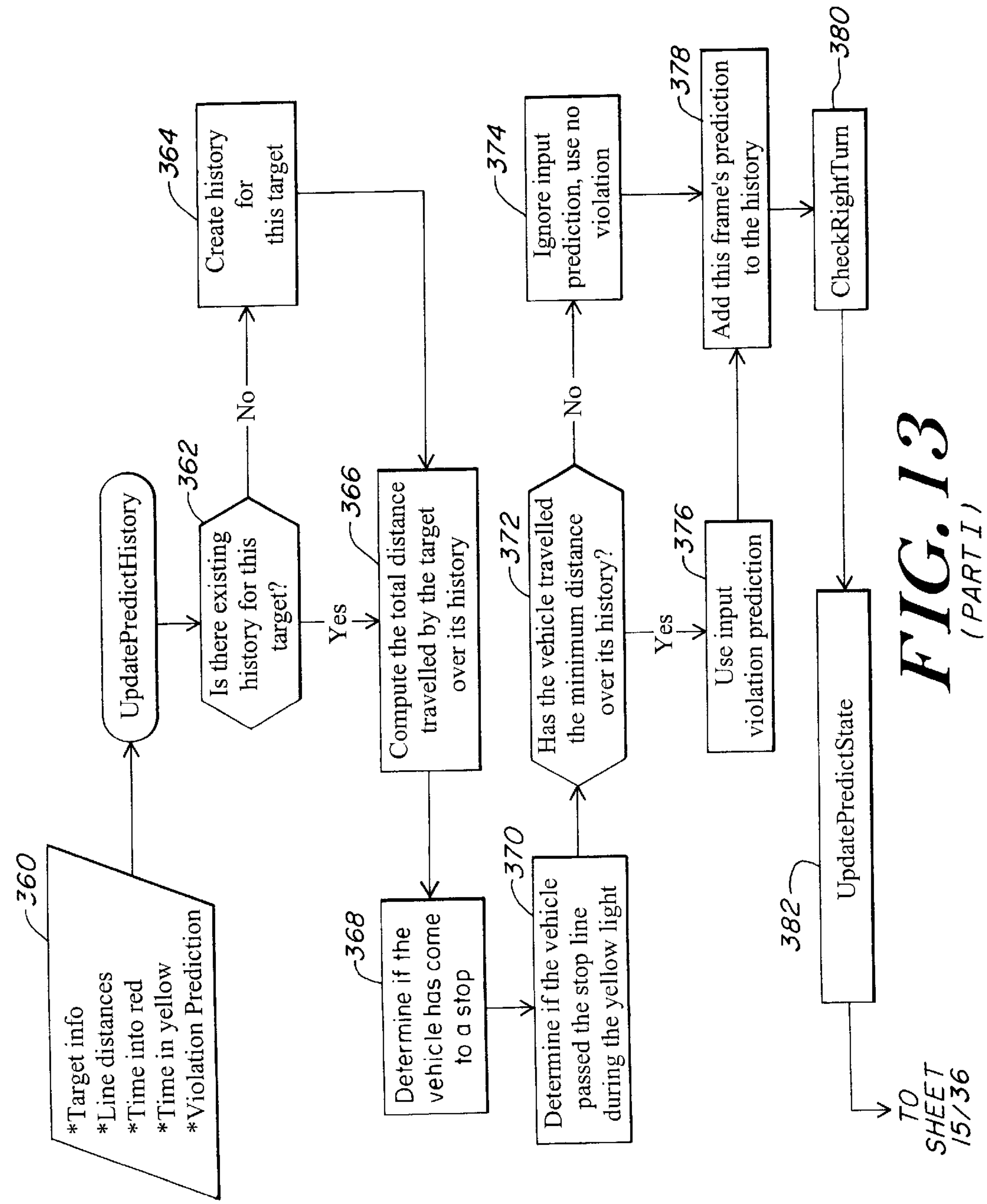
FIG. 13 is a flow chart showing steps performed by an illustrative embodiment of the disclosed prediction unit to update a violation prediction history of a target vehicle.
Figure 13:
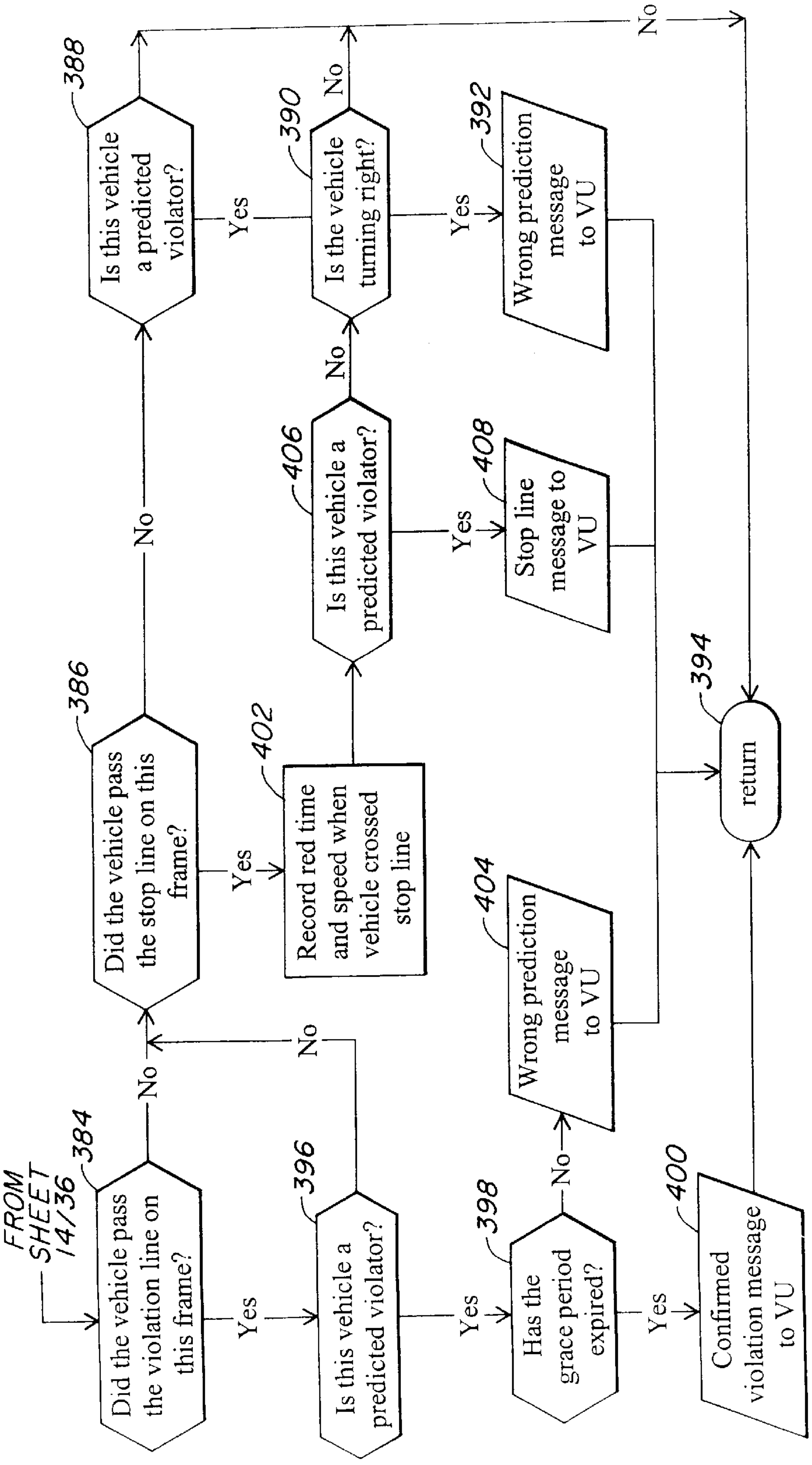

FIG. 13 shows steps performed by the prediction unit to update the prediction history of a target vehicle, as would be performed at step 304 of FIG. 11 and step 336 of FIG. 12. The steps of FIG. 13 are performed in response to input information 268, including target vehicle position information from the tracker, as well as line distances, time expired within a current red light phase, time remaining in a current yellow light phase, current violation prediction (violator or non-violator), and other previously determined violation prediction information determined by the prediction unit. At step 362, the prediction unit determines whether there is any existing prediction history for the target vehicle. If not, step 362 is followed by step 364, in which the prediction unit creates a prediction history data structure for the target vehicle, for example by allocating and/or initializing some amount of memory. Step 364 is followed by step 366. If, at step 362, the prediction unit determines that there is an existing prediction history for the current target vehicle, then step 362 is followed by step 366, in which the prediction unit computes the total distance traveled by the target vehicle over its entire prediction history. Step 366 is followed by step 368.

At step 368, the prediction unit determines whether the target vehicle has come to a stop, for example as indicated by the target vehicle's current position being the same as in a previous frame. A per target vehicle stopped vehicle flag may also be used by the prediction unit to determine if a permitted turn was performed with or without stopping. In the case where a permitted turn is performed during a red light phase and after a required stop, the prediction unit is capable of filtering out the event as a non-violation. If the vehicle is determined to have come to a stop, then the prediction unit further modifies information associated with the lane the target vehicle is travelling to indicate that fact. Step 368 is followed by step 370, in which the prediction unit determines if the target vehicle passed the stop line for the lane in which it is travelling. Next, at step 372, the prediction unit determines whether the target vehicle has traveled a predetermined minimum distance over its entire prediction history. If the target vehicle has not traveled such a minimum since it was first identified by the tracker, then step 372 is followed by step 374, in which the prediction unit marks the target vehicle as a non-violator, potentially changing the violation prediction from the input information 360.

Step 374 is followed by step 378, in which the prediction unit adds the violation prediction to the target vehicle's prediction history. If, at step 372, the prediction unit determined that the target vehicle had traveled at least the predetermined minimum distance during the course of its prediction history, then step 372 is followed by step 376, in which case the prediction unit passes the violation prediction from the input 360 to step 378 to be added to the violation prediction history of the target vehicle.

Step 378 is followed by step 380, in which the prediction unit determines whether the information regarding the target vehicle indicates that the target vehicle may be turning right. The determination of step 380 may, for example, be made based on the position of the target vehicle with respect to a right turn zone defined for the lane in which the vehicle is travelling. Step 380 is followed by step 382, in which the prediction unit updates the prediction state for the target vehicle, as further described in connection with FIG. 14.

Following step 382, at step 384, the prediction unit determines whether the target vehicle passed the violation line of the lane in which the target vehicle is travelling during the current video frame, for example by comparing the position of the vehicle in the current frame with the definition of the violation line for the lane. If so, then step 384 is followed by step 396, in which the prediction unit checks whether the target vehicle has been marked as a violator with respect to the current frame. If the target vehicle is determined to be a predicted violator at step 396, then at step 398 the prediction unit determines whether the grace period indicated by the configuration data had expired as of the time when the prediction unit received target vehicle information for the frame from the tracker. The determination of step 398 may be made, for example, in response to the time elapsed in red recorded at step 184 in FIG. 8, compared to a predetermined grace period value, for example provided in the configuration data 68 of FIG. 2. If the grace period has expired, then step 398 is followed by step 400, in which the prediction unit sends the violation unit a message indicating that the predicted violation of the target vehicle has been confirmed. Step 400 is followed by step 394, in which control is returned to either the flow of FIG. 11 or FIG. 12.

If, at step 384, the prediction unit determined that the target vehicle had not passed the violation line for its lane during the current video frame, then step 384 is followed by step 386. At step 386, the prediction unit determines whether the target vehicle passed the stop line in the current video frame. If so, then step 386 is followed by step 402, and the prediction unit records the time which has elapsed during the current red light phase and the speed at which the target vehicle crossed the stop line. Step 402 is followed by step 406 in which the prediction unit determines whether the target vehicle was previously marked as a predicted violator. If the target vehicle was previously marked as a predicted violator, then step 406 is followed by step 408, in which the prediction unit sends a message indicating that the target vehicle has passed the stop line to the violation unit. Otherwise, step 406 is followed by step 390.

If, at step 386, the prediction unit determines that the target vehicle has not passed the stop line in the current video frame, then step 386 is followed by step 388, in which the prediction unit determines whether the target vehicle has been marked as a predicted violator. If so, then step 388 is followed by step 390. Otherwise, step 388 is followed by step 394, in which control is passed back to the steps of either FIG. 11 or FIG. 12. At step 390, the prediction unit determines whether the target vehicle is making a permitted right turn, as further described with reference to FIG. 16. If the prediction unit determines that the vehicle is making a permitted right turn, then a wrong prediction message is sent by the prediction unit to the violation unit at step 392. Step 392 is followed by step 394. If, at step 398, the prediction unit determines that the grace period following the beginning of the red light cycle had not expired at the time the current frame was captured, then at step 404 a wrong prediction message is sent to the violation unit. Step 404 is followed by step 394.

Figure 14:
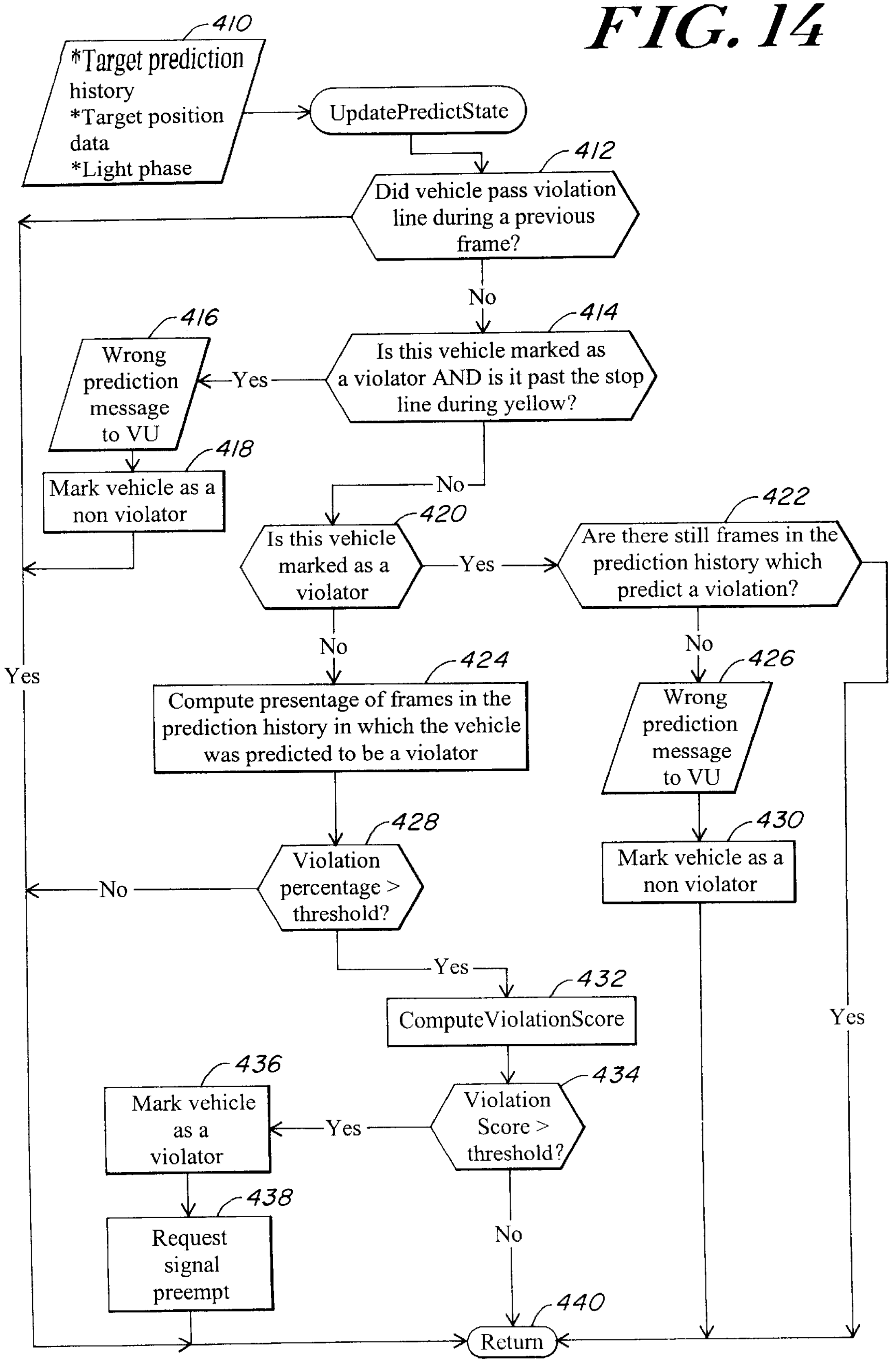
FIG. 14 is a flow chart showing steps performed by an illustrative embodiment of the disclosed prediction unit to update a prediction state associated with a target vehicle.

FIG. 14 shows steps performed by the prediction unit to update the prediction state of a target vehicle. The steps of FIG. 14 correspond to step 382 of FIG. 13. The steps of FIG. 14 are performed responsive to input data 410, including the prediction history for a target vehicle, target vehicle position data, and current light phase information. At step 412, the prediction unit determines whether the target vehicle has passed the violation line during a previously processed video frame. If so, then step 412 is followed by step 440, in which control is passed back to the flow shown in FIG. 13. Otherwise, step 412 is followed by step 414, in which the prediction unit determines whether the target vehicle has been marked as a predicted violator and passed the relevant stop line during a current yellow light phase. If so, then step 414 is followed by step 416, in which a message is sent to the violation unit indicating that a previously reported violation prediction for the target vehicle is wrong. Step 416 is followed by step 418, in which the prediction unit marks the target vehicle as a non-violator. If, at step 414, the target vehicle was determined either to be marked as a non-violator or had not passed the stop line during the relevant yellow light phase, then step 414 is followed by step 420, in which the prediction unit determines whether the target vehicle has been marked as a violator. If so, step 420 is followed by step 422, in which the prediction unit determines whether there are any entries in the prediction history for the target vehicle which also predict a violation for the target vehicle. If so, step 422 is followed by step 440. Otherwise, step 422 is followed by step 426, in which a wrong prediction message is sent to the violation unit. Step 426 is followed by step 430, in which the prediction unit marks the target vehicle as a non-violator.

If, at step 420, the prediction unit determined that the target vehicle has not been marked as a violator, then step 420 is followed by step 424, in which the prediction unit determines a percentage of the entries in the prediction history for the target vehicle that predicted that the target vehicle will be a violator. Next, at step 428, the prediction unit determines whether the percentage calculated at step 424 is greater than a predetermined threshold percentage. The predetermined threshold percentage varies with the number of prediction history entries for the target vehicle. If the percentage calculated at step 424 is not greater than the threshold percentage, then step 428 is followed by step 440. Otherwise, step 428 is followed by step 432, in which the prediction unit computes a violation score for the target vehicle, reflecting the probability that the target vehicle will commit a red light violation. Step 432 is followed by step 434, in which the prediction unit determines whether the violation score computed at step 432 is greater than a predetermined threshold score. If the violation score for the target vehicle is not greater than the target threshold, then step 434 is followed by step 440. Otherwise, step 434 is followed by step 436, in which the prediction unit marks the target vehicle as a violator. Step 436 is followed by step 438, in which the prediction unit requests a signal preemption, causing the current light phase for a traffic light controlling traffic crossing the path of the predicted violator to remain red for some predetermined period, thus permitting the predicted violator to cross the intersection without interfering with any vehicles travelling through the intersection in an intersecting lane. Various specific techniques may be employed to delay a light transition, including hardware circuits, software functionality, and/or mechanical apparatus such as cogs. The present system may be employed in connection with any of the various techniques for delaying a light transition.

In a further illustrative embodiment, the disclosed system operates in response to how far into the red light phase the violation actually occurs or is predicted to occur. If the violation occurs past a specified point in the red light phase, then no preemption will be requested. The specified point in the red light phase may be adjustable and/or programmable. An appropriate specified point in the red light phase beyond which preemptions should not be requested may be determined in response to statistics provided by the disclosed system regarding actual violations. For example, statistics on violations may be passed from the roadside station to the field office server.

Figure 15:
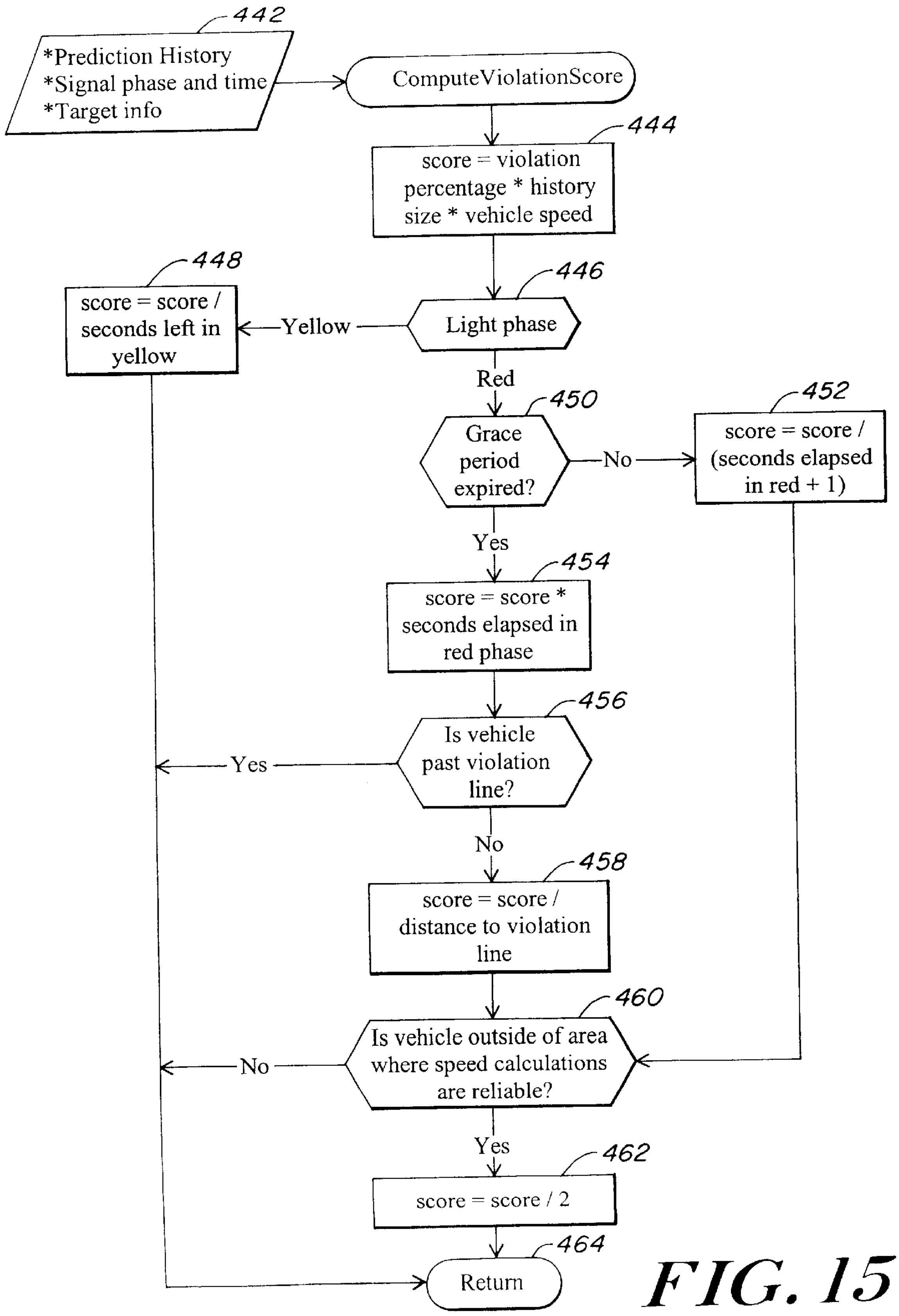
FIG. 15 is a flow chart showing steps performed by an illustrative embodiment of the disclosed prediction unit to compute a violation probability score for a target vehicle.

FIG. 15 shows steps performed by the prediction unit in order to compute a violation score for a target vehicle, as would be performed during step 432 in FIG. 14. The steps performed in FIG. 15 are responsive, at least in part, to input data 442, including a prediction history for the target vehicle, a signal phase and time elapsed value, and other target information, for example target position information received from the tracker. At step 444, the prediction unit calculates a violation score for the target vehicle as a sum of (1) the violation percentage calculated at step 424 of FIG. 14, (2) a history size equal to the number of recorded prediction history entries for the target vehicle, including a prediction history entry associated with the current frame, and (3) a target vehicle speed as calculated in step 210 of FIG. 9. Next, at step 446, the prediction unit branches based on the current light phase. If the current light phase is yellow, step 446 is followed by step 448, in which the violation score calculated at step 444 is divided by the seconds remaining in the current yellow light phase. Step 448 is followed by step 464, in which control is returned to the steps shown in FIG. 13. If, on the other hand, at step 446 the current light phase is determined to be red, then step 446 is followed by step 450, in which the prediction unit determines whether the predetermined grace period following the beginning of the current red light phase has expired. If not, then step 450 is followed by step 452, in which the violation score computed at step 444 is divided by the number of seconds elapsed in the current red light phase, plus one. The addition of one to the number of seconds elapsed avoids the problem of elapsed time periods less than one, which would otherwise improperly skew the score calculation in step 452. Step 452 is followed by step 460. If the predetermined grace period has expired, then step 450 is followed by step 454, in which the violation score calculated at step 444 is multiplied by the number of seconds that have elapsed in the current red light phase.

Step 454 is followed by step 456, in which the prediction unit determines whether the target vehicle has passed the violation line for the lane in which it is travelling. If so, then step 456 is followed by step 464. Otherwise, if the target vehicle has not passed the violation line for the lane in which it is travelling, then step 456 is followed by step 458, in which the violation score calculated at step 444 is divided by the distance remaining to the violation line. Step 458 is followed by step 460, in which the prediction unit determines whether the target vehicle is outside the range of the prediction camera in which speed calculations are reliable. If not, then step 460 is followed by step 464, in which control is passed back to the steps shown in FIG. 14. Otherwise, step 460 is followed by step 462, in which the violation score is divided by two. In this way, the violation score is made to reflect the relative inaccuracy of the speed calculations for target vehicles beyond a certain distance from the prediction camera. Step 462 is followed by step 464.

Figure 16:
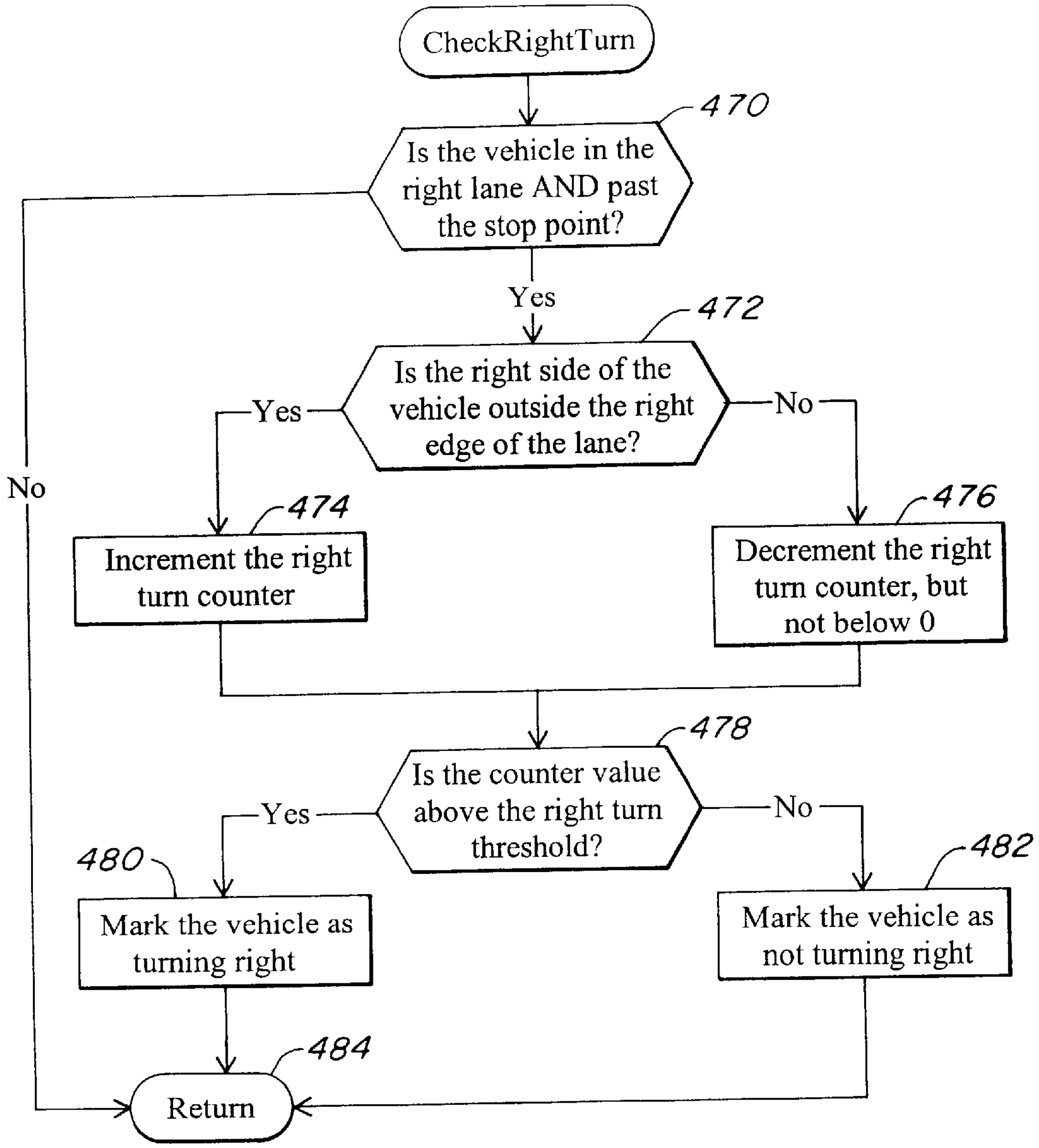
FIG. 16 is a flow chart showing steps performed by an illustrative embodiment of the disclosed prediction unit to determine if a target vehicle is making a right turn.

FIG. 16 shows steps performed by an embodiment of the prediction unit to determine whether a target vehicle is performing a permitted right turn, as would be performed at step 380 shown in FIG. 13. At step 470, the prediction unit checks whether the vehicle is in the rightmost lane, and past the stop line for that lane. If not, then step 470 is followed by step 484 in which control is passed back to the flow of FIG. 13. Otherwise, at step 472, the prediction unit determines whether the right side of the vehicle is outside the right edge of the lane in which it is travelling. If so, then at step 474, the prediction unit increments a right turn counter associated with the target vehicle. Otherwise, at step 476, the prediction unit decrements the associated right turn counter, but not below a minimum lower threshold of zero. In this way the disclosed system keeps track of whether the target vehicle travels into a right turn zone located beyond the stop line for the rightmost line, and to the right of the right edge of that lane. Step 476 and step 474 are both followed by step 478.

At step 478, the prediction unit determines whether the right turn counter value for the target vehicle is above a predetermined threshold. The appropriate value of such a threshold may, for example, be determined empirically through trial and error, until the appropriate sensitivity is determined for a specific intersection topography. If the counter is above the threshold, then the prediction unit marks the vehicle as turning right at step 480. Otherwise, the prediction unit marks the target vehicle as not turning right at step 482. Step 480 and step 482 are followed by step 484.

Figure 17:
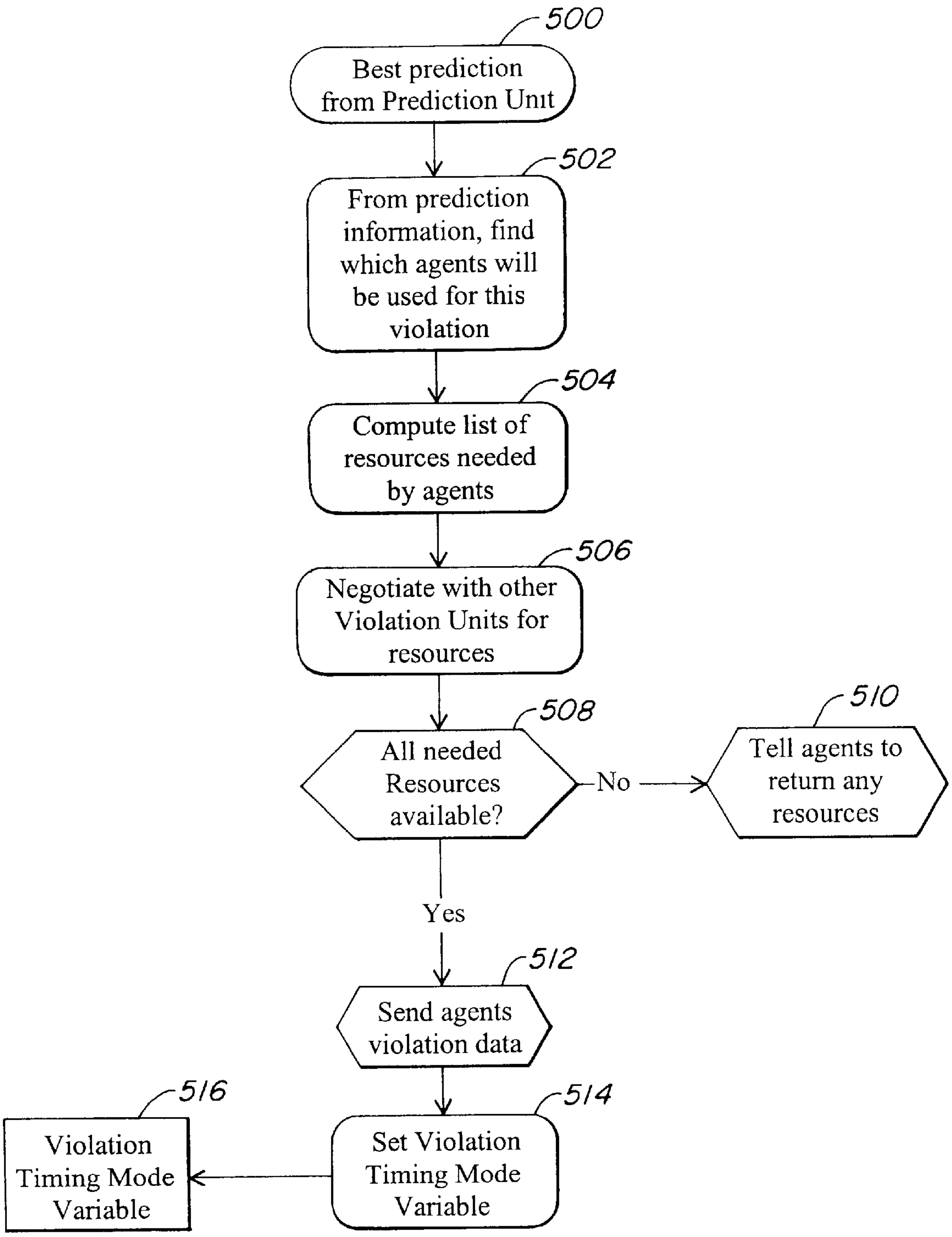
FIG. 17 is a flow chart showing steps performed by an illustrative embodiment of the disclosed violation unit to allocate resources for recording a predicted violation.

FIG. 17 shows steps performed by the violation unit to manage resource allocation during recording of a red light violation. At step 500, the violation unit receives a message containing target vehicle information related to a highest violation prediction score from the prediction unit. At step 502, the violation unit determines which software agents need to be used to record the predicted violation. At step 504, the violation unit generates a list of resources needed by the software agents determined at step 502. At step 506, the violation unit negotiates with any other violation units for the resources within the list generated at step 504. Multiple violation units ay exist where multiple traffic flows are simultaneously being monitored.

At step 508, the violation unit determines whether all of the resources within the list computed at step 504 are currently available. If not, step 508 is followed by step 510, in which the violation unit sends messages to all agents currently holding any resources to return those resources as soon as possible. Because the violation event may be missed before any resources are returned, however, the violation unit skips recording the specific violation event. Otherwise, if all necessary resources are available at step 508, then at step 512 the violation unit sends the violation information needed by the software agents determined at step 502 to those software agents. Step 512 is followed by step 514 in which the violation unit sets timing mode variable 516, indicating that a violation is being recorded and the agents must now request resources in a timed mode.

Figure 18:
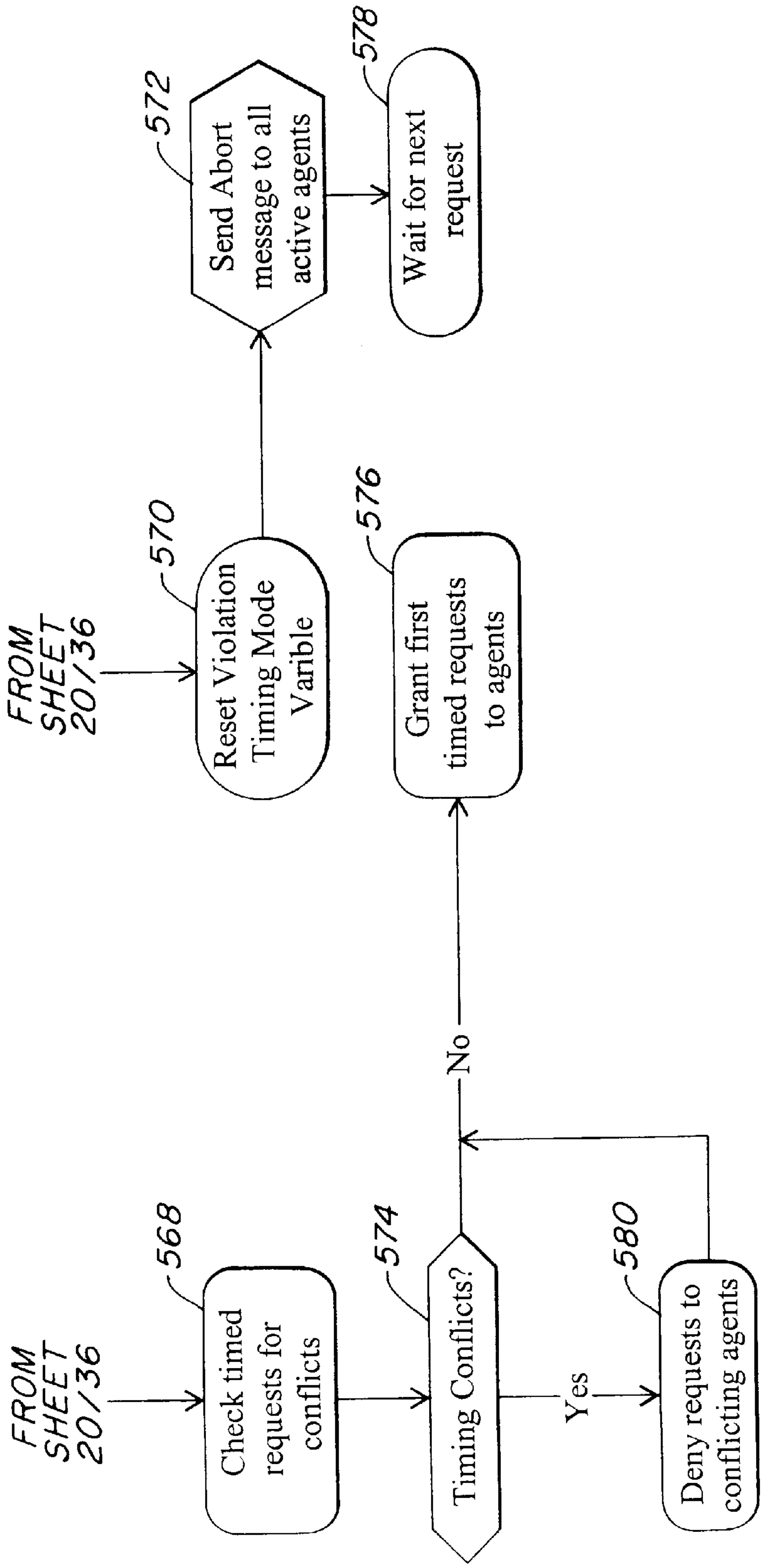
FIG. 18 is a flow chart showing steps performed by an illustrative embodiment of the disclosed violation unit to process a resource request received from an agent.

FIG. 18 shows steps performed by the violation unit to process a resource request received from a software agent at step 540. At step 542, the violation unit determines whether a violation event is current being recorded by checking the state of the violation timing mode variable 516. If the timing mode variable is not set, and accordingly no violation event is currently being recorded, then, step 542 is followed by step 544, in which the violation unit determines whether the resource requested is currently in use by another violation unit, as may be the case where a violation event is being recorded for another traffic flow. If so, step 544 is followed by step 550, in which the request received at step 540 is denied. Otherwise, step 544 is followed by step 546, in which the violation unit determines whether the requested resource is currently in use by another software agent. If so, step 546 is similarly followed by step 550. Otherwise, step 546 is followed by step 548, in which the resource request received at step 540 is granted.

If, on the other hand, at step 542, the violation unit determines that the violation timing mode variable 516 is set, then at step 552 the violation unit determines whether the violation currently being recorded has been aborted. If not, then at step 554 the violation unit adds the request to a time-ordered request list associated with the requested resource, at a position within the request list indicated by the time at which the requested resource is needed. The time at which the requested resource is needed by the requesting agent may, for example, be indicated within the resource request itself. Then, at step 556, the violation unit determines whether all software agents necessary to record the current violation event have made their resource requests. If not, at step 558, the violation unit waits for a next resource request. Otherwise, at step 568, the violation unit checks the time-ordered list of resource requests for conflicts between the times between the times at which the requesting agents have requested each resource. At step 574, the violation unit determines whether there any timing conflicts were identified at step 568. If not, then the violation unit grants the first timed request to the associated software agent at step 576, thus initiating recording of the violation event. Otherwise, the violation unit denies any conflicting resource requests at step 580. Further at step 580, the violation unit may continue to record the predicted violation, albeit without one or more of the conflicting resource requests. Alternatively, the violation unit may simply not record the predicted violation at all.

If the violation unit determines at step 552 that recording of the current violation has been aborted, then at step 560 the violation unit denies the resource request received at step 540, and at step 562 denies any other resource requests on the current ordered resource request list. Then, at step 564, the violation unit determines whether all software agents associated with the current violation have made their resource requests. If not, the violation unit waits at step 566 for the next resource request. Otherwise, the violation unit resets the violation timing mode variable at step 570, and sends an abort message to all active software agents at step 572. Then, at step 578, the violation unit waits for a next resource request, for example indicating there is another violation event to record.

Figure 19:
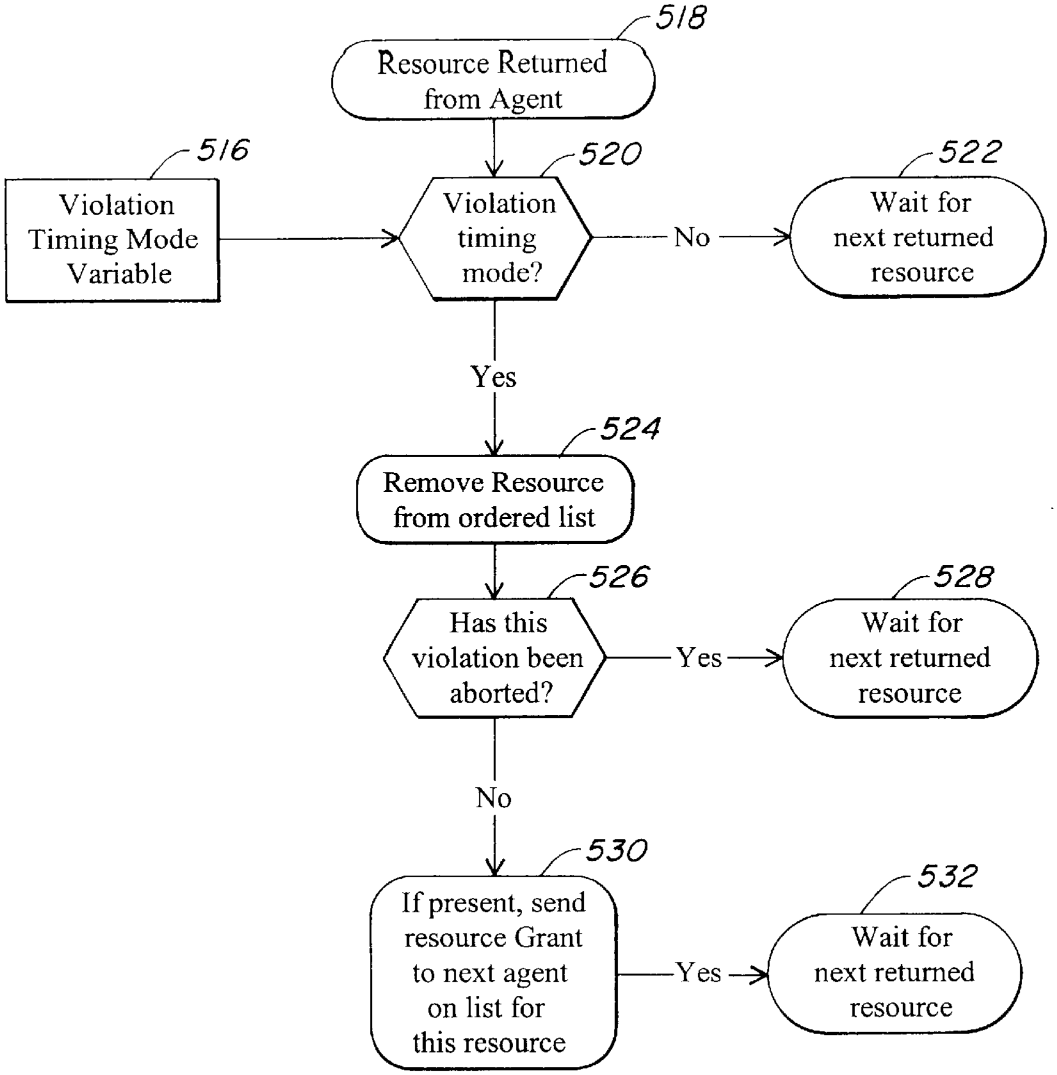
FIG. 19 is a flow chart showing steps performed by an illustrative embodiment of the disclosed violation unit to manage a resource returned by an agent.

FIG. 19 shows steps performed by the violation unit to process a resource that has been returned by a software agent at step 518. At step 520, the violation unit determines whether the violation timing mode variable 516 is set. If not, then there is currently no violation event being recorded, and step 520 is followed by step 522, in which the violation unit simply waits for a next resource to be returned. Otherwise, if the violation timing mode variable is set, step 520 is followed by step 524 in which the violation unit removes the resource from an ordered list of resources, thus locking the resource from any other requests. After step 524, at step 526, the violation unit determines whether recording of the current violation has been aborted. If so, at step 528, the violation unit simply unlocks the resource and waits for a next resource to be returned by one of the software agents, since the resource is not needed to record a violation event. Otherwise, at step 530, the violation unit allocates the returned resource to any next software agent on a time ordered request list associated with the returned resource, thus unlocking the resource for use by that requesting agent. Then, at step 532, the violation unit waits for a next returned resource.

Figure 20:
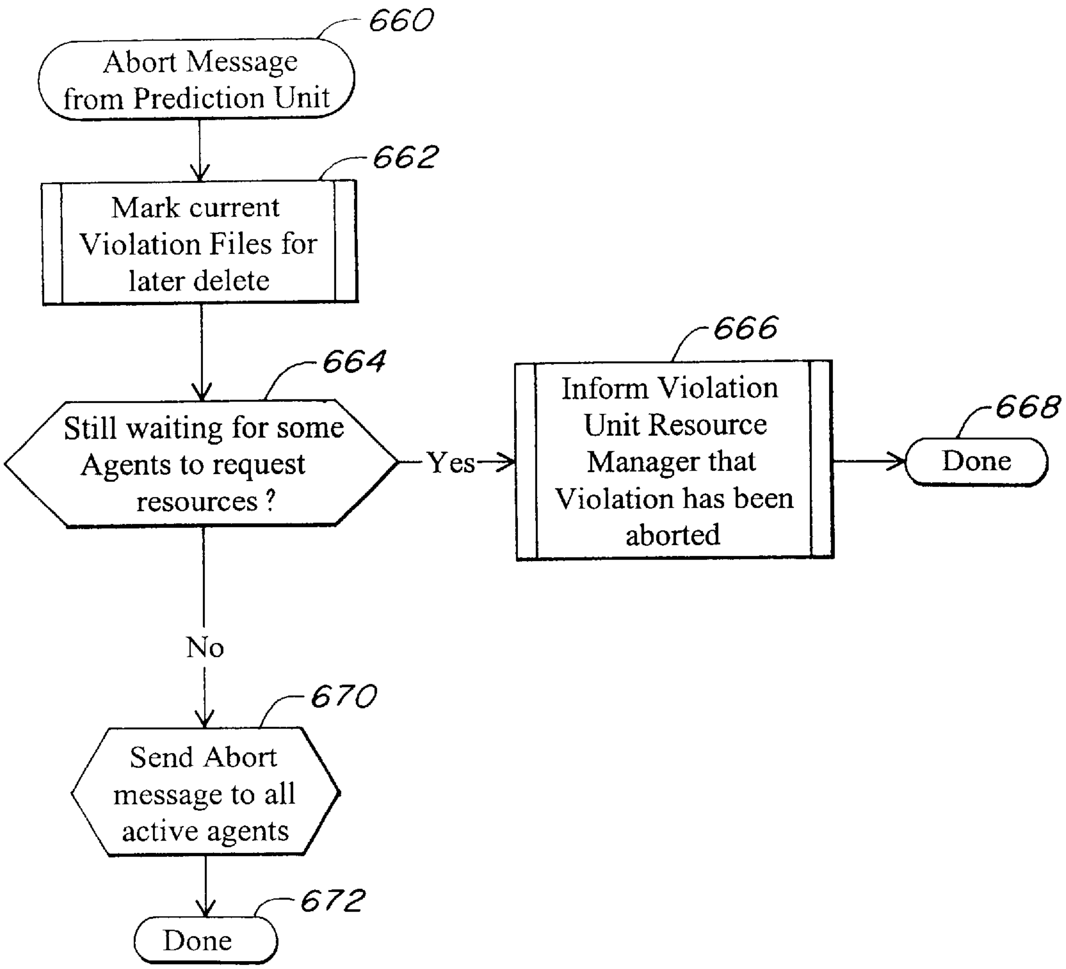
FIG. 20 is a flow chart showing steps performed by an illustrative embodiment of the disclosed violation unit to process an abort message received from the prediction unit.

FIG. 20 illustrates steps performed by the violation unit in response to receipt of an abort message 660 from the prediction unit. Such a message may be sent by the prediction unit upon determining that a previously predicted violation did not occur. At step 662, the violation unit marks files for the violation being aborted for later deletion. Then, at step 664, the violation unit determines whether it is still waiting for any software agents to request resources necessary to record the current violation. If so, then at step 666, the violation unit informs a violation unit resource manager function that recording of the current violation has been aborted. At step 668, message processing completes. If, on the other hand, the violation unit is not still waiting for any software agents to request resources necessary to record the current violation, then at step 670 the violation unit sends an "abort" message to all currently active software agents. Message processing then completes at step 672.

Figure 21:
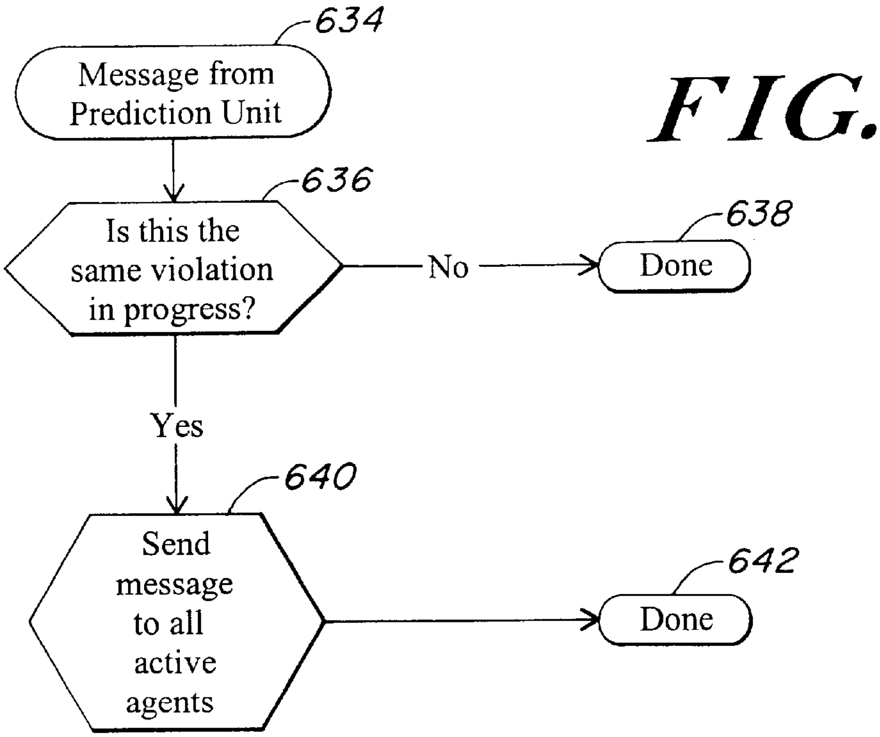
FIG. 21 is a flow chart showing steps performed by an illustrative embodiment of the disclosed violation unit to process a message received from the prediction unit.

FIG. 21 shows steps performed by a violation unit in response to a message 634 received from the prediction unit. The steps shown in FIG. 20 are performed in response to receipt by the violation unit of a message from the prediction unit other than an abort message, the processing of which is described in connection with FIG. 20. At step 636, the violation unit determines whether the violation associated with the message received at 634 is the violation that is currently being recorded. If not, then at step 638 the processing of the message completes. Otherwise, at step 640, the violation unit sends a message to all currently active software agents, reflecting the contents of the received message. At step 642 message processing is completed.

Figure 22:
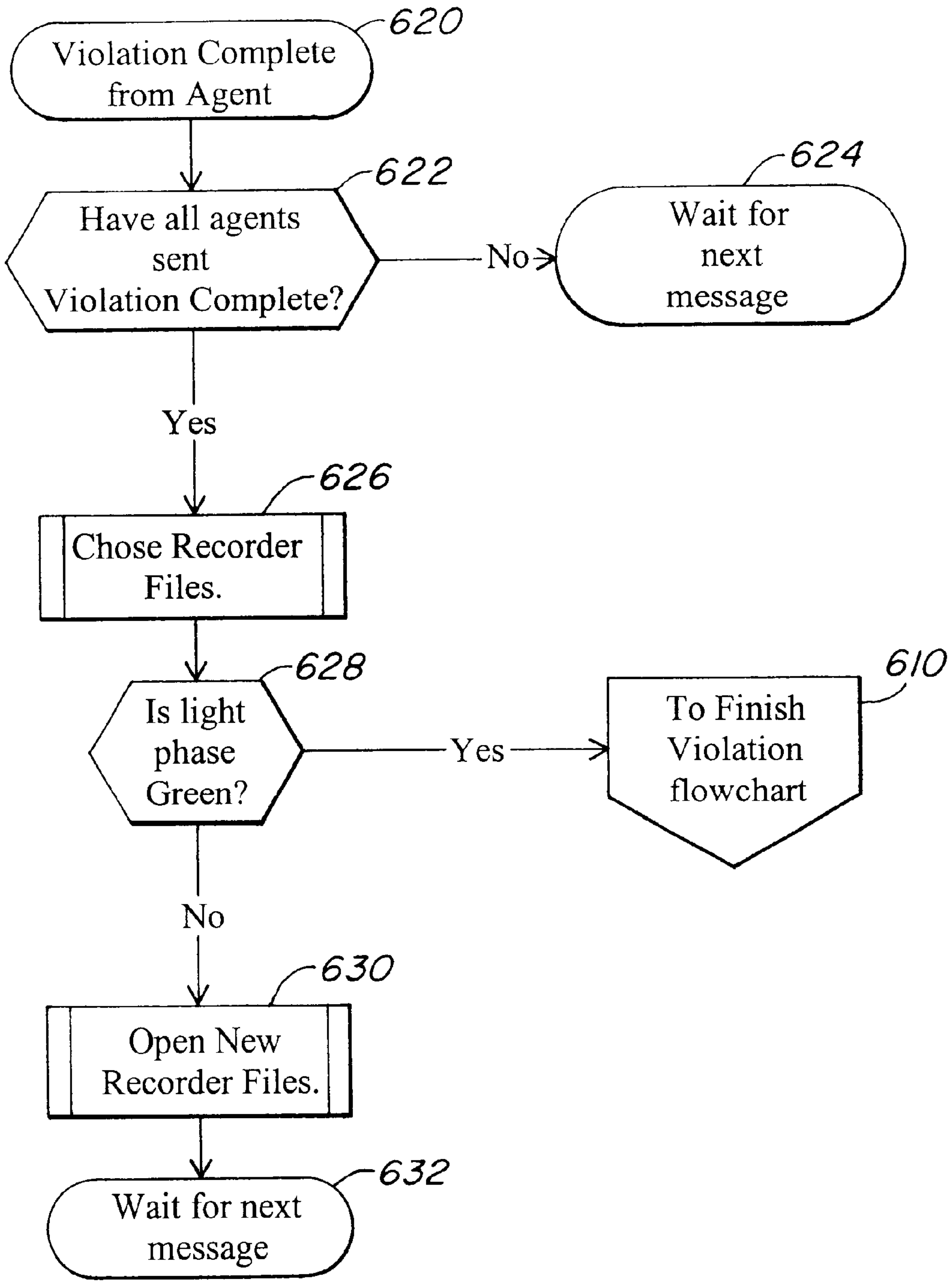
FIG. 22 is a flow chart showing steps performed by an illustrative embodiment of the disclosed violation unit to process a "violation complete" message received from an agent.
Figure 24:
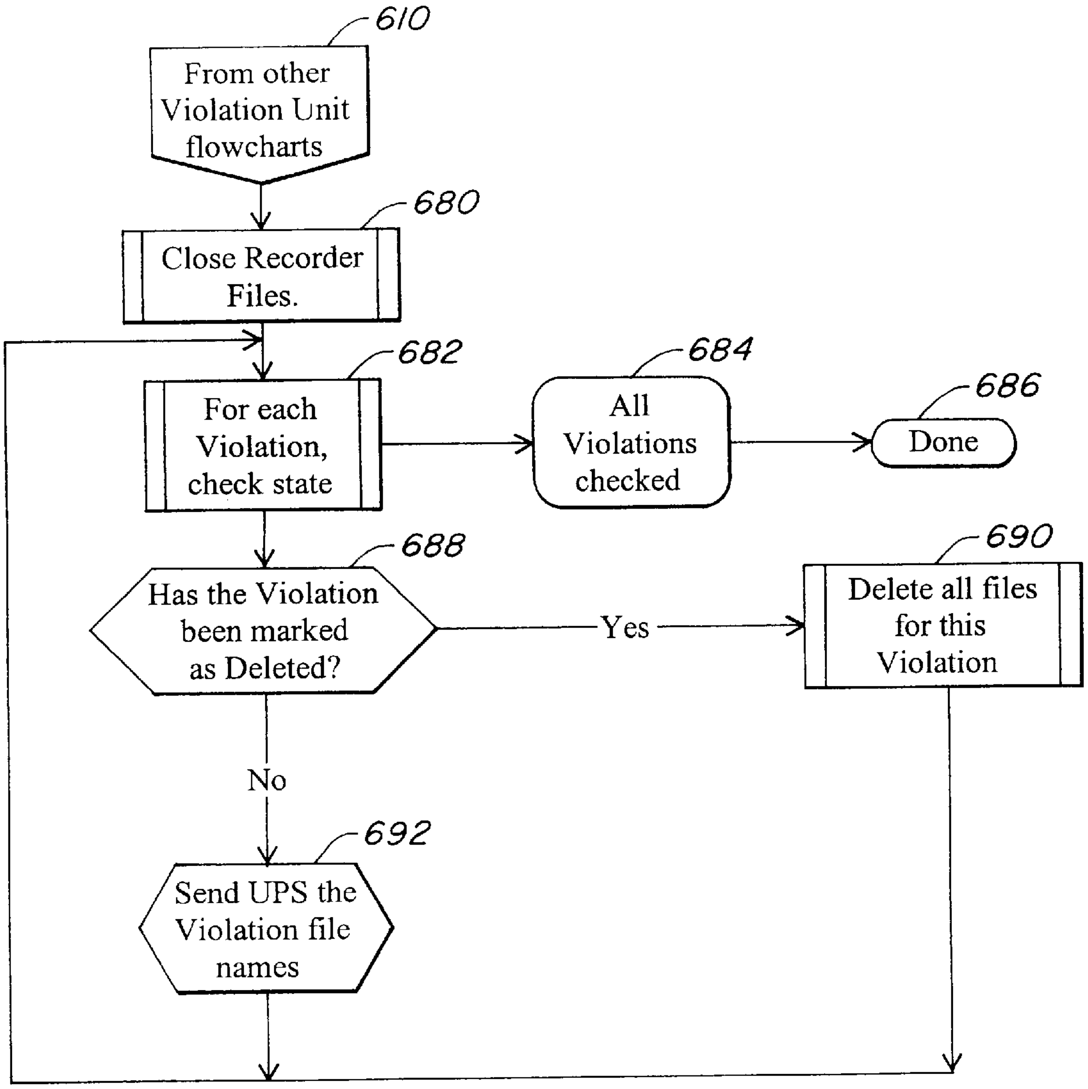
FIG. 24 is a flow chart showing steps performed by an illustrative embodiment of the disclosed violation unit to complete processing of a violation.

FIG. 22 illustrates steps performed by the violation unit in response to receipt of a "violation complete" message from a software agent at step 620. Such a violation complete message indicates that the agent has completed its responsibilities with respect to a violation event currently being recorded. At step 622, the violation unit determines whether all software agents necessary to record the violation event have sent violation complete messages to the violation unit. If not, then the violation unit waits for a next violation complete message at step 624. If so, then at step 626 the violation unit closes the recorder files which store the video clips for the violation that has just been recorded. At step 628, the violation unit determines whether the current light phase is green and, if so, continues processing at step 610, as shown in FIG. 24. If the current light phase is not green, then at step 630 the violation unit opens new recorder files in which to record video clips for a new violation. Reopening the recorder files at step 630 prepares the violation unit to record any subsequent violations during the current red light phase. Then, at step 632, the violation unit waits for a next message to be received.

Figure 23:
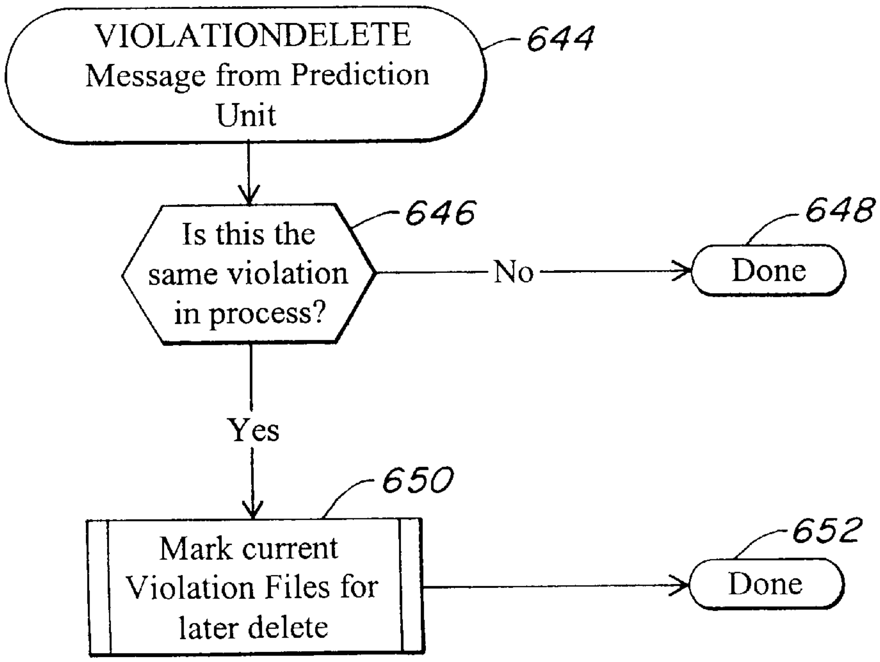
FIG. 23 is a flow chart showing steps performed by an illustrative embodiment of the disclosed violation unit to process a "violation delete" message received from the prediction unit.

FIG. 23 shows steps performed by the violation unit in response to receipt of a violation-delete message 644 from the prediction unit. Such a message may be sent by the prediction unit upon a determination that a previous violation did not occur. At step 646 the violation unit determines whether the violation-delete message is related to the violation currently being recorded. If not, then message processing completes at step 648. Otherwise, the violation unit marks any current violation files for later deletion. Then, at step 652, the message processing completes.

FIG. 24 illustrates steps performed by the violation unit to finish violation processing related to a current red light phase. At step 610 the violation unit begins cleaning up after recording one or more violation events. At 680, the violation unit closes all recorder files. At steps 682–690, the violation unit checks the state of each violation within the recorder files. At step 688, the violation unit determines whether any violations have been marked as deleted. If so, then at step 690, the violation unit deletes all files associated with the deleted violation. Otherwise, at step 692, the violation unit sends the names of the files to be sent to the server system to a delivery service which will subsequently send those files to the remote server system. When all violations have been checked, as detected at step 684, processing of the violations is finished at step 686.

Figure 25:
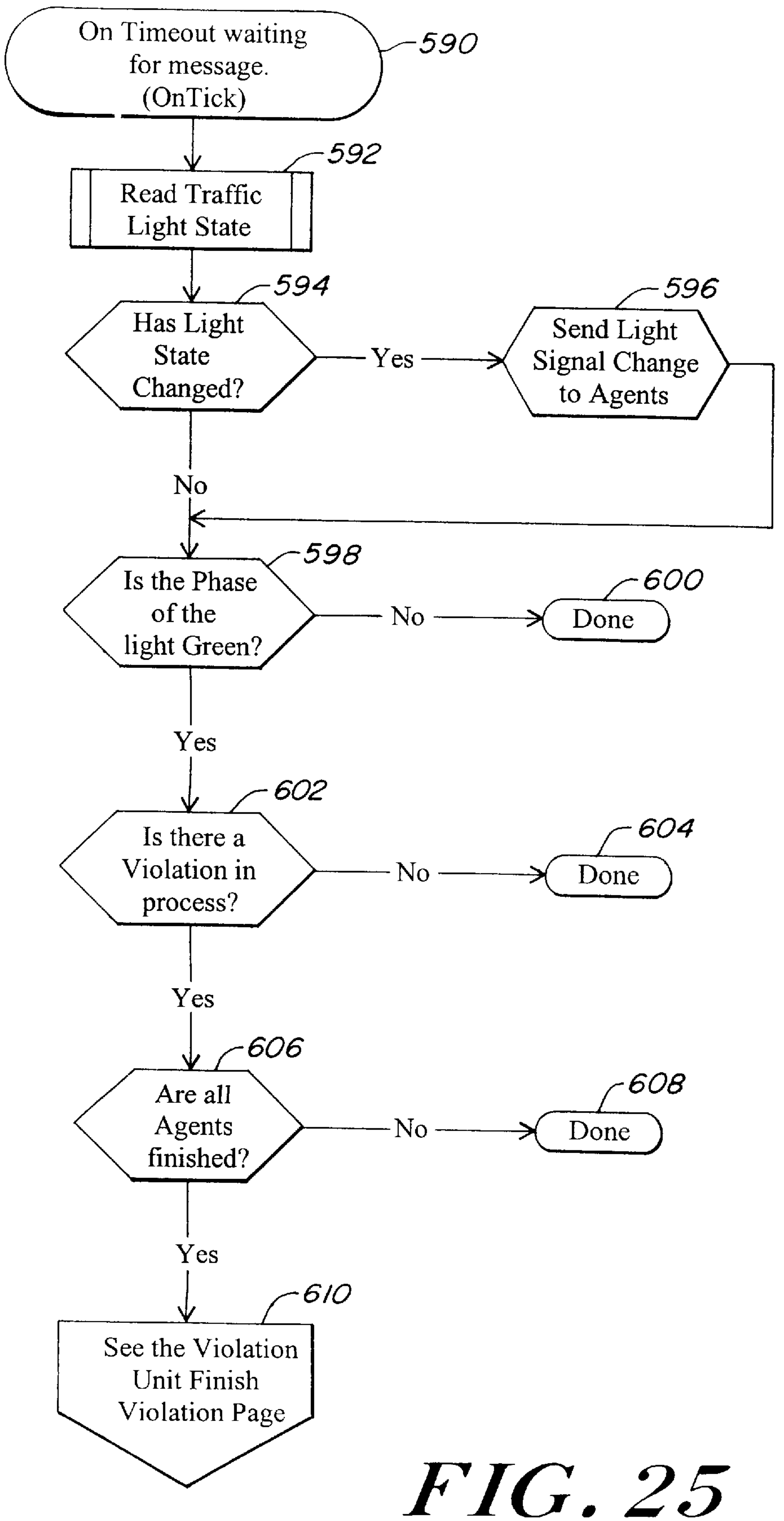
FIG. 25 is a flow chart showing steps performed by an illustrative embodiment of the disclosed violation unit to furnish light phase information to one or more agents.

FIG. 25 shows steps performed during polling activity performed by the violation unit in response to a time out signal 590, in order to update the traffic light state in one or more software agents. Indication of a current light phase may, for example, be determined in response to one or more signals originating in the traffic control box 86 as shown in FIG. 5. The steps shown in FIG. 25 are, for example, performed periodically by the violation unit. At step 592, the violation unit reads the current traffic signal state including light phase. At step 594, the violation unit determines whether the traffic light state read at step 592 is different from a previously read traffic light state. If so, then at step 596 the violation unit sends the updated light signal information to each currently active software agent. Step 596 is followed by step 598. If at step 594 the violation unit determines that the traffic light state has not changed, then step 594 is followed by step 598.

At step 598, the violation unit determines whether the current light phase of the traffic signal is green. If not, then after step 598 the polling activity is complete at step 600. Otherwise, step 598 is followed by step 602, in which the violation unit determines whether there is a violation currently being recorded, for example, by checking the status of the violation timing mode variable. If not, then at step 604 the violation unit polling activity terminates. Otherwise, step 602 is followed by step 606, in which the violation unit determines whether all software agents have finished processing. If not, then the polling activity of the violation unit complete at step 608. If all current software agents are finished, then step 606 continues with step 610, as described further below in connection with FIG. 24.

Figure 26:
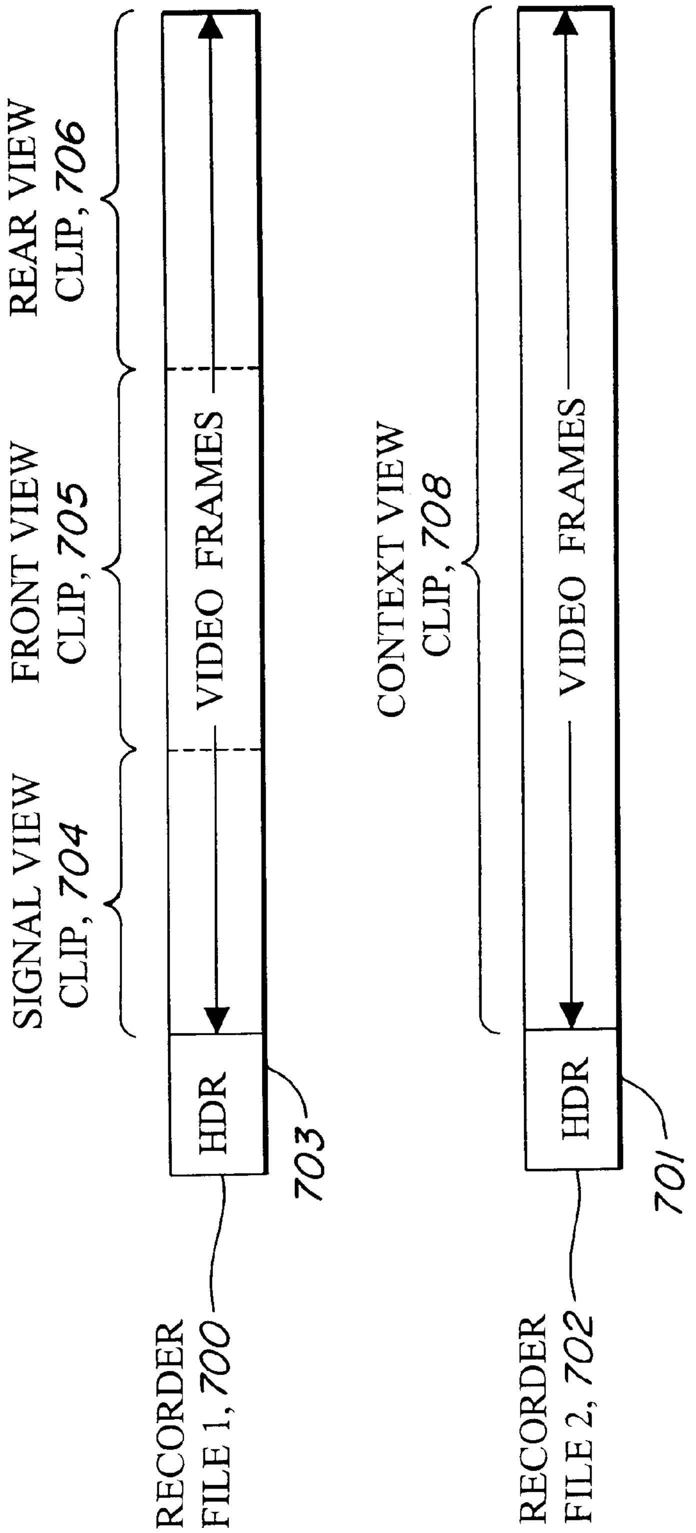
FIG. 26 shows an illustrative embodiment of a recorder file format.

FIG. 26 shows an illustrative format for a recorder file 1 700 and a recorder file 2 702. The recorder file 1 700 is shown including a header portion 703, including such information as the number of seconds recorded in recorder file 1 700, the number of video frames contained in recorder file 1 700, the coder-decoder ("codec") used to encode the video frames stored in recorder file 1700, and other information. In an illustrative embodiment, the recorder files shown in FIG. 26 are standard MJPEG files, conforming with the Microsoft "AVI" standard, and thus referred to as "AVI" files. The recorder file 1 700 is further shown including a signal view clip 704 containing video frames of a signal view associated with the violation event, a front view clip 705 containing video frames showing the front view associated with the violation event, and a rear view clip 706 containing video frames showing the rear view associated with the violation event. The recorder file 2 702 is shown including a context view clip 708 containing video frames of the context view recorded in association with the violation event. In the illustrative embodiment shown in FIG. 26, the signal view clip 704, front view clip 705 and rear view clip 706 are recorded by one or more violation cameras. The video frames within the context view clip 708 are recorded by a prediction camera. During operation of the disclosed system, the recorder files shown in FIG. 26 are provided to a server system within a field office, together with other information related to a recorded violation event. Such other information may include indexer information, describing the beginning and end times of each of the video clips within a recorder file. In order to provide security with regard to any information sent from the roadside station to the remote server system, unique frame identifiers, timestamps, and/or secure transmission protocols including encryption may be employed.

Figure 27:
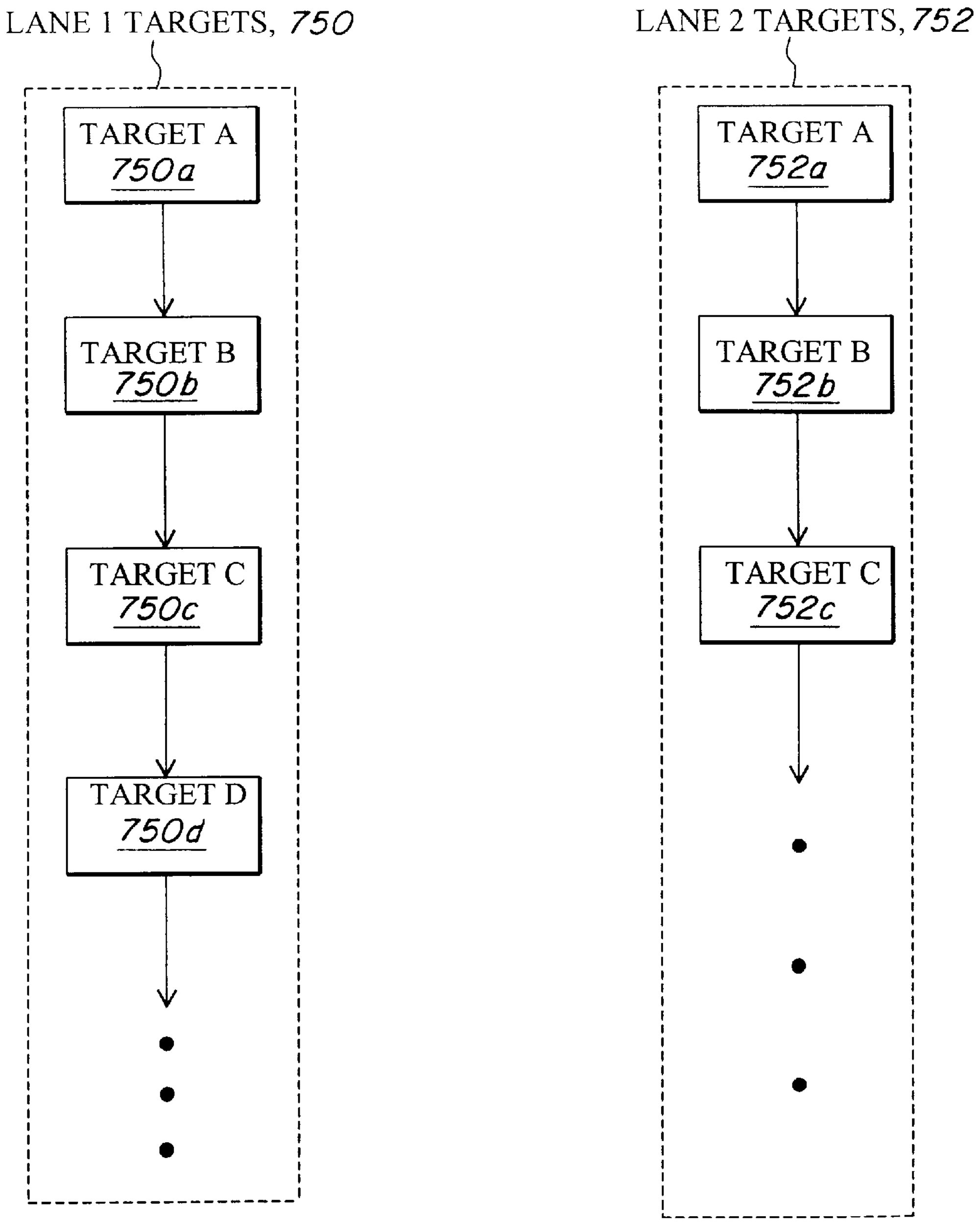
FIG. 27 shows linked lists of target vehicle information as used by an illustrative embodiment of the disclosed prediction unit.

FIG. 27 shows an example format of data structures related to target vehicles, and operated on by the prediction unit. A first linked list 750 includes elements storing information for target vehicles within a first monitored lane. The linked list 750 is shown including an element 750*a* associated with target vehicle A, an element 750*b* associated with a target vehicle B, an element 750*c* associated with a target vehicle C, and so on for all target vehicles within a first monitored lane. The elements in the linked list 750 are stored in the order that information regarding target vehicles is received by the prediction unit from the tracker. Accordingly, the order of elements within the linked list 750 may or may not reflect the order of associated target vehicles within the monitored lane. Such an order of vehicles may accordingly be determined from location information for each target vehicle received from the tracker. Further in FIG. 27, a second linked list 752 is shown including elements associated with target vehicles within a second monitored lane, specifically elements 752*a*, 752*b*, and 752*c*, associated respectively a target vehicle A, target vehicle B, and a target vehicle C. While FIG. 27 shows an embodiment in which 2 lanes are monitored at one time by the prediction unit, the disclosed system may be configured to monitor various numbers of lanes simultaneously, as appropriate for the specific intersection being monitored.

Figure 28:
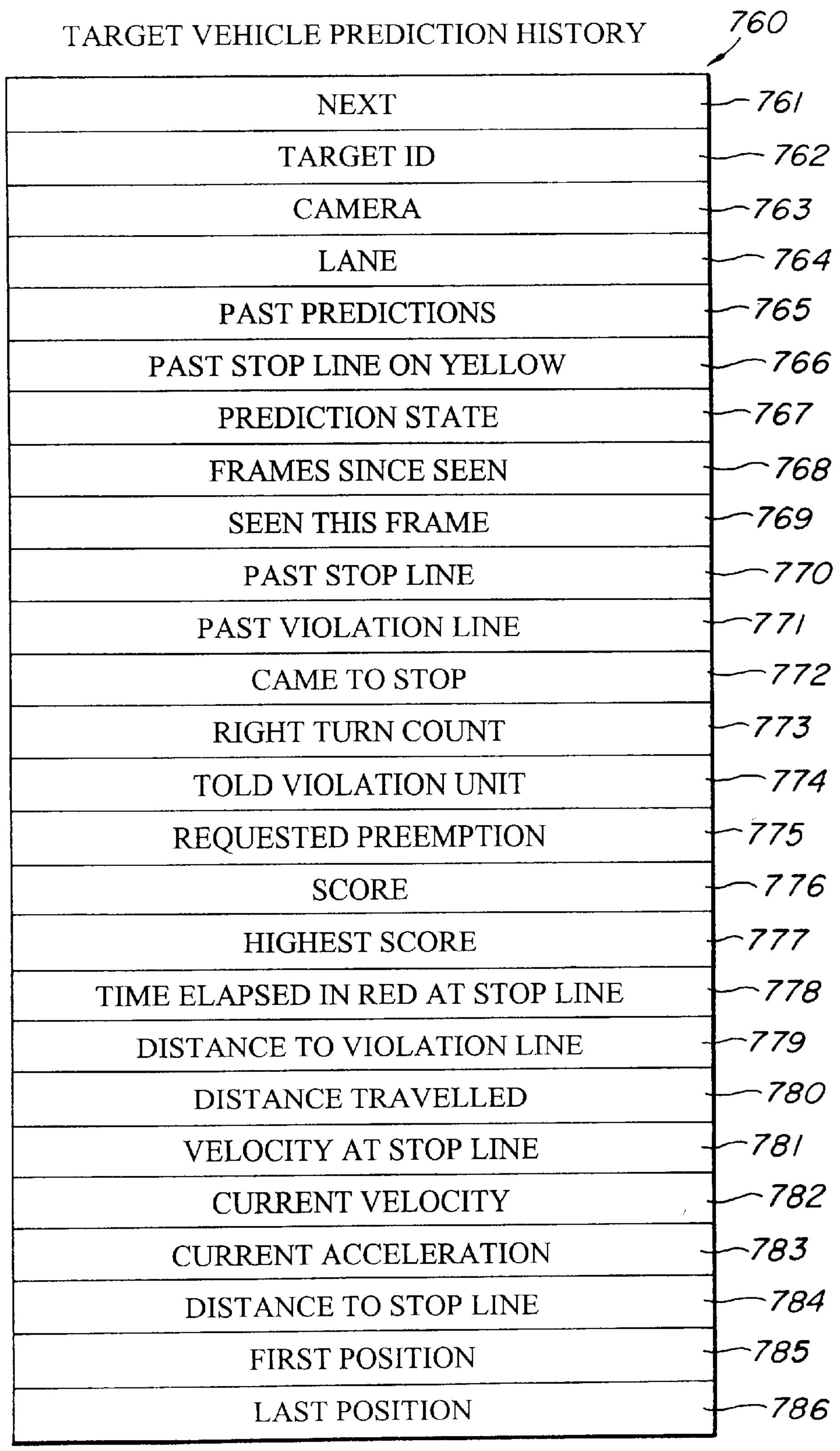
FIG. 28 shows an illustrative format for target vehicle information used by the prediction unit.

FIG. 28 shows an example format for a target vehicle prediction history data structure, for example corresponding to the elements of the linked lists shown in FIG. 27. A first field 761 of the structure 760 contains a pointer to the next element within the respective linked list. Definitions of the other fields are as follows:

Target Identifier field 762: This field is used by the prediction unit to store a target identifier received from the tracker.

Camera field 763: This field is used by the prediction unit to store an identifier indicating the image capturing device with which a current video frame was obtained.

Lane field 764: This field is used by the prediction unit to indicate which of potentially several monitored lanes the associated target vehicle is located within.

Past Predictions field 765: This field contains an array of violation predictions (violator/nonviolator) associated with previous video frames and the current video frame.

Past Stop Line on Yellow field 766: This field is used by the prediction unit to store an indication of whether the associated target vehicle traveled past the stop line for the lane in which it is travelling during a yellow light phase of the associated traffic signal.

Prediction State field 767: This field is used to store a current violation prediction state (violator/non-violator) for the associated target vehicle.

Frames Since Seen field 768: This field is used to store the number of frames that have been processed since the associated target vehicle was last seen by the tracker.

Seen this Frame field 769; This field stores indication of whether the associated target vehicle was seen by the tracker during the current video frame.

Past Stop Line field 770: This field is used to store indication of whether the target vehicle has traveled past the stop line for the lane in which it is travelling.

Past Violation Line field 771: This field is used to store an indication of whether the associated target vehicle has traveled past the violation line for the lane in which it is travelling.

Came to Stop field 772: This field is used by the prediction unit to store an indication of whether the target vehicle has ever come to a stop. For example, a vehicle may stop and start again, and that stop would be indicated by the value of this field.

Right Turn Count 773: This field contains a count indicating the likelihood that the associated target vehicle is making a permitted turn. While this field is shown for purposes of illustration as a right turn count, it could alternatively be used to keep a score related to any other type of permitted turn.

Told Violation Unit 774: This field indicates whether a predicted violation by the target vehicle has been reported to the violation unit.

Requested Preemption 775: This field indicates whether the prediction unit has requested a signal preemption due to this vehicle's predicted violation. A signal preemption prevents the traffic light from turning green for vehicles which would cross the path of this violator.

Score 776: The value of this field indicates a current violation prediction score for the associated target vehicle, indicating the likelihood that the target vehicle will commit a red light violation.

Highest Score 777: The value of this field indicates the highest violation prediction score recorded during the history of the associated target vehicle.

Time Elapsed in Red at Stop Line 778: The value of this field contains an amount of time elapsed during the red light phase when the associated target vehicle passed the stop line for the lane in which it was travelling.

Distance to Violation Line 779: This field contains a value indicating a distance that the associated target vehicle has to travel before it reaches the violation line associated with the lane in which it is travelling.

Distance Traveled 780: This field contains the distance that the associated target vehicle has traveled since it was first identified by the tracker.

Velocity at Stop Line 781: This field contains the speed at which the associated target vehicle was travelling when it crossed the stop line for the lane in which it is travelling.

Current Velocity 782: This field contains a current speed at which the associated target vehicle is travelling.

Current Acceleration 783: The value of this field is the current acceleration for the target vehicle.

Distance to stop line 784: This field stores the distance between the current position of the associated target vehicle and the stop line for the lane in which it is travelling.

First Position 785: The value of this field indicates the first position at which the associated target vehicle was identified by the tracker.

Last Position 786: The value of this field indicates a last position at which the associated target vehicle was identified by the tracker.

Figure 29:
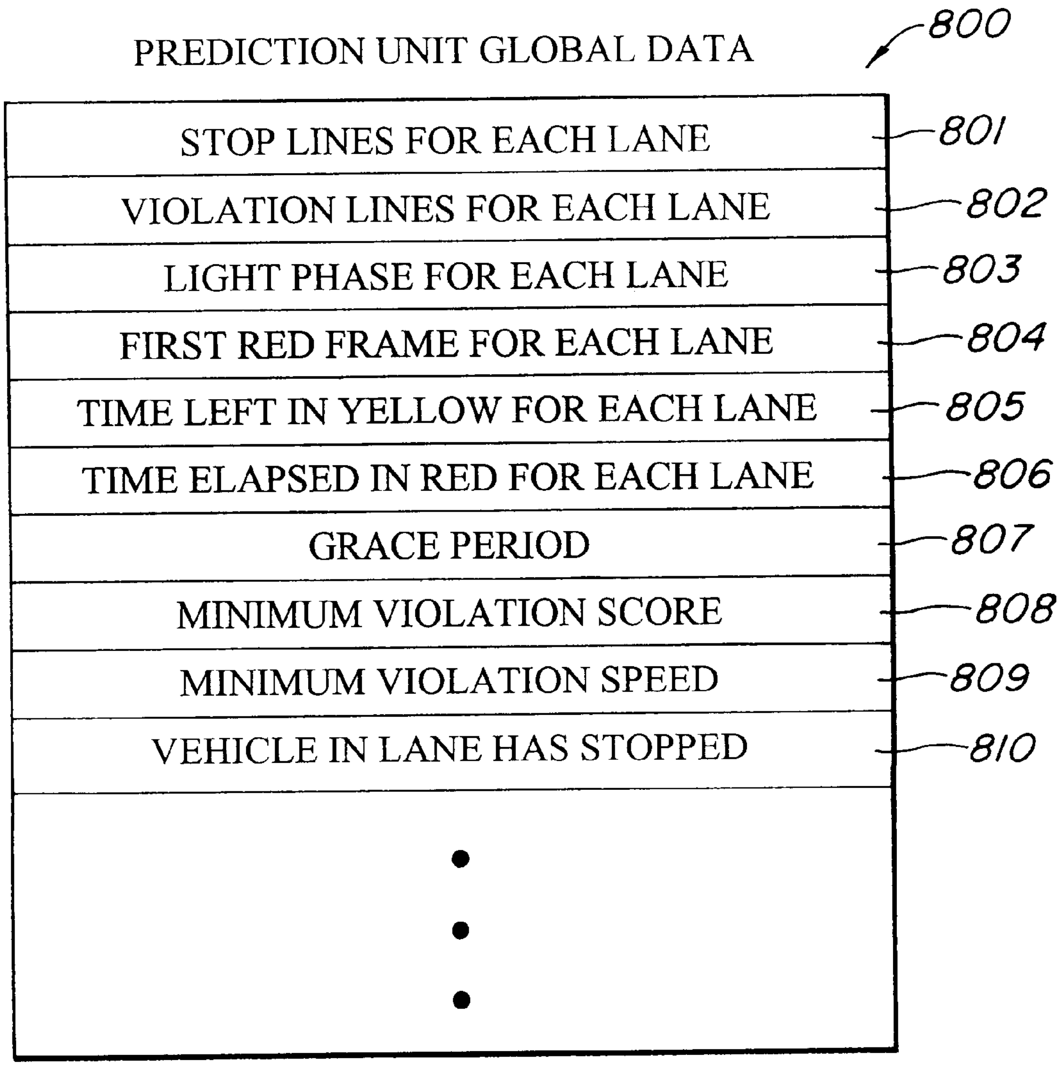
FIG. 29 shows an illustrative format for global data used by the prediction unit.

FIG. 29 shows an illustrative format for global data used in connection with the operation of the prediction unit. The global data 800 of FIG. 29 is shown including the following fields:

Stop Lines for Each Lane 801: This is a list of stop line positions associated with respective monitored lanes.

Violation Lines for Each Lane 802: This is a list of violation line locations for each respective lane being monitored.

Light Phase for Each Lane 803: This field includes a list of light phases that are current for each lane being monitored.

First Red Frame for Each Lane 804: This field indicates whether the current frame is the first frame within the red light phase for each lane.

Time Left in Yellow for Each Lane 805: This field contains a duration remaining in a current yellow light phase for each monitored lane.

Time Elapsed in Red for Each Lane 806: The value of this field is the time elapsed since the beginning of a red light phase in each of the monitored lanes.

Grace Period 807: The value of this field indicates a time period after an initial transition to a red light phase during which red light violations are not citationable events.

Minimum Violation Score 808: The value of this field indicates a minimum violation prediction score. Violation prediction scores which are not greater than such a minimum violation score will not result in reported violation events.

Minimum Violation Speed 809: The value of this field is a minimum speed above which violations of red lights will be enforced.

Vehicle in Lane has Stopped 810: This field contains a list of indications of whether any vehicle within each one of the monitored lanes has stopped, or will stop.

Figure 30:
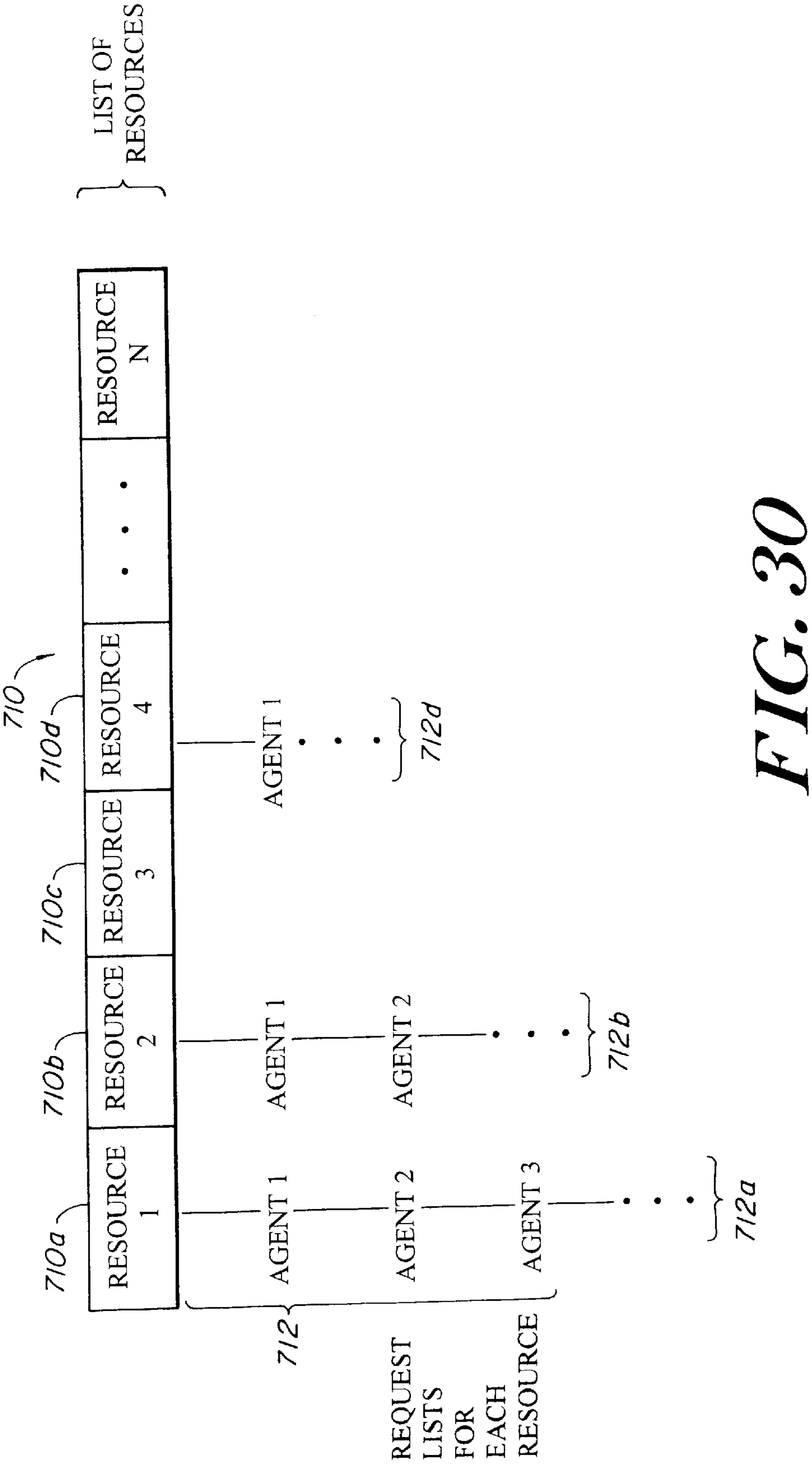
FIG. 30 shows an illustrative resource schedule format generated by the violation unit.

FIG. 30 shows an ordered list of resources 710 as would be generated by the violation unit at step 524 in FIG. 19. The ordered list of resources 710 is shown including a number of resources 710*a*, 710*b*, 710*c*, 710*d*, etc. For each of the resources within the ordered list of resources 710, there is shown an associated request list 712. Accordingly, resource 1 710*a* is associated with a request list 712*a*, the resource 2, 710*b* is associated with the request list 712*b*, and so on. Each request list is a time ordered list of requests from software agents that are scheduled to use the associated resource to record a current violation event. Thus, during the recording of the associated violation event, Resource 1 is first used by Agent 1. When Agent 1 returns Resource 1, the violation unit will allocate Resource 1 to Agent 2. Similarly, when Agent 2 returns Resource 1, the violation unit allocates Resource 1 to Agent 3.

Further in the request lists 712, each of the listed agents is associated with a start time and end time indicated by the agent as defining the time period during which the agent will need the associated resource. However, since there is no guarantee that an agent will return an allocated resource before the end of its estimated time period of reservation, a resource may be returned too late for the next agent within the request list to use it. In such a case, the violation event may not be completely recorded. Alternatively, the violation unit may allocate the returned resource to the next requesting agent, allowing the violation event to be at least partially recorded.

Figure 31:
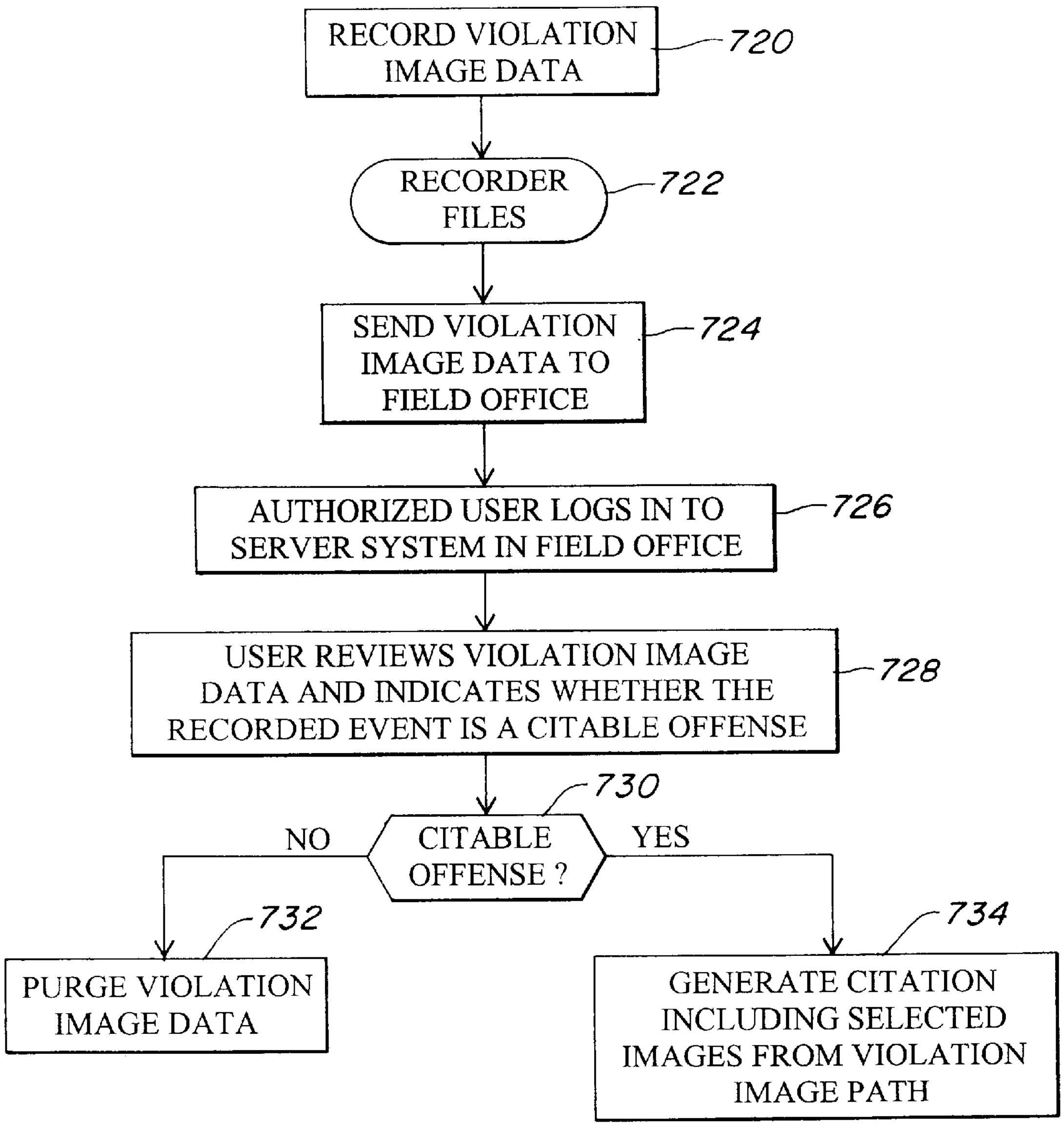
FIG. 31 shows steps performed to generate a citation using the disclosed citation generation system.

FIG. 31 is a flow chart showing steps preformed in an illustrative embodiment of the disclosed system for generating traffic violation citations. At step 720 of FIG. 31, violation image data is recorded, for example by one or more image capturing devices, such as video cameras. The violation image data recorded at step 720 may, for example, include one or more of the recorder files illustrated in FIG. 26. The output of step 720 is shown for purposes of illustration as recorder files 722.

At step 724, violation image data is sent to a field office for further processing. In an illustrative embodiment, the violation image data is sent from a road side station located proximate to the intersection being monitored, and to a field police office at which is located a server system including digital data storage devices for storing the received violation image data. Next, at step 726, an authorized user of the server system in the field office logs on in order to evaluate the images stored within the recorder files 722. The server system that the authorized user logs onto corresponds for example to the server 112 shown in FIG. 5. In an illustrative embodiment, the log on procedure performed at step 726 includes the authorized user providing a user name and password. Such a procedure is desirable in order to protect the privacy of those persons who have been recorded on violation image data from the roadside station.

At step 728, the user who logged on at step 726 reviews the violation image data and determines whether the recorded event is an offense for which a citation should be generated. Such a determination may be performed by viewing various perspectives provided by video clips contained within the recorder files 722. Further during step 728, the authorized user selects particular images from the violation image data, which will be included in any eventually generated citation. If the authorized user determines that the violation image data shows a citationable offense, then the authorized user provides such indication to the system. At step 730, the system determines whether the authorized user has indicated that the violation data is associated with a citationable offense. If not, then step 730 is followed by step 732, in which the disclosed system purges violation image data. Such purging is desirable to protect privacy of individuals recorded operating vehicles involved in non-violation events. On the other hand, if the authorized user indicated that the violation image data shows an event including a citationable offense, then step 730 is followed by step 734, in which the disclosed system generates a citation including the selected images at step 728. The citation generated at step 734, further includes information provided by the reviewing authorized user. Such additional information may be obtained during the review of the violation information data at step 728, through an interface to a vehicle database. Such a vehicle database may be used to provide information regarding owners and or operators of vehicles identified in the violation image data. Such identification may, for example, be based upon license plate numbers or other identifying characteristics of the vehicles shown in the violation image data. Further, the reviewing authorized user may indicate additional information relating to the violation event and to be included in the generated citation, as is further described with regard to the elements shown in FIGS. 32 and 33.

Figure 32:
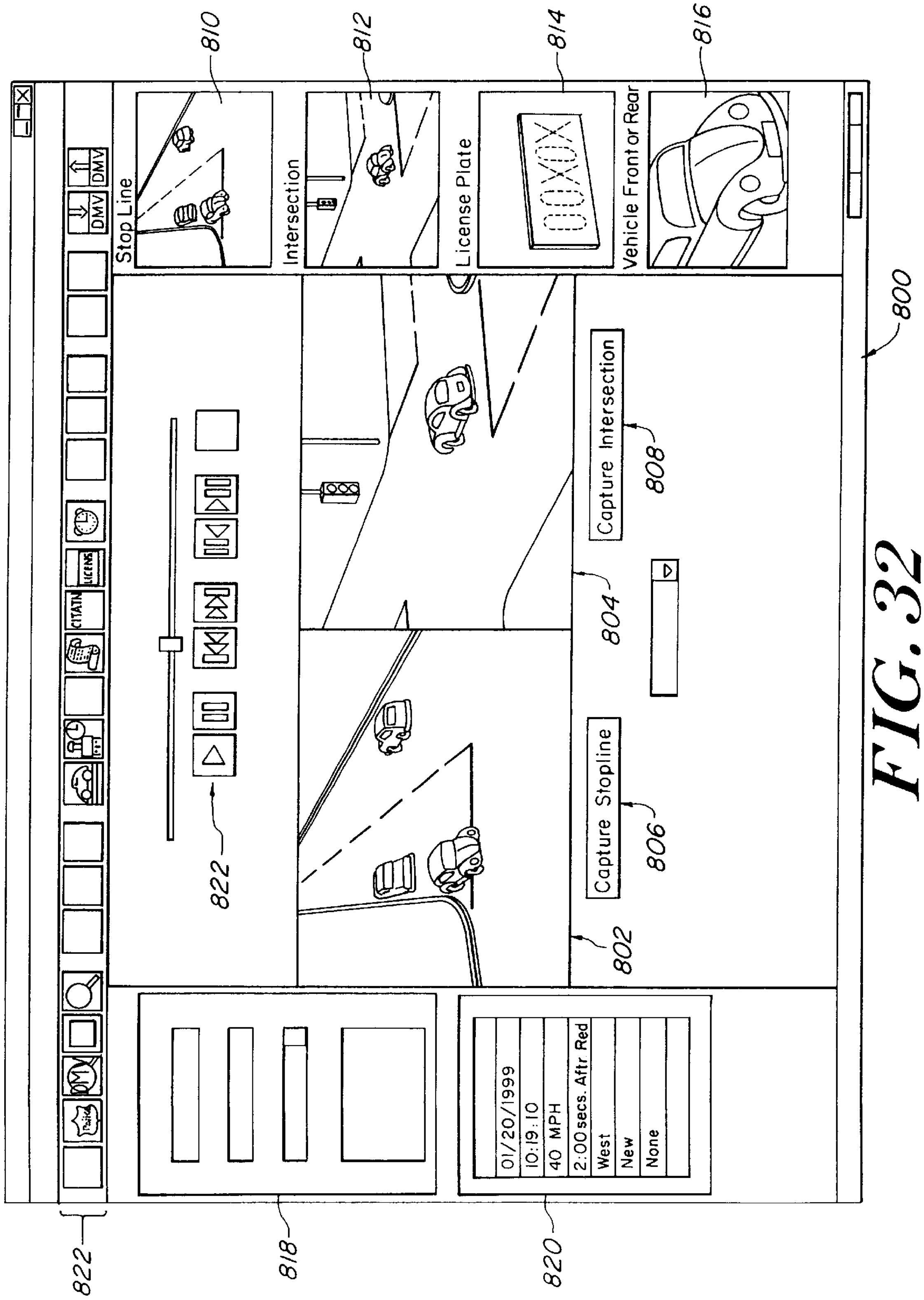
FIG. 32 shows an illustrative citation generation user interface for the disclosed citation generation system.

FIG. 32 shows an illustrative embodiment of a user interface which enables an authorized user to compose and generate a citation in response to violation image data. The interface screen 800 shown in FIG. 32, includes a first display window 802 labeled for purposes of example as the "approaching view", as well as a second viewing window 804, labeled as the "receding view". A capture stop line button 806 is provided for the user to select an image currently being displayed within the first viewing window 802, which is to be stored as a stop line image in association with the recorded violation event, and displayed in the stop line image window 810. Similarly, a capture intersection button 808 is provided to enable the user to capture an image currently displayed within the second viewing window 84, which is to be stored as an "intersection" image in association with the recorded violation event, and displayed within the intersection image window 812. The buttons 806 and 808 further may be adjusted or modified during operation to enable the user to select an image displayed within either the first viewing window or the second viewing window, which is to be stored as a license plate image in association with the violation event, and displayed within the license plate image 814. Similarly, the buttons 806 and 808 further may be adjusted or modified during operation to enable the user to select an image displayed within either the first viewing window or the second viewing window, which is to be stored as a front or rear view image in association with the violation event, and displayed within the front or rear view image window 816. The recorder files provided by the disclosed system provide both front and rear view violation clips, and the user may select from those views the best image of the violating vehicle's license plate. In this way, the images 810, 812, 814, and 816 make up a set of images related to the violation event which may later be included in any resulting citation.

The interface window 800 of FIG. 32 is further shown including a violation information window 818 permitting the user to enter information regarding the violation event such as the vehicle registration number of the violating vehicle, the vehicle state of the violating vehicle, and any other information or comments are relevant to the violation event. Further, the violation information window 818 is shown displaying an automatically generated citation identifier. A details window 820 is provided to enable the display of other information related to the violation image data. For example, the information reported in the details window 820 maybe obtained from one or more files stored in association with a number of recorder files relating to a recorded violation event, and provided by the roadside station. Such information may include the date and time of the violation event and/or video clips, the speed at which the violating vehicle was travelling, the time elapsed after the traffic light transitioned into a red light phase that the violating vehicle passed through the intersection, and the direction in which the vehicle was travelling.

A set of control buttons 822 are provided to enable the user to conveniently and efficiently review the violation image data being displayed within the first and second windows 802 and 804. For example, the control buttons 822 are shown including "VCR" like controls, including a forward button, a pause button, a next frame or clip button, a proceeding clip button, all of which may be used to manipulate the violation image data shown in the view windows. The system further provides zooming and extracting capabilities with regard to images displayed in the view windows. The violation image data displayed within the two view windows may or may not be synchronized such that the events shown in the two windows were recorded simultaneously. Accordingly, the two view windows may be operated together and show events having been recorded at the same time. While two view windows are shown in the illustrative embodiment of FIG. 32, the disclosed system may operate using one or more view windows, in which the displayed violation image data may or may not be synchronous.

A row of buttons 823 is provided in the interface 800 shown in FIG. 32, some of which may be used to initiate access to external databases, or to initiate the storage of relevant data for later conveyance to offices in which external databases are located. For example, the buttons 822 may include a button associated with a vehicle database maintained by the department of motor vehicles ("DMV"). When this button is asserted, a window interfacing to the remote vehicle database may be brought up on the users system. Alternatively, information entered by the user into the user interface 800, such as a license plate number, may automatically be forwarded in the form of a search query to the remote database. In another embodiment, information identifying a number of violating vehicles is recorded onto a floppy disk or other removable storage medium. The removable storage medium may then be extracted and sent to the remote office in which the vehicle database is located, as part of a request for information relating to each vehicle identified on the removable storage medium. The information returned from the remote vehicle database regarding the registered owners of the identified vehicles may then be entered into the server system located in the field office. The buttons 823 may further include a court schedule function that enables a user to select from a set of available court dates. The available court dates may have been previously entered into the system manually, or may be periodically updated automatically from a master court date schedule.

Figure 33:
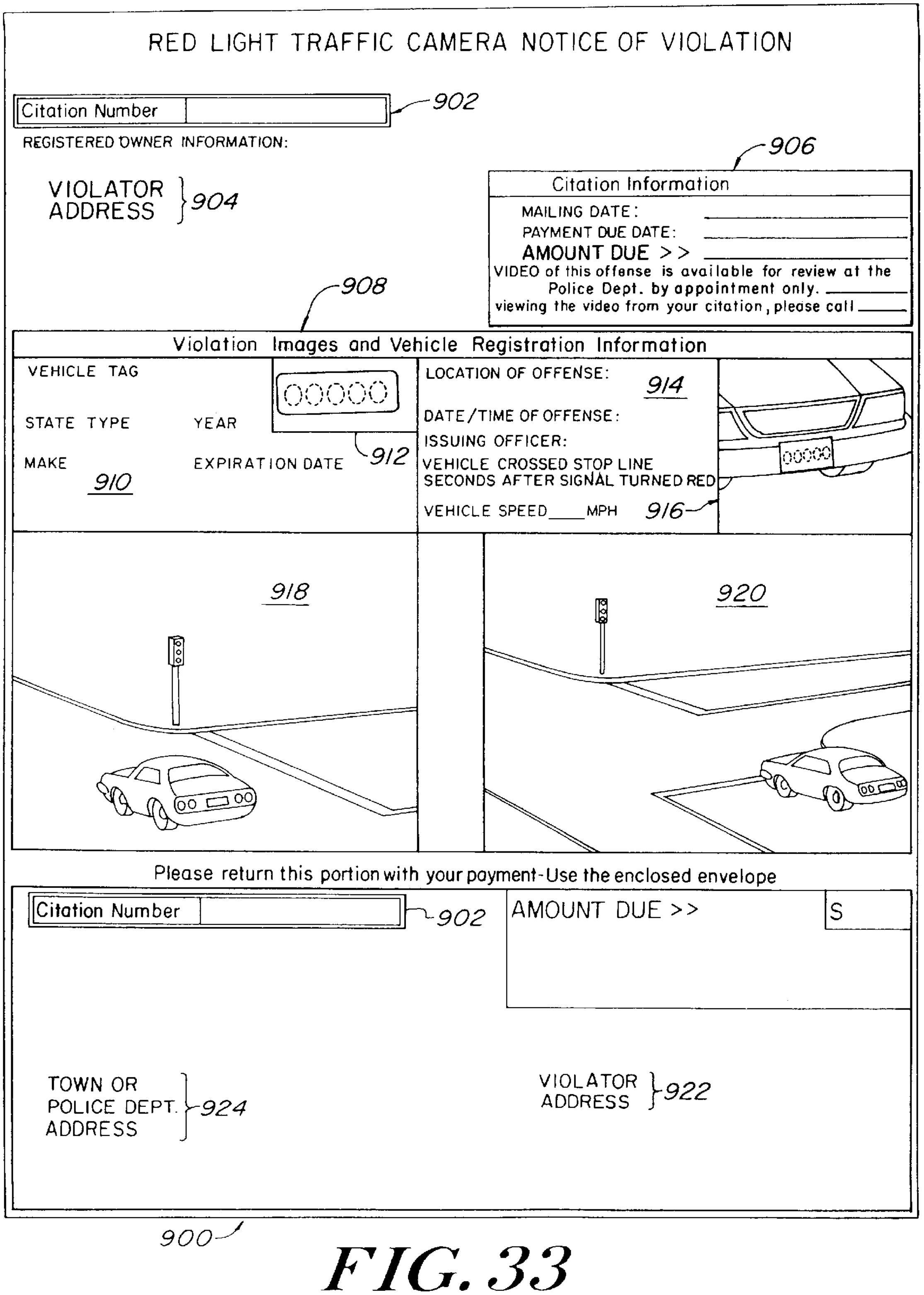
FIG. 33 shows a citation generated using an embodiment of the disclosed citation generation system.

FIG. 33 shows an example of a citation 900 generated by the disclosed system. The citation 900 is shown including a citation number field 902 both at the top of the citation, as well as within the lower portion of the citation which is to be returned. The citation 900 is further shown including an address field 904 containing the address of the violator. Information to be stored in the address field 904 may be obtained by the disclosed system, for example, from a remote vehicle database, in response to vehicle identification information extracted by a user from the violation image data. Further in the citation 900 is shown a citation information field 906 including the mailing date of the citation, the payment due date, and the amount due. A vehicle information field 910 is shown including a vehicle tag field, as well as state, type, year, make and expiration date fields related to the registration of the violating vehicle. The disclosed system further provides an image of the violating vehicle license plate 912 within the violating vehicle information 910. A violation information field 914 is further provided including a location of offense field, date-time of offense field, issuing officer field, time after red field, and vehicle speed field. Some or all of the violation information 914 may advantageously be provided from the disclosed roadside station in association with the recorder file or files storing the image 916 of the front of the violating vehicle.

Two selected images 918 and 920 are shown within the citation 900. The image 918, for example, is a selected image of the violating vehicle within the intersection after the beginning of the red light phase, and showing the red light. The image 920 is, for example, a selected image of the violating vehicle immediately prior to when it entered the intersection, also showing the red light. Any number of selected images from the violation image data may be provided as needed in various embodiments of the disclosed system. Examples of image information which may desirably be shown in such images include the signal phase at the time the violating vehicle entered the intersection, the signal phase as the vehicle passed through the intersection, the operator of the vehicle, the vehicle's license plates, and/or images showing the circumstances surrounding the violation event. Other fields in the citation 900 include a destination address field 924, which is for example the address of the police department or town, and a second address field 922, also for storing the address of the alleged violator.

Figure 34:
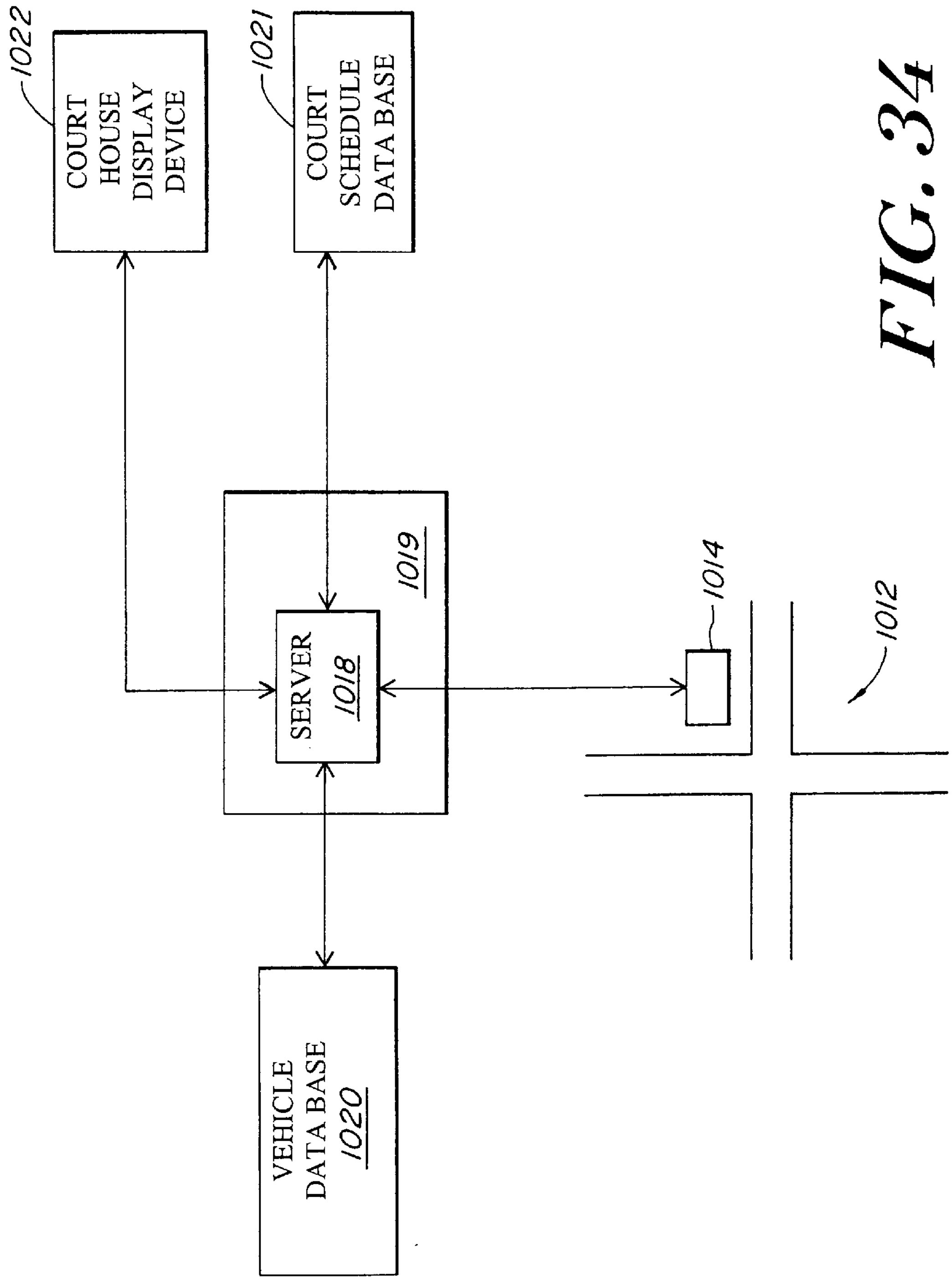
FIG. 34 shows the disclosed system inter-operating with a vehicle database, court schedule database, and court house display device.

FIG. 34 illustrates an embodiment of the disclosed system including a roadside station 1014 situated proximately to a monitored intersection 1012 and coupled to a server 1018 within a field office 1019. The server system 1018 is further shown communicably coupled with a vehicle database 10120, a court schedule database 10121, and a court house display device 1022. The interfaces between the server system 1018, the vehicle database 10120, the court house display device 1022 may be provided over local area network (LAN) connections such as an Ethernet, or over an appropriately secure wide area network (WAN) or the Internet. The databases 1020, 1021, and 1022 may, for example, be implemented using a conventional database design. An illustrative conventional database design is one based on a system query language (SQL), such as Microsoft's SQL Version 7. In such a fully connected configuration, information relating to a violation event, for example as entered by a user of the interface 800 shown in FIG. 32, may be directly communicated in requests to the vehicle database 1020 and court schedule database 1021. Further, information relating to a violation event, for example including any video clips, may be communicated to a court house display device for display during a hearing regarding the violation event.

Since many existing DMV databases and/or court date scheduling databases cannot be remotely accessed, the present system may be used in other configurations to handle such limitations. For example, where the court date scheduling database is not remotely accessible, and in a case where a citation issued using the present system has not been paid within a predetermined time period, a police office will generate a summons including a court date to be sent to the violator. In order to obtain a court date, the officer may, for example, call the court house to request a number of hearing times. The officer then uses one of the hearing times thus obtained for the hearing described in the summons. On the date of the hearing, the officer may download information from the field office server, relating to the violation event, onto a portable storage device or personal computer, such as a laptop. This information may include recorder files and related information provided from the roadside station, as well as the citation itself. Upon arriving at the court house for the hearing, the officer can then display the video clips within the recorder files on the portable computer, or on any computer display to which the portable computer or storage device may be interfaced at the court house. Such a display of the violation image data at the court house may be used to prove the violation, and accordingly counter any ill-founded defenses put forth by the violator.

While the illustrative embodiments have been described in connection with automobile traffic intersections, the disclosed system may generally be applied to intersections and traffic control in general. The disclosed system is further applicable to intersections in general, and not limited to monitoring of automobile intersections. Specifically, the disclosed system provides the capability to similarly monitor and record events occurring at railroad crossings, border check points, toll booths, pedestrian crossings and parking facilities. Moreover, the disclosed system may be employed to perform traffic signal control in general and to detect speed limit violations.

In an illustrative embodiment for a railroad gate crossing, sensors would be provided to detect when the flashing lights indicating that a train is approaching began to flash, and when the gates preventing traffic across the tracks begin to close. The time period between when the flashing lights begin to flash and when the gates begin to close would be treated as a yellow light phase, while the time at which the gates begin to close would mark the beginning of a time period treated as a red light phase. If the system predicts that an approaching car will cross onto or remain on the railroad tracks after the gates begin to close, that car would be considered a predicted violator. When a predicted violator was detected, the system would attempt to warn the oncoming train. Such a warning could be provided by 1) sending a signal to an operations center, which would then trigger a stop signal for the train, 2) sending a signal to a warning indicator within the train itself, for example by radio transmission, or 3) operating through a direct interface with a controller for the train track signal lights.

Those skilled in the art should readily appreciate that the programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Therefore, while the preferred embodiments are described in connection with various illustrative data structures, one skilled in the art will recognize that the system may be embodied using a variety of specific data structures. In addition, while the preferred embodiments are disclosed with reference to the use of video cameras, any appropriate device for capturing multiple images over time, such as a digital camera, may be employed. Thus the present system may be employed with any form of image capture and storage. Further, while the illustrative embodiments are disclosed as using license plate numbers to identify violators, any other identification means may alternatively be employed, such as 1) transponders which automatically respond to a received signal with a vehicle identifier, 2) operator images, or 3) any other identifying attribute associated with a violator. Accordingly, the invention should not be viewed as limited except by the scope and spirit of the appended claims.

What is claimed is:

1. A system for generating a traffic light violation citation for a traffic light violation, said traffic light violation occurring when a vehicle crosses over a stop line and into an intersection during a red light phase of a traffic control light for a lane in which said vehicle is traveling at said intersection, comprising:

a processor for generating said traffic light violation citation, said processor operative to:

receive at least one image data file, said image data file including image data showing a plurality of independent views of said traffic light violation, each of said independent views including at least a portion of said vehicle, wherein said at least one image data file includes a plurality of image sequences, each one of said image sequences including digitized video information providing an associated one of said plurality of independent views of said traffic light violation, and wherein each of said image sequences includes a video clip;

display a plurality of image display windows, said image display windows for simultaneously displaying said plurality of image sequences in said image data file, wherein each of said plurality of image display windows displays a corresponding one of said independent views of said traffic light violation, and wherein said plurality of image sequences are synchronized such that they provide simultaneous views of said traffic violation;

display a selection interface for permitting a user to select at least one image from said plurality of image display windows, wherein said plurality of image display windows and said selection interface are embodied within a graphical user interface (GUI); and said processor further operative to execute a citation generation process for generating a citation associated with said traffic light violation, wherein said citation includes said at least one selected image, and wherein said citation indicates that said traffic light was in said red light phase at a time said at least one selected image was captured.

2. The system of claim 1 wherein said selection interface is operable to control the temporal direction of images displayed in at least one of said plurality of image display windows.

3. The system of claim 1 wherein said selection interface is operable to control a speed at which images are displayed in said plurality of image display windows.

4. The system of claim 1, wherein said selection interface includes a forward button, a reverse button, and a stop button.

5. The system of claim 1, wherein said selection interface further comprises a region, in which said at least one selected image may be moved and displayed.

6. The system of claim 1 wherein said selection interface is operable to zoom into and extract images displayed in said plurality of image display windows.

7. A method of generating a traffic light violation citation, for a traffic light violation, said traffic light violation occurring when a vehicle crosses over a stop line and into an intersection during a red light phase of a traffic control light for a lane in which said vehicle is traveling at said intersection, comprising:

receiving at least one image data file, said image data file including image data showing a plurality of independent views of a traffic light violation, each of said independent views including at least a portion of said vehicle, wherein said at least one image data file includes a plurality of image sequences, each one of said image sequences including digitized video information providing an associated one of a plurality of independent views of said traffic light violation, and wherein each of said image sequences includes a video clip;

displaying a plurality of image display windows, said image display windows simultaneously displaying said plurality of image sequences, wherein each of said plurality of image display windows displays a corresponding one of said independent views of said traffic light violation, said plurality of image sequences being synchronized such that they provide simultaneous views of said traffic violation;

receiving a selection from a user, through a selection interface, said selection indicating at least one image from said plurality of image display windows, wherein said plurality of image display windows and said selection interface are embodied within a graphical user interface (GUI); and generating a citation associated with said traffic light violation, wherein said citation includes said at least one selected image, and wherein said citation indicates that said traffic light was in said red light phase at a time said at least one selected image was captured.

8. The method of claim 7 further comprising providing an interface for controlling the temporal direction of images displayed in at least one of said plurality of image display windows.

9. The method of claim 8 further comprising providing an interface for controlling a speed at which images are displayed in at least one of said plurality of image display windows.

10. The method of claim 7, wherein said providing said interface for controlling said speed at which images are displayed in at least one of said plurality of image display windows includes providing a forward button, a reverse button, and a stop button.

11. The method of claim 7, further comprising displaying said at least one selected image in a region of a graphical user interface (GUI).

12. The method of claim 7 further comprising providing zooming and extracting capability with regard to images displayed in at least one of said plurality of image display windows.

* * * * *

UNITED STATES PATENT AND TRADEMARK OFFICE

CERTIFICATE OF CORRECTION

PATENT NO. : 6,754,663 B1
APPLICATION NO. : 09/447032
DATED : June 22, 2004
INVENTOR(S) : Steven I. Small et al.

It is certified that error appears in the above-identified patent and that said Letters Patent is hereby corrected as shown below:

Column 6, line 22, "or storage" should read --for storage--;

Column 19, line 14, "ay exist" should read --may exist--; and

Column 22, line 25, "1700" should read --1 700--;

Signed and Sealed this

Twenty-second Day of January, 2008

JON W. DUDAS
*Director of the United States Patent and Trademark Office*